United States Patent
Krasner et al.

(10) Patent No.: US 9,645,249 B2
(45) Date of Patent: May 9, 2017

(54) SYSTEMS AND METHODS FOR PSEUDO-RANDOM CODING

(71) Applicant: NextNav, LLC, Sunnyvale, CA (US)

(72) Inventors: Norman F. Krasner, Redwood City, CA (US); Bhaskar Nallapureddy, Santa Clara, CA (US); Arun Raghupathy, Bangalore (IN)

(73) Assignee: NextNav, LLC, Sunnyvale, CA (US)

( * ) Notice: Subject to any disclaimer, the term of this patent is extended or adjusted under 35 U.S.C. 154(b) by 0 days.

(21) Appl. No.: 14/813,650

(22) Filed: Jul. 30, 2015

(65) Prior Publication Data

US 2015/0341077 A1    Nov. 26, 2015

Related U.S. Application Data

(60) Continuation-in-part of application No. 14/466,826, filed on Aug. 22, 2014, now abandoned, which is a
(Continued)

(51) Int. Cl.
| | |
|---|---|
| *H04L 27/00* | (2006.01) |
| *H04B 1/00* | (2006.01) |
| *G01S 19/46* | (2010.01) |
| *G01S 1/04* | (2006.01) |
| *G01S 5/14* | (2006.01) |
| *H04B 1/709* | (2011.01) |
| *H04B 1/711* | (2011.01) |
| *H04W 4/02* | (2009.01) |

(Continued)

(52) U.S. Cl.
CPC .............. *G01S 19/46* (2013.01); *G01S 1/042* (2013.01); *G01S 5/145* (2013.01); *H04B 1/709* (2013.01); *H04B 1/711* (2013.01); *H04W 4/025* (2013.01); *G01S 19/02* (2013.01); *G01S 19/10* (2013.01)

(58) Field of Classification Search
USPC ...... 375/219, 220, 222, 211, 240.26–240.27, 375/285, 284, 295, 316, 324, 346, 347, 375/340, 342, 130, 136, 1, 37, 135, 134, 375/146, 147, 150, 145, 367, 365, 364; 370/514, 515
See application file for complete search history.

(56) References Cited

U.S. PATENT DOCUMENTS

| | | | | |
|---|---|---|---|---|
| 5,504,781 | A | * | 4/1996 | Wolf .................. H04L 25/4906 341/173 |
| 5,808,580 | A | * | 9/1998 | Andrews, Jr. ......... G01S 13/582 342/108 |

(Continued)

OTHER PUBLICATIONS

Information about Related Patents and Patent Applications, see the section attached hereto entitled Related Patents and Patent Applications for further information.
(Continued)

*Primary Examiner* — Linda Wong

(57) ABSTRACT

Systems and methods for improving performance in terrestrial and satellite positioning systems are disclosed. Signal processing systems and methods are described for selecting, from among a set of codes, certain codes having desired autocorrelation and/or cross-correlation properties. Systems and methods for generating, encoding, transmitting, and receiving signals using the selected codes are also described.

35 Claims, 24 Drawing Sheets

Related U.S. Application Data continuation of application No. 14/011,277, filed on Aug. 27, 2013, now abandoned, application No. 14/813,650, which is a continuation-in-part of application No. 14/556,136, filed on Nov. 29, 2014, which is a continuation of application No. 13/535,626, filed on Jun. 28, 2012, now Pat. No. 9,119,165, and a continuation of application No. 13/536,051, filed on Jun. 28, 2012, now Pat. No. 8,917,209, application No. 14/813,650, filed on Jul. 30, 2015, which is a continuation-in-part of application No. 13/535,626, filed on Jun. 28, 2012, now Pat. No. 9,119,165, said application No. 13/536,051 is a division of application No. 13/535,626, filed on Jun. 28, 2012, now Pat. No. 9,119,165.

(60) Provisional application No. 61/502,272, filed on Jun. 28, 2011, provisional application No. 61/502,276, filed on Jun. 28, 2011.

(51) Int. Cl.
*G01S 19/02* (2010.01)
*G01S 19/10* (2010.01)

(56) References Cited

U.S. PATENT DOCUMENTS

| | | | | |
|---|---|---|---|---|
| 6,044,083 | A * | 3/2000 | Citta | H04J 13/004 348/E7.07 |
| 7,058,004 | B2 * | 6/2006 | Jain | H04L 27/0004 370/204 |
| 7,079,567 | B2 * | 7/2006 | van Nee | H04J 13/0048 370/208 |
| 7,110,441 | B2 * | 9/2006 | Kawai | H04B 1/7085 370/342 |
| 7,123,929 | B2 * | 10/2006 | Avellone | H04B 1/7083 370/503 |
| 7,639,725 | B1 * | 12/2009 | Wilson | H04J 13/00 375/130 |
| 7,952,482 | B2 * | 5/2011 | Malocha | G06K 19/0675 340/10.1 |
| 8,537,878 | B2 * | 9/2013 | Lakkis | H04B 1/707 375/130 |
| 8,804,860 | B2 * | 8/2014 | Muraoka | H04W 16/14 375/260 |
| 9,255,994 | B2 * | 2/2016 | Young | G01S 19/37 |
| 2003/0185281 | A1 * | 10/2003 | Roh | H04B 1/707 375/140 |
| 2003/0201934 | A1 * | 10/2003 | Asher | G01S 19/21 342/357.23 |
| 2004/0096017 | A1 * | 5/2004 | Holt | H04L 25/03057 375/343 |
| 2004/0196894 | A1 * | 10/2004 | Akopian | G01S 19/30 375/150 |
| 2004/0202235 | A1 * | 10/2004 | Kohli | G01C 21/26 375/150 |
| 2005/0175076 | A1 * | 8/2005 | Miller | G01S 7/023 375/150 |
| 2005/0195789 | A1 * | 9/2005 | Akopian | G01S 19/246 370/342 |
| 2006/0020433 | A1 * | 1/2006 | Taha | H03M 13/33 703/2 |
| 2006/0050625 | A1 * | 3/2006 | Krasner | G01S 1/04 370/208 |
| 2006/0055596 | A1 * | 3/2006 | Bryant | G01S 5/10 342/357.64 |
| 2008/0043779 | A1 * | 2/2008 | Taha | H03M 13/33 370/503 |
| 2008/0219327 | A1 * | 9/2008 | Rushanan | H04J 13/00 375/146 |
| 2008/0318528 | A1 * | 12/2008 | Hooli | H04J 13/0062 455/62 |
| 2009/0052506 | A1 * | 2/2009 | Valio | G01S 19/33 375/150 |
| 2009/0059201 | A1 * | 3/2009 | Willner | G01S 7/491 356/5.01 |
| 2009/0154333 | A1 * | 6/2009 | Sivaswamy | H04L 23/02 370/203 |
| 2009/0196329 | A1 * | 8/2009 | Legate | G01S 19/02 375/141 |
| 2009/0285339 | A1 * | 11/2009 | Zhang | H04J 13/0014 375/343 |
| 2009/0290660 | A1 * | 11/2009 | Neugebauer | H04B 1/707 375/340 |
| 2010/0146372 | A1 * | 6/2010 | Tomlinson | H03M 13/293 714/780 |
| 2010/0195773 | A1 * | 8/2010 | Young | G01S 19/37 375/340 |
| 2010/0304706 | A1 * | 12/2010 | Haverty | H04K 3/45 455/404.1 |
| 2011/0064071 | A1 * | 3/2011 | Dabak | H04B 1/70735 370/350 |
| 2011/0129002 | A1 * | 6/2011 | De Latour | G01S 19/30 375/150 |
| 2011/0261805 | A1 * | 10/2011 | Landry, Jr. | G01S 19/24 370/342 |
| 2013/0057436 | A1 * | 3/2013 | Krasner | G01S 19/11 342/464 |

OTHER PUBLICATIONS

U.S. Appl. No. 13/535,626, filed Jun. 28, 2012, Krasner et al.
U.S. Appl. No. 13/536,051, filed Jun. 28, 2012, Krasner et al.
U.S. Appl. No. 14/556,136, filed Nov. 29, 2014, Krasner et al.
U.S. Appl. No. 14/011,277, filed Aug. 27, 2013, Krasner et al.
U.S. Appl. No. 14/466,826, filed Aug. 22, 2014, Krasner et al.

* cited by examiner

| Preferred code index | WAPS 2.0 Polynomial (Octal) | WAPS 2.0 Polynomial/taps in binary |
|---|---|---|
| 1 | 4215 | 100010001101 |
| 2 | 6741 | 110111100001 |
| 3 | 7113 | 111001001011 |
| 4 | 5733 | 101111011011 |
| 5 | 5155 | 101001101101 |
| 6 | 5421 | 101100010001 |
| 7 | 6015 | 110000001101 |
| 8 | 5531 | 101101011001 |
| 9 | 5747 | 101111100111 |
| 10 | 5001 | 101000000001 |
| 11 | 6637 | 110110011111 |
| 12 | 6447 | 110100100111 |
| 13 | 7431 | 111100011001 |
| 14 | 5675 | 101110111101 |
| 15 | 5607 | 101110000111 |
| 16 | 4671 | 100110111001 |
| 17 | 7751 | 111111101001 |
| 18 | 5463 | 101100110011 |
| 19 | 4251 | 100010101001 |
| 20 | 5623 | 101110010011 |
| 21 | 7125 | 111001010101 |
| 22 | 4521 | 100101010001 |
| 23 | 4565 | 100101110101 |
| 24 | 4261 | 100010110001 |
| 25 | 4617 | 100110001111 |
| 26 | 7005 | 111000000101 |
| 27 | 5247 | 101010100111 |
| 28 | 5403 | 101100000011 |
| 29 | 4053 | 100000101011 |
| 30 | 5007 | 101000000111 |
| 31 | 4173 | 100001111011 |
| 32 | 6315 | 110011001101 |
| 33 | 5051 | 101000101001 |
| 34 | 7565 | 111101110101 |
| 35 | 4451 | 100100101001 |
| 36 | 7071 | 111000111001 |
| 37 | 6127 | 110001010111 |
| 38 | 5337 | 101011011111 |
| 39 | 6141 | 110001100001 |
| 40 | 7621 | 111110010001 |
| 41 | 5177 | 101001111111 |
| 42 | 4237 | 100010011111 |
| 43 | 5205 | 101010000101 |
| 44 | 7223 | 111010010011 |
| 45 | 6733 | 110111011011 |
| 46 | 7627 | 111110010111 |
| 47 | 7107 | 111001000111 |
| 48 | 5141 | 101001100001 |
| 49 | 4707 | 100111000111 |
| 50 | 4145 | 100001100101 |
| 51 | 4415 | 100100001101 |
| 52 | 7243 | 111010100011 |
| 53 | 5411 | 101100001001 |
| 54 | 6501 | 110101000001 |
| 55 | 4505 | 100101000101 |
| 56 | 4511 | 100101001001 |
| 57 | 5357 | 101011101111 |
| 58 | 4143 | 100001100011 |
| 59 | 4473 | 100100111011 |
| 60 | 6153 | 110001101011 |
| 61 | 6351 | 110011101001 |
| 62 | 4005 | 100000000101 |
| 63 | 4027 | 100000010111 |
| 64 | 4055 | 100000101101 |
| 65 | 4107 | 100001000111 |
| 66 | 4161 | 100001110001 |

*Example Embodiment of a Table of Preferred PRN Codes Expressed as Primitive Polynomials in GF(2)*

Example Cross-Correlation Rejection Between Selected Codes From Table 400 of FIG. 4

700

Select a first set of pseudorandom sequences, wherein a magnitude in a region adjacent to the peak of the autocorrelation of each member of the set is less than a first predetermined value
710

Generate and encode at least a portion of a positioning signal at a transmitter using a member of a subset of pseudorandom sequences that optimizes a criterion compared to another subset, wherein the first set includes the subset
720

Send the encoded positioning signal from the transmitter to one or more receivers
730

Receive a first positioning signal from a first transmitter, wherein at least a portion of the first positioning signal is encoded using a first pseudorandom sequence from a set of pseudorandom sequences with desired autocorrelation properties, wherein the first pseudorandom sequence is chosen from a subset of pseudorandom sequences within the set of pseudorandom sequences that optimizes a performance criterion
810

Receive a second positioning signal from a second transmitter, wherein at least a portion of the second positioning signal is encoded using a second pseudorandom sequence from the subset
820

Determine positioning information based at least in part on the first and second positioning signals
830

Select a first pseudorandom sequence from a first set of pseudorandom sequences, wherein a magnitude of the autocorrelation of each member of the first set is less than a first predetermined value, and wherein the first pseudorandom sequence belongs to a subset of pseudorandom sequences that optimizes a criterion when frequency offset modulated in accordance with a group of discrete frequencies
1110

Generate and encode at least a portion of a positioning signal at a transmitter using the first pseudorandom sequence
1120

Send the encoded positioning signal from the transmitter to one or more receivers
1130

Receive a first positioning signal transmitted by a first transmitter, wherein the first positioning signal is encoded at least in part with a pseudorandom sequence selected from a set of pseudorandom sequences with desired autocorrelation properties, wherein the set of pseudorandom sequences also optimizes a criterion (e.g., maximum magnitude of cross-correlation functions between all pairs of members of the set, at all of a set of offset carrier frequencies, are less than for other sets)
1210

Receive a second positioning signal from a second transmitter, wherein the second positioning signal is encoded at least in part with another pseudorandom sequence from the set
1220

Determine positioning information based at least in part on the first and second positioning signals
1230

FIG. 12

| Preferential Order | Delay Between Codes | Equivalent Fill | -1 Sidelobe Run Length |
|---|---|---|---|
| 1 | 853 | 1000100001 | 25 |
| 2 | 714 | 0011111100 | 23 |
| 3 | 797 | 0011000101 | 22 |
| 4 | 602 | 1110110011 | 21 |
| 5 | 1012 | 0101101001 | 18 |
| 6 | 536 | 0111100110 | 18 |
| 7 | 456 | 1110101011 | 18 |
| 8 | 422 | 0010110011 | 18 |
| 9 | 76 | 0011111110 | 18 |
| 10 | 476 | 1000000011 | 17 |
| 11 | 373 | 0110110011 | 16 |
| 12 | 135 | 1001101110 | 16 |
| 13 | 52 | 0010110111 | 16 |
| 14 | 740 | 1010011000 | 15 |
| 15 | 79 | 1110011111 | 15 |
| 16 | 16 | 1101001000 | 15 |
| 17 | 15 | 1010010000 | 15 |
| 18 | 960 | 1110111001 | 14 |
| 19 | 462 | 0010001110 | 14 |
| 20 | 37 | 1101101010 | 14 |
| 21 | 953 | 0010000110 | 13 |
| 22 | 818 | 0000110110 | 13 |
| 23 | 530 | 0110100001 | 13 |
| 24 | 298 | 0110110111 | 13 |
| 25 | 83 | 0001111001 | 13 |
| 26 | 837 | 0101011111 | 12 |
| 27 | 816 | 0011011010 | 12 |
| 28 | 712 | 1111110011 | 12 |

FIG. 15A

| | | | |
|---|---|---|---|
| 29 | 580 | 0110011010 | 12 |
| 30 | 484 | 0001100010 | 12 |
| 31 | 482 | 0110001000 | 12 |
| 32 | 465 | 0100010001 | 12 |
| 33 | 29 | 1001111100 | 12 |
| 34 | 22 | 1001001101 | 12 |
| 35 | 1018 | 1111100101 | 11 |
| 36 | 926 | 1011010011 | 11 |
| 37 | 780 | 1001110000 | 11 |
| 38 | 595 | 0111100000 | 11 |
| 39 | 540 | 0111011110 | 11 |
| 40 | 358 | 0100011100 | 11 |
| 41 | 289 | 1110100001 | 11 |
| 42 | 238 | 1111000111 | 11 |
| 43 | 225 | 0001000011 | 11 |
| 44 | 157 | 1101000101 | 11 |
| 45 | 145 | 1001000110 | 11 |
| 46 | 72 | 1111100000 | 11 |
| 47 | 56 | 0010001011 | 11 |
| 48 | 48 | 1101110011 | 11 |
| 49 | 894 | 0101111011 | 10 |
| 50 | 883 | 1110100100 | 10 |
| 51 | 879 | 1001001011 | 10 |
| 52 | 870 | 1011001000 | 10 |
| 53 | 851 | 0010000101 | 10 |
| 54 | 849 | 1000010100 | 10 |
| 55 | 836 | 1010111111 | 10 |
| 56 | 815 | 0110110100 | 10 |
| 57 | 771 | 0000100101 | 10 |
| 58 | 657 | 0111001111 | 10 |
| 59 | 607 | 0011111101 | 10 |
| 60 | 586 | 0110000110 | 10 |
| 61 | 567 | 0011010111 | 10 |
| 62 | 499 | 1100001001 | 10 |
| 63 | 386 | 0100101000 | 10 |
| 64 | 365 | 1101111010 | 10 |
| 65 | 333 | 1000000100 | 10 |
| 66 | 34 | 1101010011 | 10 |

FIG. 15B

| Gold Code 1 (PN2 Delay) | Gold Code 2 (PN2 Delay) | Inserted Delay to Center Cross Correlation Run | Total Cross Correlation Run |
|---|---|---|---|
| 853 | 818 | 712 | 30 |
| 714 | 456 | 343 | 37 |
| 797 | 298 | 495 | 27 |
| 602 | 476 | 402 | 24 |
| 1012 | 465 | 853 | 31 |
| 536 | 22 | 362 | 33 |
| 422 | 37 | 702 | 27 |
| 76 | 960 | 799 | 29 |
| 373 | 79 | 17 | 29 |
| 135 | 740 | 613 | 26 |
| 52 | 83 | 530 | 36 |
| 16 | 462 | 741 | 28 |
| 15 | 816 | 394 | 36 |
| 953 | 837 | 211 | 33 |
| 530 | 712 | 701 | 25 |
| 580 | 484 | 37 | 31 |

Feedback Taps for 2047 Length Maximal Length Sequence Sets

| Maximum Cross Correlation Sidelobe Level/Sidelobe-to-Peak (dB) | | |
|---|---|---|
| 129 / -24.0 | 143 / -23.1 | 161 / -22 |
| 11, 10, 9, 7 | 11, 10, 9, 7; | 11, 10, 9, 7; |
| 11, 10, 9, 5 | 11, 10, 9, 5; | 11, 10, 9, 5; |
| 11, 10, 9, 2 | 11, 10, 9, 2; | 11, 10, 9, 2; |
| 11, 10, 8, 6 | 11, 10, 8, 6; | 11, 10, 8, 6; |
| 11, 10, 3, 2 | 11, 10, 8, 1; | 11, 10, 8, 1; |
| 11, 4, 2, 1 | 11, 10, 7, 3; | 11, 10, 7, 3; |
| 11, 6, 2, 1 | 11, 10, 3, 2 | 11, 10, 3, 2 |
| 11, 9, 2, 1 | 11, 4, 2, 1; | 11, 8, 6, 3 |
| 11, 5, 3, 1 | 11, 6, 2, 1; | 11, 4, 2, 1; |
| 11, 9, 8, 1 | 11, 9, 2, 1; | 11, 6, 2, 1; |
|  | 11, 5, 3, 1; | 11, 9, 2, 1; |
|  | 11, 10, 3, 1; | 11, 5, 3, 1; |
|  | 11, 8, 4, 1 | 11, 10, 3, 1; |
|  | 11, 9, 8, 1 | 11, 8, 4, 1 |
|  |  | 11, 9, 8, 1 |
|  |  | 11, 8, 5, 3 |

FIG. 20

SYSTEMS AND METHODS FOR PSEUDO-RANDOM CODING

FIELD

This disclosure relates generally to positioning systems. More specifically, but not exclusively, this disclosure relates to systems, methods, computer-readable media and other means that generate coded signals at multiple transmitters, transmit the coded signals to a receiver, and/or process the coded signals after they are received at a receiver in order to estimate the receiver's position.

BACKGROUND

Quickly and accurately estimating locations of things (e.g., a receiver) in a geographic area can be used to speed up emergency response times, track business assets, and link consumers to nearby businesses. Various techniques are used to estimate the position of the receiver, including a technique called trilateration, which is the process of using geometry to estimate the position of a receiver using distances traveled by different signals that are transmitted from geographically-distributed transmitters and later received by the receiver.

In many cases, the signals transmitted by geographically-distributed transmitters are received by the receiver at or near the same time, which makes it necessary for the receiver to distinguish each signal from other signals in order to determine the travel time of that signal for use during trilateration processing. Each transmitter may code its signal so the receiver can effectively identify that signal from other signals. As described later herein, however, designing and operating systems and methods for selecting different codes at various transmitters requires careful consideration of various issues.

SUMMARY

Various embodiments, but not necessarily all embodiments, described in this disclosure relate generally to systems, methods, and machine-readable media for generating coded signals at multiple transmitters, transmitting the coded signals to a receiver, and/or processing the coded signals after they are received at a receiver in order to estimate the receiver's position.

According to certain aspects, systems, methods and machine-readable media may: identify a set of codes, wherein a magnitude of an autocorrelation function of each member of the set of codes, within a specified zonal region adjacent to a peak of the autocorrelation function, is equal to or less than a first prescribed value; and identify a subset of codes, from among two or more subsets of codes in the set of codes, that optimizes a performance criterion, wherein the performance criterion is associated with a relationship between members of the subset.

According to other aspects, systems, methods and machine-readable media may: identify a first code from a subset of codes within a set of codes, wherein a magnitude of an autocorrelation function of each member of the set of codes, within a zonal region adjacent to a peak of the autocorrelation function, meets a threshold condition, and wherein the subset optimizes a performance criterion between its members compared to other subsets of the set.

According to other aspects, systems, methods and machine-readable media may: receive, at a receiver, a first positioning signal that is encoded at least in part with a first code selected from a first subset of a set of codes, wherein the set of codes are characterized by having a magnitude of an autocorrelation function of each member of the set, within a specified zonal region adjacent to a peak of the autocorrelation function, equal to or less than a first prescribed value, and wherein the first subset is selected from among a group of subsets to optimize a performance criterion in comparison to the other subsets of the group, wherein the performance criterion is associated with a relationship between members of the first subset; receive, at the receiver, a second positioning signal that is encoded at least in part with a second code from the first subset of codes; and determine, based at least in part on the first and second positioning signals, information used to estimate the receiver's position.

The details of one or more embodiments of the invention are set forth in the accompanying drawings and the description below.

BRIEF DESCRIPTION OF THE DRAWINGS

FIG. 4 illustrates an example set of PRN codes.
FIG. 7 illustrates an example method for transmitting signals.
FIG. 8 illustrates an example method for receiving signals and extracting information from the received signals to be used to estimate a position of a receiver.
FIG. 11 illustrates an example method of transmission of signals from transmitters in a WAPS system using FOM.
FIG. 12 illustrates an example method of receiving signals from transmitters in association with FOM, and for extracting information from the received signals to be used to estimate a position of a receiver.
FIG. 15A and FIG. 15B (collectively FIG. 15) includes a table of preferential Gold codes of length 1023 in order of their −1 run length.
FIG. 20 is a table of sets of preferential maximal length codes with low cross-correlation values.

DETAILED DESCRIPTION OF EMBODIMENTS

This disclosure relates generally to positioning systems and methods for estimating a position (or "location") of things like receivers that reside within the positioning systems. More specifically, but not exclusively, the disclosure relates to systems, methods and computer-readable media for coding signals at different transmitters, transmitting those coded signals to one or more receivers, and/or processing the coded signals after they are received in order to estimate a position of a particular receiver. It is noted that, in the context of this disclosure, a positioning system may be a system that localizes a receiver's position. Various coordinates may be used to represent the receiver's position, including latitude, longitude, and altitude (LLA) coordinates, dimensional coordinates (x, y, z), angular coordinates, polar coordinates, and the like. One of ordinary skill in the art will understand alternative representations of a receiver's position.

In the following description, numerous specific details may be introduced to provide a thorough understanding of and enabling description for various embodiments of systems and methods. It is noted that well-known structures or operations are not necessarily shown or fully described in order to avoid obscuring certain aspects of each embodiments. One of ordinary skill in the art, however, will recognize that each embodiment can be practiced without one or more of the specific details, with details from other embodiments, or with omitted details that are known in the art.

In the following description, emphasis is placed upon selection of codes (also referred to as "pseudorandom sequences"), use of the codes to transmit signals, and use of the codes to process received signals.

EXAMPLE SYSTEMS

In various positioning systems, times of arrival of positioning signals sent from multiple transmitters are measured at a corresponding receiver to determine distances to known transmitter locations, which are used to estimate a position of a receiver during a process commonly referred to as trilateration.

Figure 1:
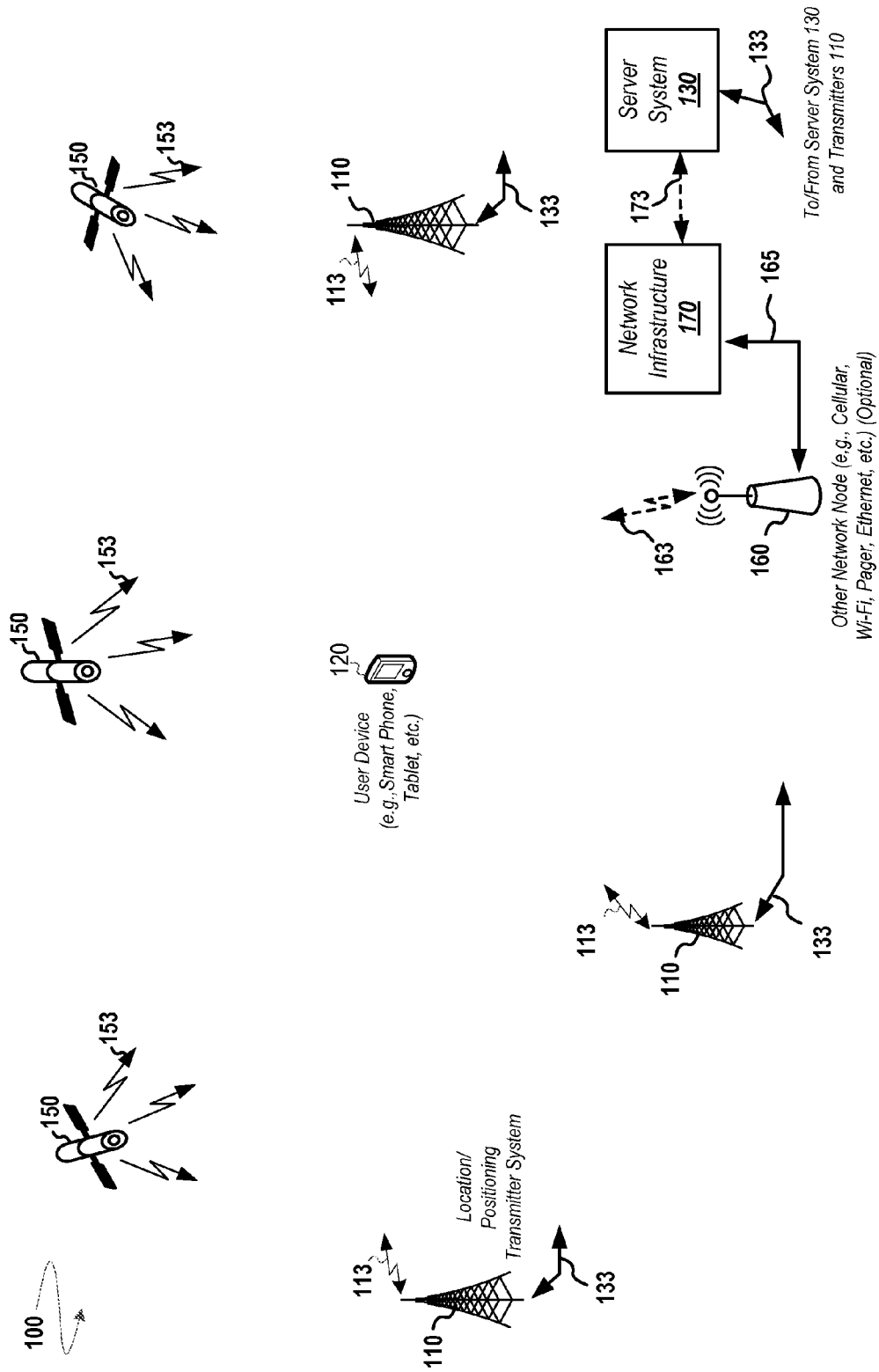
FIG. 1 illustrates an example positioning system.

FIG. 1 illustrates one example of a positioning system 100, on which various embodiments may be implemented. The system 100 is shown to include several different systems as described below, including a transmitter system 110, a receiver system 120, a server system 130, a satellite system 150 and other systems. Communication among these systems may be achieved by wired and wireless technologies known or developed later in the art.

As shown, the system 100 includes multiple terrestrial transmitters 110 that broadcast synchronized positioning signals, via communication links 113, to the receiver 120 (also denoted herein as "user device" or "mobile device"). Distances between the receiver 120 and each of the transmitters 110 are estimated in order to estimate the position of the receiver 120. Estimation of the receiver's position may take place at the receiver 120, the server system 130, or another system.

A single receiver 120 is shown in FIG. 1 for simplicity; however, a typical system will be configured to support many receivers 120 within a defined coverage area. In a large scale system different receivers 120 separated by large enough distances will typically be served by distinct sets of the transmitters 110, and such sets may be totally disjoint if the distances are large, or may have some of the transmitters 110 in common.

While most embodiments described herein relate to functionality of the transmitters 110, it is noted that the satellite system 150 may be used with the transmitters 110, or may take the place of the transmitters 110, to implement similar functionality to that disclosed in relation to those embodiments.

The transmitters 110 need not be restricted to only transmitting information, but may also have receiving functionality. For example, the transmitters 110 may receive synchronization information from other systems like the server system 130. In one embodiment, the transmitters 110 are configured to operate in an exclusively licensed or shared licensed radio spectrum; however, some embodiments may be implemented to provide signaling in unlicensed shared spectrum. The transmitters 110 may transmit signaling in these various radio bands using signaling as is described in U.S. patent application Ser. No. 13/535,128. This signaling may be in the form of a proprietary signal configured to provide specific data in a defined format that is advantageous for estimating a receiver's position. For example, the signaling may be structured to be particularly advantageous for operation in obstructed environments, such as where traditional satellite position signaling is attenuated and/or impacted by reflections, multipath, and the like. In addition, the signaling may be configured to provide fast acquisition and position determination times to allow for quick location determination upon device power-on or location activation, reduced power consumption, and/or to provide other advantages.

The receiver 120 may, by way of example, refer to part or all of a mobile device that is capable of receiving signaling, processing signaling, transmitting signaling, tracking signaling, computing position estimates, and/or carrying out various other computing operations. One example of signaling includes signals from the transmitters 110. It is noted that the receiver 120 may receive multiple delayed "copies" or "versions" or "components" of a single transmitted signal, such as a signal 113 from one of the transmitters 110 of FIG. 1. The receiver 120 often receives multiple signals corresponding to a multiplicity of multipath components as well as a direct path signal component from each of the transmitters 110. The delayed copies may be due to reflective surfaces in the operating environment, such as buildings or other structures, terrain, and the like. A fundamental limitation on performance in many positioning systems is often imposed by received multipath signals, which may be amplitude attenuated and/or phase shifted relative to a corresponding direct path signal. These delayed signals may distort the estimated time of arrival at the receiver 120, which leads to distance estimation errors and erroneous trilateration results. This can be extremely problematic in applications such as first-response during emergencies and the like. Systems and methods disclosed herein mitigate these issues.

Of course, the receiver 120 may receive other signaling, including signals from the satellite system 150 (e.g., a GNSS system) via satellite communication links 153, and other network signaling form a network node 160 (e.g., cellular, Wi-Fi, Wi-Max, pager, Bluetooth, Ethernet, and/or other nodes) via communication link 163. While signaling shown in FIG. 1 is shown as being provided from particular systems, it is noted that the signaling may be passed through intermediate systems (not shown).

Figure 2:
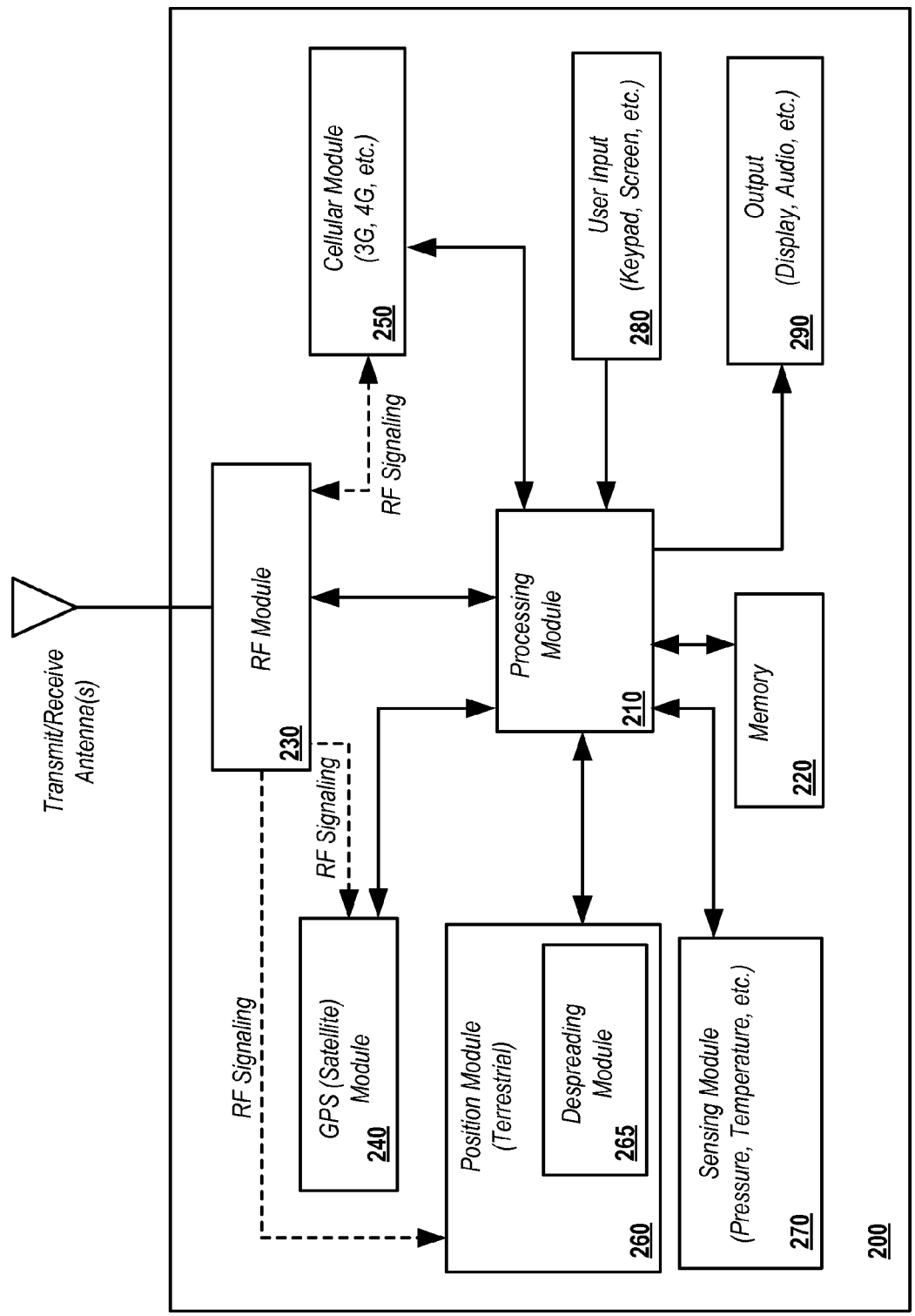
FIG. 2 illustrates an example receiver.

The receiver 120 may be embodied by various devices, including a phone, a tablet, a dedicated location device (e.g., like an asset tracker), a radio receiver, or other electronic device. In some embodiments, the receivers 120 include a location computation engine to determine positioning information from signals received from the transmitters 110, the satellite systems 150, and/or other systems like the network node 160. Depending on the embodiment, the receiver 120 may have receiving and/or transmitting functionality, both in wireless and wired configurations. In some embodiments the receivers 120 transmit information to the transmitters 110. FIG. 2, described elsewhere herein, illustrates an example receiver architecture.

The system 100 may further include a server system 130 in communication with various other systems, such as the transmitters 110 (via communication links 133), network infrastructure 170 (e.g., the Internet, cellular networks, wide or local area networks), and/or other networks. The server system 130 may include various system-related information and components, such as an index of the transmitters 110, a billing interface, one or more encryption algorithm processing modules based on one or more proprietary encryption algorithms, a location computation engine module, and/or other processing modules, each of which may facilitate position, motion, and/or position determination of things in the system 100.

The receiver 120 may transmit information (e.g., the receiver's estimated position or measurements extracted from signaling) to the server system 130 or other components via various communication network links (e.g., links 113, 163 or others). For example, in a cellular network, a cellular backhaul link 165 may be used to provide information from the receiver 120 to associated cellular carriers and/or other systems via the network infrastructure 170. This may be used to quickly and accurately locate the position of the receiver 120 during an emergency, or may be used to provide location-based services or other functions from cellular carriers or other user devices and systems.

In at least one embodiment, the transmitters 110 broadcast output signals that carry positioning information and/or other data or information to the receivers 120. The positioning signals may be coordinated so as to be synchronized across all of the transmitters 110. The transmitters 110 may use a disciplined GPS clock or other source for timing synchronization. Signal transmissions may include dedicated communication channel methodologies (e.g., amplitude, time, code, phase and/or frequency modulation and multiplexing methods) to facilitate transmission of data required for trilateration, notification to subscriber/group of subscribers, broadcast of messages, general operation of the transmitters 110, and/or for other purposes.

In a positioning system that uses a time difference of arrival approach for trilateration, positioning information that is typically transmitted from the transmitters 110 (or other beacons) includes one or more of precision timing sequences (or "ranging sequences") and positioning data, where the positioning data includes the location of transmitters and various timing corrections and other information. In one embodiment, the data may include additional messages or information such as notification/access control messages for a group of subscribers, general broadcast messages, and/or other data or information related to system operation, users, interfaces with other networks, and other system functions. The positioning data may be provided in a number of ways. For example, the positioning data may be modulated onto a coded timing sequence, added or overlaid over the timing sequence, and/or concatenated with the timing sequence.

Data transmission systems and methods described herein may be used to provide improved positioning information throughput for systems disclosed herein. In particular, the positioning data may be provided by higher order modulation transmitted as a separate portion of information from pseudo-noise (PN) timing or ranging sequences. This may be used to allow improved acquisition speed in systems employing CDMA multiplexing, TDMA multiplexing, frequency offset multiplexing (FOM) or a combination of each of these.

In one embodiment, signals are transmitted from the transmitters 110 using coded modulation called spread spectrum modulation or pseudo-noise (PN) modulation to achieve wide bandwidth. Under these embodiments, the receiver 120 includes one or more modules to receive the transmitted signals and process those signals (e.g., using a despreading circuit, such as a matched filter or a series of correlators). A waveform, which ideally has a strong peak surrounded by lower level energy, is produced, where the time of arrival of the peak represents the time of arrival of a received signal. Performing operations like this on a multiplicity of signals from a multiplicity of the transmitters 110, whose locations are accurately known, allows for the determination of the receiver's location. Various additional details related to signal generation in the transmitter 110, along with received signal processing in the receiver 120, are described elsewhere herein.

In one embodiment, the transmitters 110 use binary coded (bi-phase) modulation as the spreading method. Signals from the transmitters 110 may include two specific types of information: (1) a high speed ranging signal, and (2) position location data such as transmitter ID, transmitter position, time of day, health, environmental conditions such as pressure data, and the like. The transmitters 110 may transmit positioning information by modulating a high speed binary pseudorandom ranging signal with a lower rate information source.

Certain aspects described herein relate to methods and systems that use a pseudorandom ranging signal and a modulating information signal, both of which may utilize higher order modulations, such as quaternary or octonary modulation. In one embodiment, the ranging signal is binary phase modulated, and positioning information is provided in a separate signal using higher order modulation.

By way of example, time division multiplexing systems use transmission slots that each comprise a pseudorandom ranging signal followed by various types of location data. These systems also include a synchronization (or "sync") signal, which may be deleted if the pseudorandom ranging signal is used also as the sync signal. However, the location data of these conventional systems is normally binary, which limits throughput. To address these limitations, a binary or quaternary pseudorandom signal may be transmitted in a particular slot followed by a higher order modulated data signal. For example, in a given slot, one or more positioning information symbols may be transmitted using differential 16-phase modulation in order to transmit four bits of information per slot. This can achieve a four-fold throughput improvement versus the one bit typically transmitted when binary phase modulation is imposed upon a pseudorandom carrier. In certain, but not necessarily all, implementations of this example, adequate signal strength is assumed to be present at the receiver. Other types of modulation of positioning information may also be utilized, such as 16 QAM, and the like. In addition, certain error control modulation methods may be used for the higher level modulation, such as the use of Trellis codes. These error control modulation methods generally reduce error rates.

EXAMPLE RECEIVER SYSTEMS

Turning to FIG. 2, an example of a receiver 200 is illustrated. The receiver 200 may form part or all of the receiver 120 of FIG. 1. For example, the receiver 200 may be included in a smart phone, tablet, or other device at which transmitted positioning signals may be received and processed to determine positioning information.

As shown, the receiver 200 may include one or more GPS modules 240 for receiving GPS signals (e.g., via an RF module 230), and for determining positioning information and/or other data, such as timing data, dilution of precision (DOP) data, or other data or information as may be provided from a GPS or other positioning system. The GPS module 240 may provide the determined information to a processing module 210 and/or other modules of the receiver 200.

The receiver 200 may also include one or more cellular modules 250 for sending and receiving data or information via a cellular or other data communications system. Alternatively, or in addition, the receiver 200 may include other communications modules (not shown) for sending and/or receiving data via other wired or wireless communications networks, such as Wi-Fi, Wi-Max, Bluetooth, USB, Ethernet, or other data communication networks.

The receiver 200 may include one or more position modules 260 for receiving signals from terrestrial transmitters, such as the transmitters 110 of FIG. 1, and for processing the signals to extract positioning information (e.g., time of arrival, time of transmission) as described elsewhere herein. One example of signal processing includes multipath signal processing as described subsequently with respect to FIG. 7 through FIG. 13. The position module 260 may be integrated with and/or may share resources such as antennas, RF circuitry, and the like with other modules like the GPS module 240 and the cellular module 250. For example, the position module 260 and the GPS module 240 may share some or all radio front end (RFE) components and/or processing elements.

The processing module 210 may be integrated with and/or share resources with the position module 260 and/or other modules to determine positioning information and/or perform other processing functions as described herein. A despreading module 265 may be incorporated in the position module 260 or another module like the processing module 210, or may be a standalone module.

One or more memories 220 may be linked to the processing module 210 to provide storage and retrieval of data and/or to provide storage and retrieval of instructions for execution in the processing module 210. For example, the instructions may be used to perform the methods described elsewhere herein, such as those methods associated with signal and multipath signal processing, determining positioning information or other information, or other processing functions.

The receiver 200 may further include one or more environmental sensing modules 270 for sensing or determining various conditions, such as, pressure, temperature, motion or other measurable conditions at the location of the receiver 200.

The receiver 200 may further include various user interface modules like a user input module 280, which may be in the form of a keypad, touchscreen display, mouse, or other user interface element. Audio and/or video data or information may be provided on an output module 290, such as in the form of one or more speakers or other audio transducers, one or more visual displays, and/or other user I/O elements.

Although not shown, the receiver 200 may include a matched filter that is used to process a received spread spectrum signal. The matched filter may be implemented in the processing module 210, the position module 260, the despreading module 265, or another module. A set of correlators may be used instead of a matched filter to provide information similar to that provided by a matched filter. One of ordinary skill in the art will appreciate alternative approaches to achieve the same or similar results as a matched filter or a correlator.

EXAMPLE TRANSMITTER SYSTEMS

Figure 3:
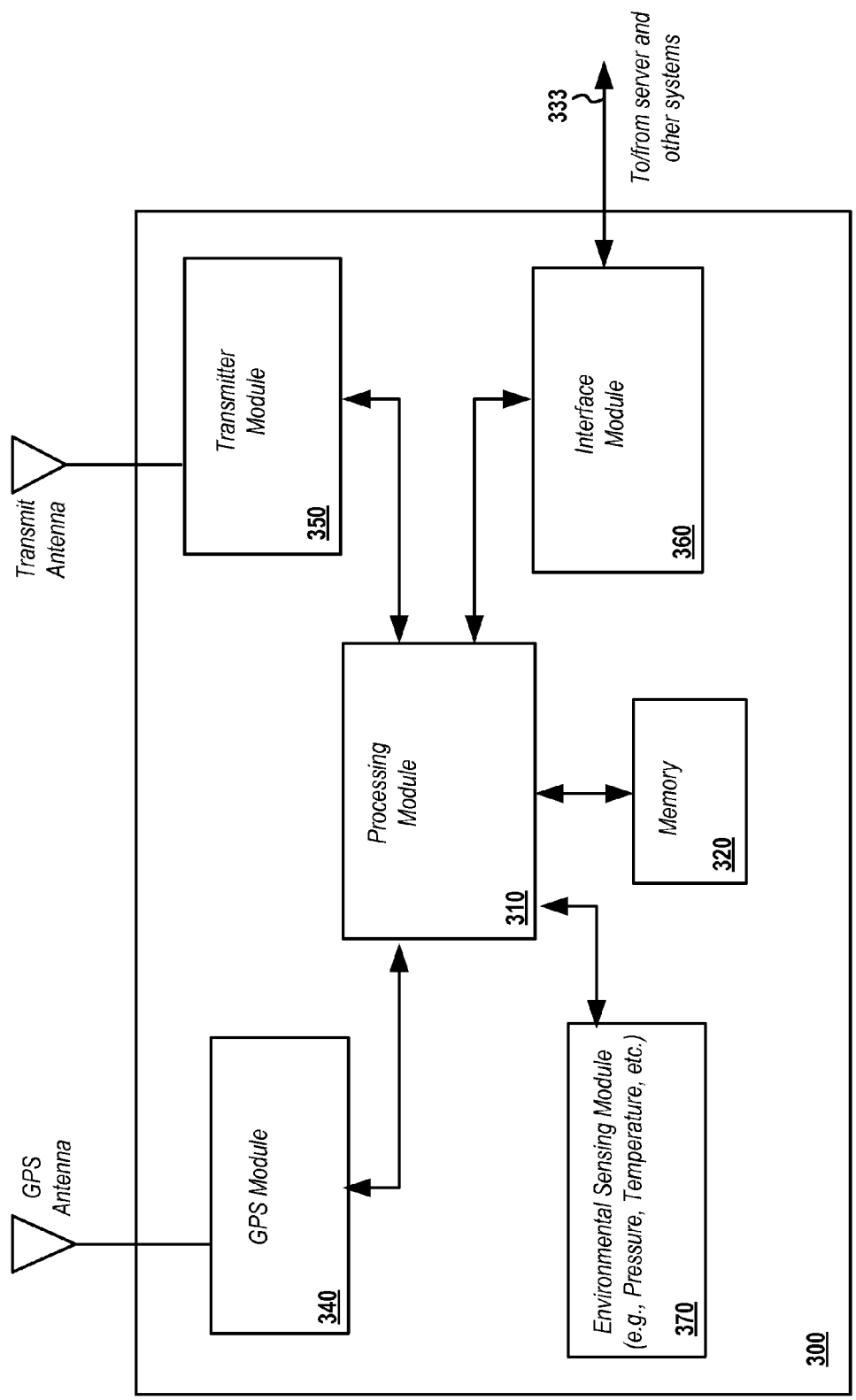
FIG. 3 illustrates an example transmitter.

FIG. 3 illustrates an embodiment of a transmitter system 300 from which positioning signals may be transmitted. The transmitter 300 may correspond with the transmitters 110 of FIG. 1. It is noted that the transmitter 300 includes various modules for performing signal generation, transmission, reception and/or processing; however, in other embodiments, these modules may be combined and/or organized differently to provide similar or equivalent operations.

As shown in FIG. 3, the transmitter 300 may include one or more GPS modules 340 for receiving GPS signals, and processing those GPS signals to determine information like timing data, dilution of precision (DOP) data, or other data. The determined information may be provided to a processor module 310. GPS or other timing signals may be used for precision timing operations within the transmitter 300 and/or for timing correction across the a network like the system 100 of FIG. 1.

The transmitter 300 may also include one or more transmitter modules 350 for generating and sending transmitter output signals to receivers. The transmitter module 350 may also include various elements as are known or developed in the art for providing output signals to a transmit antenna, such as analog or digital logic and power circuitry, signal processing circuitry, tuning circuitry, buffer and power amplifiers, and the like. Signal processing for generating the output signals may be performed in the processing module 310 which, in some embodiments, may be integrated with the transmitter module 350 or, in other embodiments, may be a standalone module for performing multiple signal processing and/or other operations.

One or more memories 320 may be coupled with the processing module 310 to provide storage and retrieval of data, and/or to provide storage and retrieval of instructions for execution in the processing module 310. For example, the instructions may be instructions for performing the various methods described herein, such as methods used for generating signals, codes, coded signals, or other information.

The transmitter 300 may further include one or more environmental sensing modules 370 for sensing or determining conditions associated with the transmitter 300, such as, for example, local pressure, temperature, or other conditions. In one embodiment, pressure information may be generated by the environmental sensing module 370 and provided to the processing module 310 for integration with other data in transmitter output signals as described elsewhere herein.

One or more interface modules 360 may also be included in the transmitter 300 to provide an interface between the transmitter 300 and the server system 130 of FIG. 1 or to other systems. In some embodiments, the server system 130 of FIG. 1 sends information to the transmitters 110 via the interface module 360.

Attention is now turned to different approaches for generating signals, selecting codes (or "pseudorandom sequences"), coding the signals with the codes, transmitting the coded signals, and/or processing the coded signals after they are received by a receiver.

EXAMPLE APPROACHES

Various embodiments relate to systems and methods that use codes (or "pseudorandom sequences") for various reasons, such as mitigating the effects of multipath. Such systems and methods may use transmitters that generate and transmit coded signals, and receivers that process the coded signals, as discussed in further detail below.

In one or more embodiments, codes with very good auto- and cross-correlation properties are used. Such codes may be used in multiple access systems employing CDMA multiplexing, TDMA multiplexing, frequency offset multiplexing (FOM) or a combination of CDMA, TDMA, and FOM. The different possible combinations are referred to as "hybrid" multiplexing.

As noted previously, a positioning system includes multiple beacons that broadcast positioning signals to receivers. Examples of such beacons include the transmitters 110 and/or satellites 150 of FIG. 1. Such positioning systems are often impacted by multipath in urban environments. Under circumstances where multipath is present, the receiver may receive a multiplicity of signals from one or more of the beacons, where the multiplicity of signals correspond to a multiplicity of direct and multipath signals. The range of delays associated with the multipath signals, also referred to as the delay spread, is typically constrained by geometric situations in the particular operating environment. For example, a delay spread of 1 microsecond may correspond to a maximum differential path length of 300 meters, and a spread of 5 microseconds may correspond to 1500 meters.

In one embodiment, for example, a system transmits coded modulated signals in the form of spread spectrum modulation or pseudo noise (PN) modulation to achieve wide bandwidth. A receiver processes such signals with a despreading circuit. Such a receiver produces a waveform which ideally has a strong peak surrounded by lower level energy. The time of arrival of the peak represents the time of arrival of the measured signal at the receiver. Performing this operation on measured signals from several beacons (e.g., four beacons), whose locations are accurately known, allows determination of the receiver's location via trilateration.

If multipath is present, a matched filter processes the received spread spectrum signals, and its output produces a series of possibly overlapping sharp pulses of varying amplitudes, delays and phases. The signals are processed to estimate the time of arrival of the earliest pulse. A variety of algorithms may be used for this purpose, such as leading edge location algorithms, MUSIC algorithm, minimum mean square estimation algorithms, and the like.

One problem that arises, however, is that the energy surrounding the peak typically contains a series of subsidiary peaks, or "side lobes." The structure of such side lobes in a preferred situation (e.g., no to low noise or multipath) is described by a function called the "autocorrelation function".

In multipath environments, these subsidiary peaks may be confused with a weak early signal arrival. For C/A civilian codes in a GPS system, for example, certain binary codes called "Gold Codes" are often used. These codes are typically of a frame length of 1023 symbols or "chips". A matched filter receiving such a Gold code produces a set of side lobes of amplitude $-65/1023$ times the peak amplitude, $63/1023$ times the peak amplitude and $-1/1023$ times the peak amplitude. Thus, the magnitude of the largest side lobe is approximately 0.06 times the peak amplitude, or $-24$ dB. Typically these large amplitude side lobes may be adjacent to or close to the peak amplitude of the autocorrelation function. In a severe multipath environment (e.g., in urban canyons of cities) one seeks much better side lobe rejection, at least within a range about the autocorrelation function peak. U.S. patent application Ser. No. 13/535,626, entitled CODING IN WIDE AREA POSITIONING SYSTEMS, filed Jun. 28, 2012, and U.S. patent application Ser. No. 13/536,051, entitled CODING IN WIDE AREA POSITIONING SYSTEM (WAPS), filed Jun. 28, 2012, provide methodologies for choosing codes with very good side lobe rejection. Although various algorithms (such as the MUSIC algorithm) can in principle deal with side lobes of varying levels, simulations have indicated that, in real world situations, such side lobes are often confused with true early signals, or they hide early signals. This is particularly true when the processed signal-to-noise ratios are low.

It is noted that, the terms autocorrelation and cross-correlation may refer to circular autocorrelation and circular cross-correlation. This is appropriate since in typical system implementations, repeated sequences are used to thereby allow the correlation operations to appear to be approximately circular. In some cases, attention may be placed upon restricted ranges of code offsets, in which case even if the codes do not repeat, the autocorrelations and cross-correlations over restricted ranges may be approximated as those of a circular variety.

Under many circumstances, multiple transmitters are transmitting signals simultaneously, and/or transmitted signals are received concurrently by a receiver whose position is to be determined. It is necessary for such a receiver to distinguish such signals from one another in order to determine the times of arrivals of the individual signals in support of trilateration processing. In order to accomplish this, at least two approaches may be utilized: (1) choose codes that are used by different transmitters with good cross-correlation properties and (2) utilize signal processing and filtering methods to further reduce the cross-correlations. Consequently, approach (1) requires having sets of codes whose members have excellent autocorrelation side lobe properties (e.g., at least over a limited range about the location of the autocorrelation peak), and the cross-correlation rejection between different members should be low. Approach (2) includes the use of an additional multiplexing method, termed "Frequency Offset Multiplexing (FOM)," as described in U.S. patent application Ser. No. 13/565,614, entitled CELL ORGANIZATION AND TRANSMISSION SCHEMES IN A WIDE AREA POSITIONING SYSTEM, filed Aug. 2, 2012, U.S. patent application Ser. No. 13/565,732, entitled CELL ORGANIZATION AND TRANSMISSION SCHEMES IN A WIDE AREA POSITIONING SYSTEM, filed Aug. 2, 2012, and U.S. patent application Ser. No. 13/565,723, entitled CELL ORGANIZATION AND TRANSMISSION SCHEMES IN A WIDE AREA POSITIONING SYSTEM, filed Aug. 2, 2012. In FOM, different transmitted signals may utilize slightly different carrier frequencies. By integrating such signals over a long interval—e.g., an interval equal to a multiplicity of PN frame periods—a receiver may achieve significant cross-correlation rejection, particularly if the multiplicity is chosen in a special manner related to the frequency offsets between carriers. The carrier frequencies of FOM are typically chosen to be a in a set of frequencies that are offset from a base frequency. The offset set is often formed as a multiple of a minimum offset size.

In approach (2), the carrier frequencies of differing, but typically neighboring, transmitters are chosen to be slightly offset from one another—e.g., typically by values less than 1%. The transmitting signals include a repetition of a code. The receiver may integrate over a multiplicity of such repetitions, i.e., a multiplicity of frames, and it may thereby achieve very large additional rejection of other simultaneously received signals having different frequency offsets.

By properly choosing the frequency offset parameters and the number of frames integrated, the receiver may eliminate the cross interference from the other simultaneously transmitted or concurrently received signals. The effectiveness of this approach is limited however, in the presence of Doppler that is induced by motion of the receiver. Nevertheless, approach (2) in most cases provides significant improvement over use of approach (1) alone.

Consequently, for an embodiment of a system incorporating CDMA and FOM, it is desirable that a set of codes be chosen in view of the following objectives:
  (i) each code should have preferred autocorrelation side lobe properties—e.g., at least over a limited range about the location of the autocorrelation peak; and
  (ii) each pair of different codes should have good cross-correlation properties for all possible frequency offset differences.

In the evaluation of the second objective (ii), the cross-correlation may be performed over an interval equal to the code period.

In order to meet the above objectives, the following procedures may be used in at least one embodiment:
  (i) choose a large set of codes, each of which has preferred autocorrelation properties at least within a zonal region about the autocorrelation peak location; and
  (ii) from the chosen set of codes, examine subsets of these codes to determine a subset such that all pairs of different code in the subset have preferred cross-correlation properties, either for all pairs of members (when FOM is not used) or for all pairs of members over all possible frequency offset differences (when FOM is used).

References to codes with different frequency offsets may refer to signals or waveforms that are modulated both with coded modulation as well as having their carrier frequencies chosen according to a set of frequencies. For brevity, codes with different frequency offsets are identified without explicitly mentioning such a signal or waveform.

In some implementations, such as when FOM is not employed, it is advantageous only to determine a subset such that all pairs of codes have good cross-correlation properties for zero frequency offset. In certain embodiments, a performance criterion is established, which specifies a relationship between members of a chosen subset of codes, and then a final subset of codes is chosen to optimize the criterion. Of course, other criteria could include different measures. For example, if the codes in a set are code phase shifted versions of one another, one might choose as a criterion: identifying a subset of codes, by comparison to a multiplicity of other subsets of codes, that has the largest possible code phase shifts relative to one another.

It is noted that a preferred measure of the quality of the autocorrelation property is the maximum magnitude of the autocorrelation peak, except for that at the peak, within a zonal region about the autocorrelation peak location. In some embodiments, the preferred autocorrelation performance for a set of codes may be more important than the preferred cross-correlation performance of that set or a subset of codes from the set. In one embodiment, this maximum zonal autocorrelation magnitude about the peak is chosen to be less than that of the cross-correlation peak magnitude (e.g., for all codes in a chosen subset) by some value. For example, the autocorrelation magnitude may be equal to or less than one-half ($\frac{1}{2}$) of the cross-correlation peak magnitude. Alternatively, the autocorrelation magnitude may be equal to or less than one-tenth ($\frac{1}{10}$) of the cross-correlation magnitude, which may be preferred in some embodiments. A strict autocorrelation condition may be required for situations when there is significant multipath in order to maximize the probability of detecting a direct path signal. It is noted, however, that different threshold conditions are possible with values below $\frac{1}{10}$, above $\frac{1}{2}$, and between $\frac{1}{2}$ and $\frac{1}{10}$, depending on system requirements.

Less desirable conditions, like where the ratio or difference between the autocorrelation magnitude and the cross-correlation magnitude would not achieve a desired result, may be recognized and used to exclude codes from use, subsets of codes, or sets of codes, instead of identifying desirable codes, subsets or sets. Other quality measures are possible, such as the RMS value of the magnitudes in the zonal region, the second largest magnitude in the zonal region, and the like.

In one embodiment, a criterion of preferred quality of the cross-correlation property is the largest cross-correlation value over all possible code phases and frequency offsets. Other criteria may be used such as only considering the maximum cross-correlation over restricted code phase regions, or the RMS value of the cross-correlation, among others. The quality measures of the autocorrelations and cross-correlations may differ. In many of the examples that follow, the quality measures utilized are the maximum autocorrelation magnitude, except at the peak location, and the maximum cross-correlation magnitude. This is provided for the purposes of clarity. However, as indicated above, many other quality measures may be utilized in substitution for these quality measures.

It is noted that the approaches described herein apply to a variety of possible coded signals. One common spreading method uses binary coded modulation that incorporates binary codes such as Gold Codes, maximal length codes, Kasami Codes, and the like. Other spreading methods utilize quaternary coding sequences in which the two bits per code interval or chip determines one of four carrier phases to be transmitted. There are direct methods of choosing such quaternary sequences, as well as methods in which a combination of two codes, such as Gold Codes are used, as described in U.S. patent application Ser. No. 13/565,614, entitled CELL ORGANIZATION AND TRANSMISSION SCHEMES IN A WIDE AREA POSITIONING SYSTEM, filed Aug. 2, 2012, U.S. patent application Ser. No. 13/565,732, entitled CELL ORGANIZATION AND TRANSMISSION SCHEMES IN A WIDE AREA POSITIONING SYSTEM, filed Aug. 2, 2012, and U.S. patent application Ser. No. 13/565,723, entitled CELL ORGANIZATION AND TRANSMISSION SCHEMES IN A WIDE AREA POSITIONING SYSTEM, filed Aug. 2, 2012.

It is noted that there are other sets of codes which use codes whose elements are defined by digital words with a larger number of bits than two. All of these code types may be utilized in the choosing of the desired code set using the same or a similar procedure to identify code sets having both good autocorrelation and cross-correlation properties.

In one embodiment, a subset of binary maximal length sequences may be used. For this embodiment, the sequence length is chosen to be 2047 chips with a chip rate of 2.047 MHz, which produces a PN frame duration of 1 msec. The autocorrelation of a maximal length sequence is nearly ideal in that the side lobes are all of value −1/2047 relative to the peak value. A search was performed on the set of maximal length sequences of length 2047 for good cross-correlation properties between members of a subset of such sequences, across both code phase offset and frequency offset, with the latter in the range 0 to 8 kHz. An ordered list of good PN codes having these properties is provided in the table of FIG. 4. In particular, the first 30 codes (i.e., those above the bold horizontal line) had cross-correlation of around −20.9 dB whereas when additional PN codes (i.e., those below the bold line) are included, this increases to around −17 dB. Hence, the choice of the subset of the first 30 codes improves cross-correlation rejection by around 4 dB. Restricting this set to the first 15 codes improves the cross-correlation rejection by another 0.7 dB.

Figure 5:
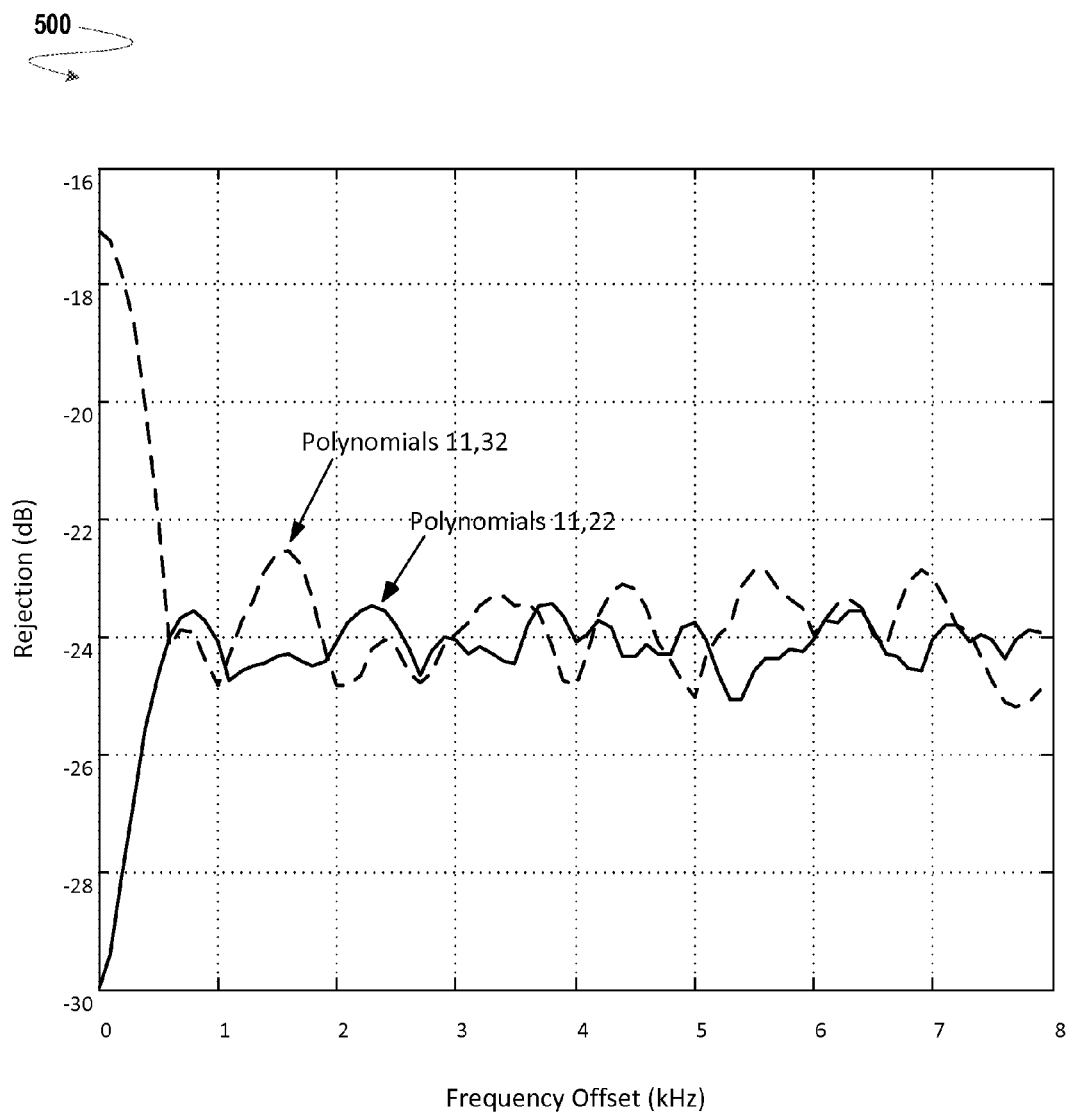
FIG. 5 illustrates an example cross-correlation rejection between selected codes.

In certain embodiments, the greatest improvement in cross-correlation rejection is for offset frequency differences in the range 0 to 1 kHz. FIG. 5 shows cross-correlation rejection graph 500 for two pairs of codes, the first pair with the polynomials 11 and 22 and the second pair with polynomials 11 and 32. The plotted points show a poor cross-correlation rejection over all code phases for a frequency offset between codes provided along the abscissa. One can see that the second pair has significantly poorer cross-correlation rejection in the range 0 to 1 kHz. Hence choosing codes in accordance with this embodiment produces codes with good autocorrelation performance and, furthermore, has significant advantages for cross-correlation rejection when CDMA and FOM are used, or for the case of CDMA alone. In the above analysis, performance may be analyzed over a continuous range of frequency offsets, even though in practice the offsets are typically chosen to be a small discrete set. However, the presence of Doppler upon the ranging signals can alter the apparent offsets between concurrently received signals, and hence it is necessary to consider a more continuous range of offsets for choosing preferred sets of codes, especially if the receiving platform undergoes significant velocity.

Figure 6:
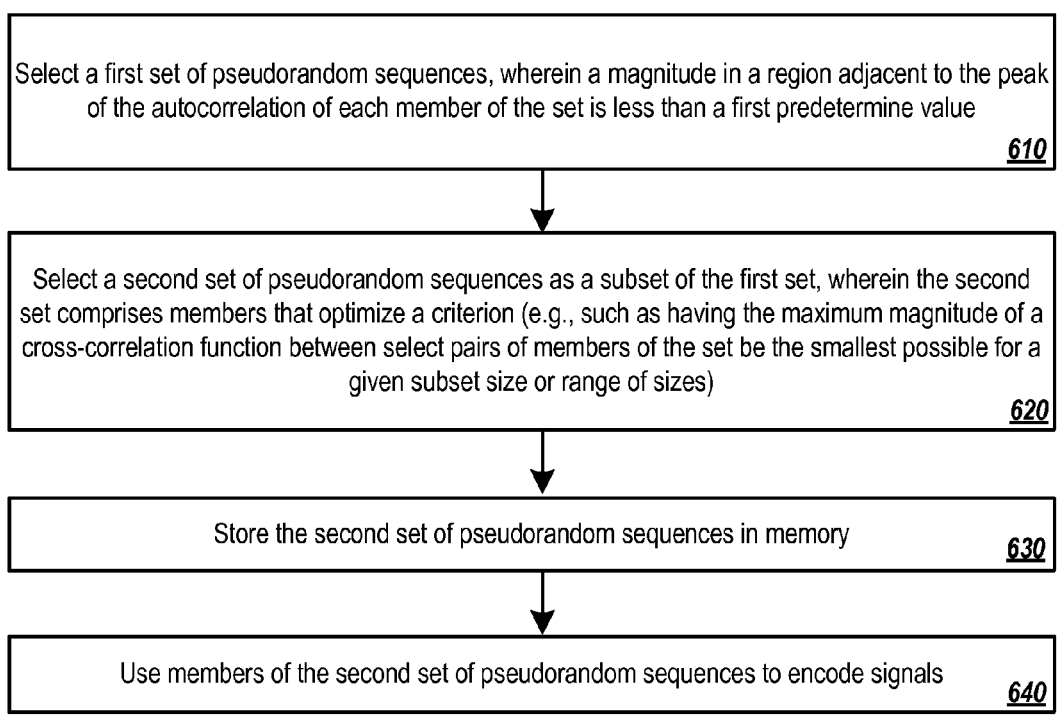
FIG. 6 illustrates details of an example method for generating a set of codes.

FIG. 6 illustrates a process 600 for identifying a set of codes for use in a positioning system, such as for encoding at least a portion of a positioning signal. At stage 610, a first set of codes may be selected. For example, the first set of codes may be selected such that the magnitude of the autocorrelation function (except at the peak) of each member of the set is less than a predetermined value or threshold. At stage 620, a second set of codes may be selected as a subset of the first set, where the second set of codes optimize a criterion. Subsets of the same or similar size may be analyzed to determine which subset optimizes or achieves preferred results in relation to the criterion, such as having the maximum magnitude of a cross-correlation function between select (e.g., all) pairs of members of the subset be the smallest possible for a given subset size or range of sizes by comparison to other subsets.

Note that for a subset of size M distinct codes, a calculation of the maximum cross-correlation magnitude over all pairs comprises computing the maximum cross-correlation for each of M×(M−1) codes pairs and then finding the maximum of these M×(M−1) maxima. Furthermore, if the subsets are chosen from a set of N distinct codes, then there are N!/[(M!)(N−M)!] possible subsets to choose from. For example if N=20 and M=10, the number of distinct subsets are 184756. Hence, in some cases choosing N extremely large may result in very long computation times for subset optimization.

As an alternative to 620, the second set of codes may be selected as a subset of the first set, where the second set of codes merely achieves (rather than optimizes) a criterion. For example, the criterion to be achieved may be that the maximum magnitude of the cross-correlation function between pairs of members be less than a second predetermined value. This approach of achieving vs. optimizing may be preferable, for example, when the maximization is too laborious to compute, or where some additional constraints may be placed upon the subset of codes. Of course, more than one subset may meet such a criterion, at which point the remaining subsets that meet the criterion may be further evaluated against each other or yet another criterion to select one or more subsets from those subsets for use.

Subset sizes that are similar may be those that fall within a range of sizes (e.g., the size of the sets may be S+/−X, where X may be selected depending on the circumstances, and may be a small percentage like 10% of S).

As previously stated, when optimizing a criterion, for example, the second set may be selected such that it minimizes the maximum magnitude of the cross-correlation function between all pairs of members of the second set relative to other subsets. Selecting the second set in this manner may be used to minimize the value of cross-talk in a receiver during matched filter or correlation processing. At stage 630, the second set of codes may be stored in a memory. By way of example, the memory may be in the server system 130 or in a transmitter 110 of FIG. 1, or another system (not shown). If the memory is in the server system 130, the second set of codes may be provided, at stage 640, to one or more transmitters for use in encoding positioning signals for transmission to a receiver.

FIG. 7 illustrates a process 700 for encoding at least part of a positioning signal using a code from a set of codes. At stage 710, a set of codes are selected. By way of example, all members of the set have a magnitude of their autocorrelation function (except at the peak) less than a predefined value. At stage 720, a positioning signal is generated and at least part of the positioning signal is encoded using a code selected from a subset codes that form part of the set of codes selected at stage 710. By way of example, the subset is selected over another subset because it optimizes a criterion. The selected code may be selected by the transmitter, or provided to the transmitter from another system (e.g., the server system 130 of FIG. 1).

At stage 730, the generated positioning signal may be transmitted from the transmitter and received at one or more receivers. The receivers may look up or generate the selected code for use in demodulating and/or decoding the received positioning signal. In one embodiment, multiple positioning signals are transmitted from different transmitters to the receiver, where each positioning signal is encoded using a different code from the same subset of codes.

FIG. 8 illustrates a process 800 for receiving positioning signals in a system using certain codes. Various devices may receive the positioning signals, including the receiver 120 of FIG. 1, the receiver 200 of FIG. 2, or another system. At stage 810, a first positioning signal is received from a first transmitter. The first positioning signal is encoded at least in part using a first code from a set of codes with desired autocorrelation properties, and further selected from a subset of codes that optimize a performance criterion, such as having magnitudes of cross-correlation functions between all pairs of members of the subset that are less than a predetermined threshold. At stage 820, a second positioning signal, from a second transmitter, is received at the receiver. The second positioning signal is encoded with a second code from the subset of codes. At stage 830, the received first positioning signal and the received second positioning signal are processed to determine positioning information, such as described in the incorporated references, elsewhere herein or otherwise understood in the art. For criterion relating to minimizing cross-correlation, the crosstalk associated with the first signal will be minimized when processing the second signal. Similarly, the crosstalk associated with the second signal will be minimized when processing the first signal. A similar procedure may be used when receiving three or more signals, as would be understood by one of ordinary skill.

Figure 9:
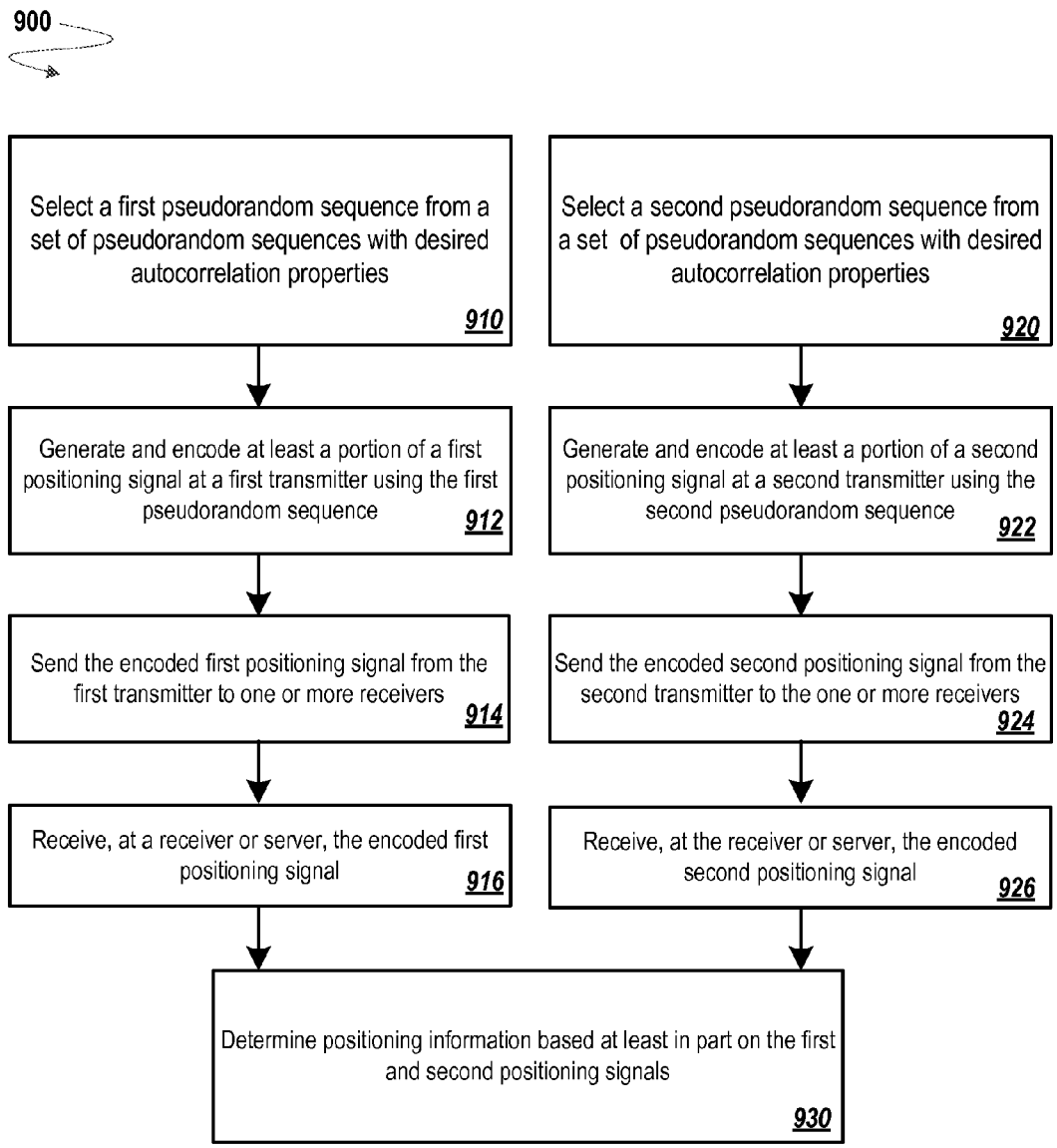
FIG. 9 illustrates an example method for receiving signals from two or more transmitters, and for extracting information from the received signals to be used to estimate a position of a receiver.

FIG. 9 illustrates details of a process 900 for transmitting positioning signals in a system from two (or more) transmitters, and processing the signals after they are received to determine positioning information at a corresponding receiver. Stages 910 through 914 represent stages performed at a first transmitter, and stages 920-924 represent stages performed at a second transmitter. These stages may be implemented simultaneously in both transmitters. The signals from each are received at a receiver at times that differ primarily due to differences in the ranges from both of the transmitters to the receiver. At stage 910, a first code is selected from a set of codes, where members of the set of codes all have autocorrelation functions (except at the peak) less than a predetermined value. At stage 920, a second code is similarly selected from the set of codes. In one embodiment, the first and second codes are selected from a subset of the set of codes to optimize a performance criterion. The performance criterion may, for example, specify that the subset only include codes that minimize the maximum magnitude of the cross-correlation for a given subset size or range of subset sizes (e.g., subsets that include n+1–k sequences, where k can be any number depending on the circumstances, and preferably no more than a fraction of n).

The first and second codes may be selected well in advance of transmission of positioning signals, and may be generated in a system other than the first and second transmitters, such as the server system 130 of FIG. 1, before being communicated to the first and second transmitters, which may be transmitters such as two of the transmitters 110 of FIG. 1. Alternatively, the first and second codes may be generated in one or both of the first and second transmitters, and/or may be communicated between the first and second transmitters to coordinate which code each transmitter will use.

At stages 912 and 922, first and second positioning signals may be generated at the first and second transmitters, where the first and second positioning signals being encoded at least in part using the corresponding first and second codes, respectively. At stages 914 and 924, the first and second positioning signals may be transmitted from the first and second transmitters, and both signals may be received at a receiver at stages 916 and 926. At stage 930, positioning information (e.g., time of transmission, time of arrival, location of the transmitters, other information) may be determined based at least in part on the first and second positioning signals. This determination may occur at the receiver, or another system (e.g., the server system 130 of FIG. 1). The positioning information may be determined using, for example, signal processing techniques as described herein and in the incorporated references, or otherwise known by one of ordinary skill in the art.

Figure 10:
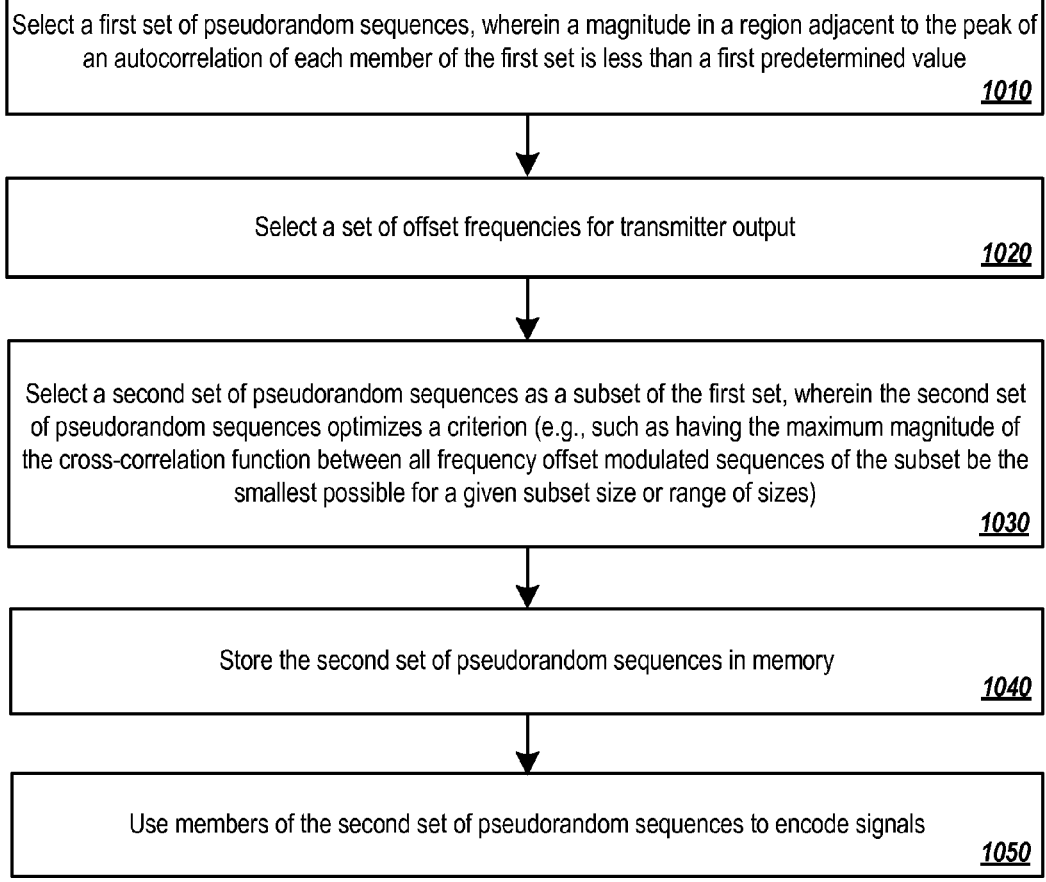
FIG. 10 illustrates an example method for generating a set of codes in association with frequency offset multiplexing (FOM).

FIG. 10 illustrates a process 1000 for identifying a set of codes for use in a positioning system, such as for encoding at least a portion of a positioning signal. At stage 1010, a first set of codes may be selected. For example, the first set of codes is selected such that the magnitude of the autocorrelation function, in a region adjacent to the peak, of each member of the first set is less than a predetermined value or threshold. At stage 1020 a set of offset frequencies, for use in generating transmitter carrier frequencies offset from a reference (or base) frequency, are selected. At stage 1030, a second set of codes are selected as a subset of the first set in accordance with a performance criterion. For example, the second set may be selected such that the maximum magnitude of the cross-correlation function between all pairs of members of the second set, modulated by offset carriers, is below a threshold—e.g., is the smallest possible for a group of subsets at all frequencies of a set of offset frequencies. Selecting the second set this way may be used to minimize the value of cross-talk in a receiver during matched filter or correlation processing. At stage 1040, the second set of codes may be stored in a memory. The memory may be in the server system 130 or a transmitter 110 of FIG. 1, or another system. If the memory is in the server system 130, the second set of codes may be provided, at stage 1050, to one or more of the transmitters 110 for use in encoding positioning signals. The method for storage of the codes is typically based upon the specification of linear feedback shift registers; however, many alternatives exist, such as indices of a code set, relative delays between codes, and even a listing of each constituent element (e.g., bits or words) of the code sequences.

FIG. 11 illustrates a process 1100 for transmitting a positioning signal from transmitter, such as one of the transmitters 110 of FIG. 1, where the positioning signal is encoded at least in part using a code from a set of codes. At stage 1110, a code may be selected from the set of codes. For example, all members of the set may have a magnitude of their autocorrelation function (except at the peak) less than a predefined value. In addition, all members of the set may optimize a criterion, such as where the cross-correlation magnitude between set members at all offset frequencies within a set of offset frequencies is less a threshold value. The code may be selected in a transmitter or provided to the transmitter from another system, such as the server system 130 of FIG. 1.

At stage 1120, a positioning signal may be generated in a transmitter. At least a portion of the positioning signal may be encoded using the selected code. At stage 1130, the generated positioning signal may be transmitted from the transmitter and may then be received at one or more receivers. The receivers may have the code or the set of codes stored in a memory for use in demodulating and/or decoding the received positioning signal. In one embodiment, multiple positioning signals are sent from different transmitters to the receiver, where the different transmitters use the same or different offset frequencies.

FIG. 12 illustrates a process 1200 for receiving encoded positioning signals at a receiver using FOM. At stage 1210, a first positioning signal is received at a receiver from a first transmitter. The first positioning signal is encoded at least in part using a code selected from a set of codes. By way of example, the set of codes have desired autocorrelation properties and optimize another performance criterion involving the relationship of the codes to one another and a set of offset carrier frequencies. For example, the criterion may include having magnitudes of cross-correlation functions between all pairs of members of the set be less than that of another set of codes at all of a plurality of offset frequencies. At stage 1220, a second positioning signal from a second transmitter is received at the receiver. The second positioning signal may be encoded with a second code chosen in a similar manner to that of the first positioning signal (e.g., chosen from the set of codes). At stage 1230, the received first positioning signal and the received second positioning signal may be processed at the receiver or elsewhere (e.g., a server system) to determine positioning information in a manner described elsewhere herein or in the incorporated references, or as is known by one of ordinary skill in the art.

Figure 13:
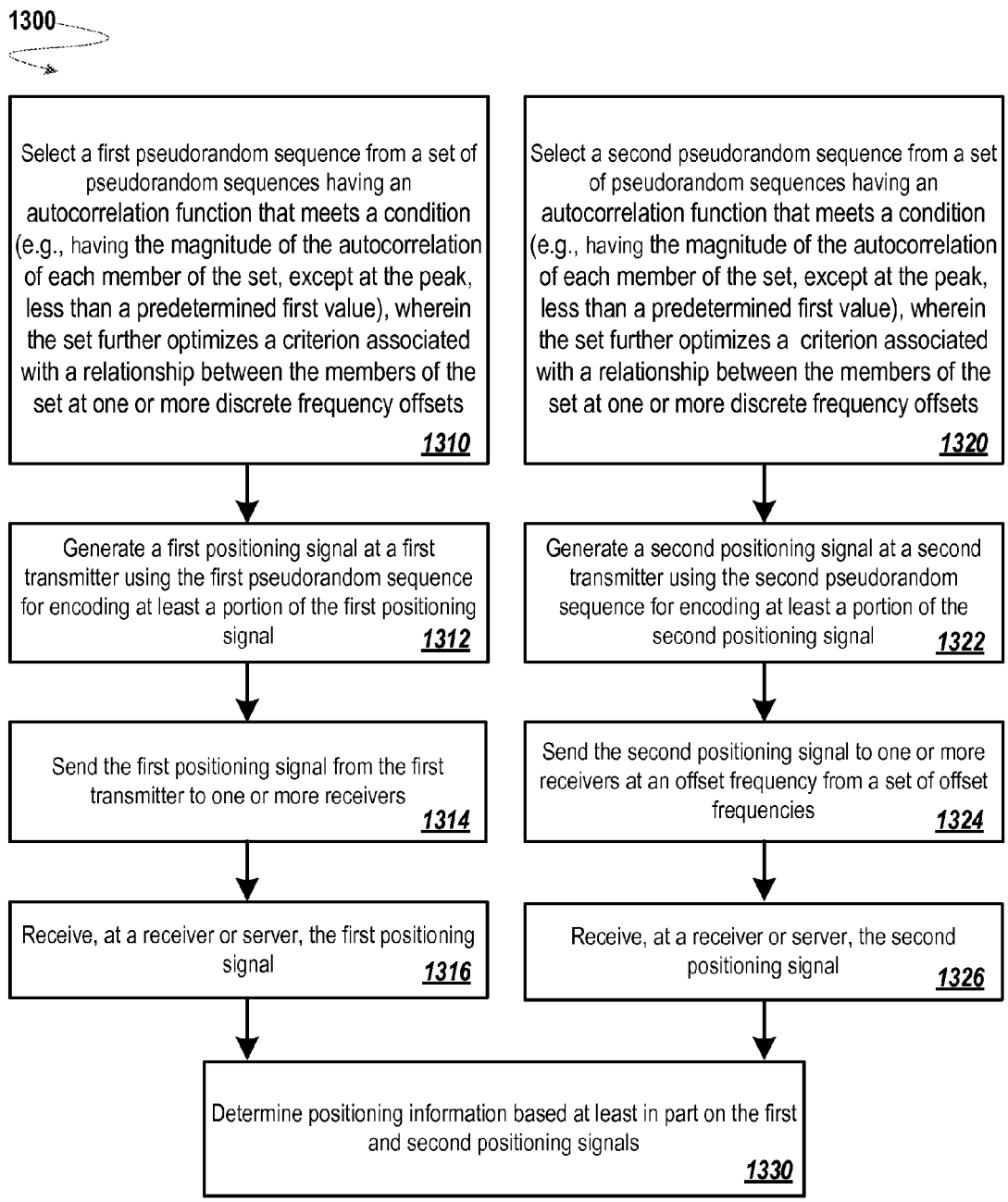
FIG. 13 illustrates an example method for receiving signals from two or more transmitters in association with FOM, and for extracting information from the received signals to be used to estimate a position of a receiver.

FIG. 13 illustrates a process 1300 for transmitting positioning signals in a positioning system using FOM. Each of the positioning signals is transmitted from a different transmitter of two or more transmitters. The process 1300 further relates to receiving and processing the positioning signals in order to determine positioning information. Stages 1310 through 1314 represent stages that are performed at a first transmitter, and stages 1320-1324 represent stages that are performed at a second transmitter. These stages may be implemented simultaneously in both transmitters such that the positioning signals from each transmitter are received at a receiver at times that differ mainly due to differences in the path lengths between transmitters and the receiver. At stages 1310 and 1320, a first code and a second code are selected from a set of codes, where members of the set of codes all have autocorrelation functions less than a predetermined value—e.g., a magnitude of the autocorrelation of each member of the set, except at the peak, less than a predetermined first value. The members of the set may further meet a performance criterion that specifies a relationship between all members of the set at all offset frequencies of a set of offset frequencies. For example, the criterion may specify a threshold condition that must be met by the maximum magnitude of the cross-correlation between pairs FOM modulated codes, where the offset frequencies may be within a specified range The first and second codes may be selected well in advance of transmission of positioning signals, and may be generated at the server system 130 of FIG. 1 before being communicated to the first and second transmitters. Alternatively, the first and second codes may be generated in one or both of the first and second transmitters, and/or may be communicated between the first and second transmitters to coordinate which of the codes will be used by the first and second transmitters.

At stages 1312 and 1322, first and second positioning signals are generated at the first and second transmitters, where the first and second positioning signals are encoded at least in part using the corresponding first and second codes, respectively. At stages 1314 and 1324, the first and second positioning signals are transmitted from the first and second transmitters. In one embodiment, one of the signals is offset by an offset frequency from the set of offset frequencies. Both transmitted signals may be received at a receiver at stages 1316 and 1326. At stage 1330, positioning information is determined based at least in part on the first and second positioning signals. The positioning information may be determined using, for example, signal processing techniques as described herein and in the incorporated references, or that are known by one of ordinary skill in the art.

In a manner similar to the discussion respect to FIG. 6, the option to optimize a criterion in FIGS. 7-13 may be replaced by merely meeting a criterion. This may be done, for example, when the optimization is too laborious to compute or where some additional constraints may be placed upon the subset of codes.

Additional Embodiments Involving Identification and Use of Codes

In these embodiments, systems and methods are described for determining the position of a receiver. The positioning system of an embodiment comprises a transmitter network including transmitters that broadcast positioning signals. The positioning system comprises a receiver that acquires and tracks the positioning signals. A method of determining position of an embodiment comprises receiving, at a receiver, positioning signals that are transmitted from a transmitter network comprising a plurality of transmitters.

Selection of spreading codes provides improved structure to allow multipath mitigation for positioning systems. In particular, binary codes, quaternary and other non-binary spreading codes with very good auto and cross correlation properties over limited code phase ranges are contemplated. Non-binary codes allow higher data rates than binary codes, such as those used in the Global Positioning System (GPS). These codes may be used in systems employing CDMA multiplexing, TDMA multiplexing, frequency offset multiplexing or any combination of these.

Systems and methods are described for determining position by selecting a set of digital pseudorandom sequences. The magnitudes of the cross-correlation function between any two sequences of the chosen set are below a specified threshold. A subset of digital pseudorandom sequences are selected from the set such that the magnitudes of the autocorrelation function of each member of the subset, within a specified region adjacent to a peak of the autocorrelation function, are equal to or less than a prescribed value. Each transmitter of a network of transmitters transmits a positioning signal, and at least a portion of the positioning signal is modulated in accordance with at least one member of the subset. At least two transmitters of the network of transmitters modulate respective positioning signals in accordance with different members of the subset of digital pseudorandom sequences.

Furthermore, systems and methods are described for determining position by selecting a set of digital pseudorandom sequences. The magnitudes of the autocorrelation function of any two sequences of the chosen set of digital pseudorandom sequences are below a specified threshold, within a region adjacent to a peak of the autocorrelation function. A subset of digital pseudorandom sequences are selected from the set such that the magnitudes of the cross-correlation function of any pair of sequences within the subset of digital pseudorandom sequences are equal to or less than a prescribed value. Each transmitter of a network of transmitters transmits a positioning signal, and at least a portion of the positioning signal is modulated in accordance with at least one member of the subset. At least two transmitters of the network of transmitters modulate respective positioning signals with different members of the subset of digital pseudorandom sequences.

In the following description one may think of the auto-correlation (or cross-correlation) function as a set of time samples. With this understanding, the terminology "region" means a set of consecutive time samples of the function within a time interval specified by this region. The term "adjacent" means nearby. When it is stated that the autocorrelation function (or cross-correlation function) magnitudes are below a threshold within a region, what is meant is that each time sample of the autocorrelation function (or cross-correlation function) within this region has its magnitude below a threshold within a region. If a region is not specified then what is meant is every time sample. Depending upon the sequences employed, the cross-correlation function may be real or complex. The autocorrelation function is a real function but may be positive or negative. In most cases interest is in the magnitudes of such functions, and their polarities and or phases are of less concern. Since the autocorrelation function is symmetric about its peak value (which is positive), if such a function has magnitudes less than some threshold, within a region located above the position corresponding to the peak location, then there is necessarily a symmetrically disposed region situated below that of the peak location for which the autocorrelation magnitudes are also less than this threshold. This is in general not true for cross-correlation functions.

The following description includes use of the terminology that a signal is modulated in accordance with, or according to, a pseudorandom or other sequence. This means that the selection, or the changes, of waveforms transmitted during successive (typically small) intervals of time are chosen in accordance with the successive elements of the sequence. Normally (but necessarily), a fixed mapping is made from the value of the sequence to the waveform selection or change. Examples of embodiments include pseudorandom binary sequences whose values are used to phase shift at regular intervals a carrier by either 0 or 180 degrees. An alternative embodiment example is a pseudorandom quaternary sequence whose (one of four) values are used to phase shift a carrier by 0 degrees, 90 degrees, 180 degrees or 270 degrees. However, the embodiments herein are not limited to regular or irregular phase shifts, or regular or irregular intervals, but may apply to a variety of modulation methods, for example, frequency shifting, on-off keying, differential phase shift keying, pulse width modulation, etc. In some instances, for reasons of brevity, terminology is used that a pseudorandom sequence is used to "modulate" a signal. This nomenclature is synonymous with the terminology that a signal is modulated "according" to such a sequence. From the context it should be clear if the modulation type is a binary phase reversal, or quaternary phase shifting, or a more general modulation type. In the following description, the terminologies sequence and codes are used interchangeably when referring to sequences used for pseudorandom modulation or spreading. This is distinct from data sequence, which refers to an information stream.

In the following description, numerous specific details are introduced to provide a thorough understanding of, and enabling description for, the systems and methods described. One skilled in the relevant art, however, will recognize that these embodiments can be practiced without one or more of the specific details, or with other components, systems, etc. In other instances, well known structures or operations are not shown, or are not described in detail, to avoid obscuring aspects of the disclosed embodiments.

Figure 14:
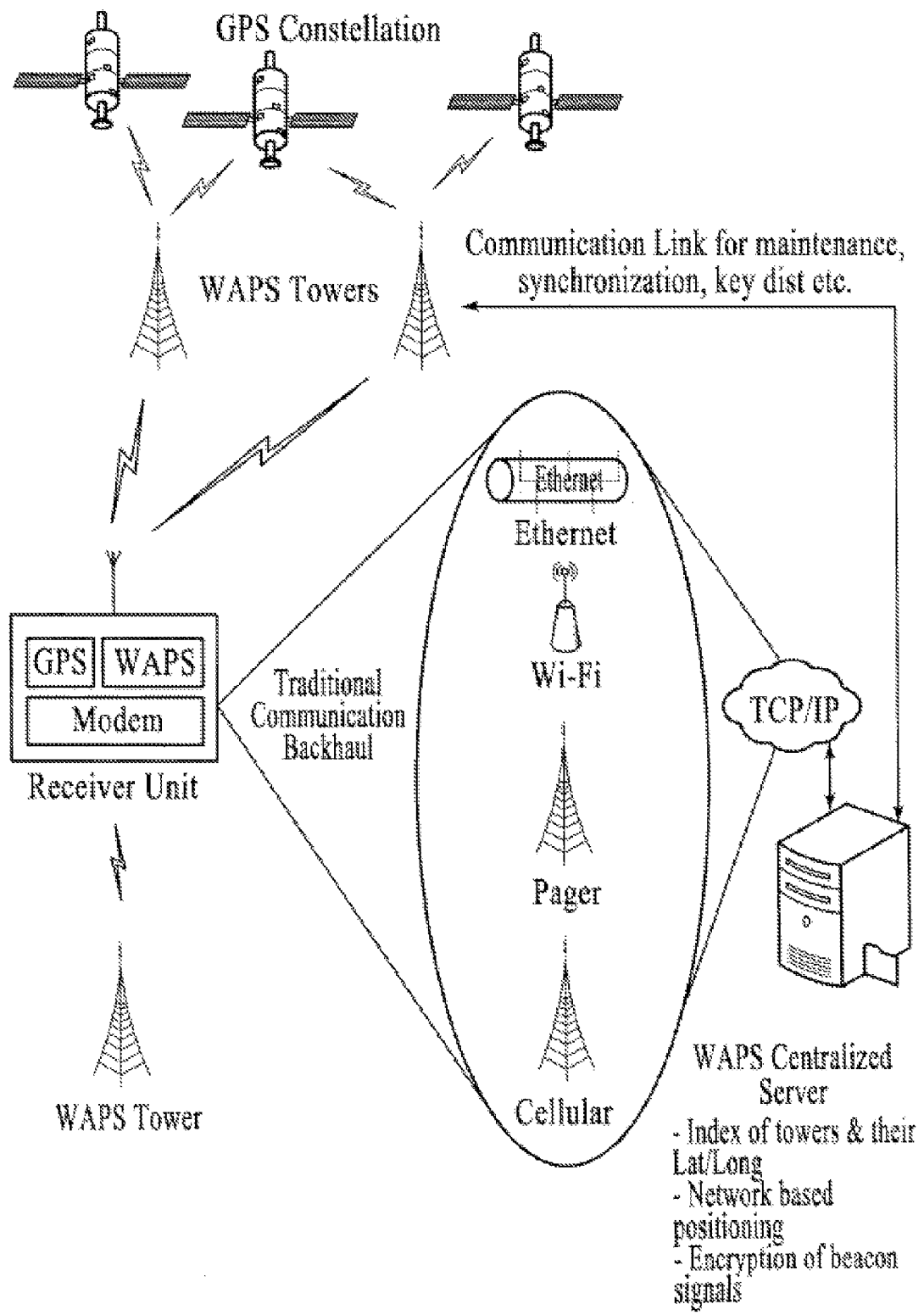
FIG. 14 is a block diagram of a wide area positioning system.

FIG. 14 is a block diagram of a positioning system. The positioning system, also referred to herein as the wide area positioning system (WAPS), or "system", includes a network of synchronized beacons, receiver units that acquire and track the beacons and/or Global Positioning System (GPS) satellites (and optionally have a location computation engine), and a server that comprises an index of the towers, a billing interface, a proprietary encryption algorithm (and optionally a location computation engine). The system operates in the licensed/unlicensed bands of operation and the beacons transmit proprietary waveforms for the purposes of location and navigation purposes. The WAPS system can be used in conjunction with other positioning systems for better location solution or the WAPS system can be used to aid other positioning systems In the context of this document, a positioning system is one that localizes one or more of latitude, longitude and altitude coordinates. Whenever the 'GPS' is referred to, it is done so in the broader sense of GNSS (Global Navigation Satellite System) which may include other existing satellite positioning systems such as Glonass as well as future positioning systems such as Galileo and Compass/Beidou.

The WAPS of an embodiment includes multiple towers broadcasting synchronized positioning signals to mobile receivers as described in detail herein. The towers of an embodiment are terrestrial, but the embodiment is not so limited. A significant problem that occurs particularly in terrestrial systems, especially ones that operate in urban environments, is the presence of multipath. In these situations, the mobile receiver may receive a multiplicity of signals from a transmitter, corresponding to a multiplicity of direct and reflected paths. The range of delays, sometimes called the delay spread, is typically constrained by geometric situations. For example, a delay spread of 1 microsecond corresponds to a maximum differential path length of 300 meters, and a spread of 5 microseconds to 1499 meters.

Typical WAPS use coded modulation, called spread spectrum modulation, or pseudo noise (PN) modulation, to achieve wide bandwidth. In such a system a carrier signal is modulated by a wideband modulated signal (typically a digital modulation), and such wide bandwidth permits accurate positioning through use of time-of-arrival measurement methods. The mobile receiver processes such signals with a de-spreading device, typically a matched filter or a series of correlators. Such a receiver produces a waveform, termed a cross-correlation function, which ideally has a narrow, strong peak surrounded by lower level energy. The time of arrival of the peak represents the time of arrival of the transmitted signal at the mobile. Performing this operation on a multiplicity of signals from a multiplicity of towers, whose locations are accurately known, allows determination of the mobile's location via trilateration algorithms.

Assuming use of a matched filter to process a received spread spectrum signal, when multipath is present, the matched filter output provides a series of overlapping sharp pulses of varying amplitudes, delays and phases. The mobile receiver attempts to estimate the time of arrival of the earliest such pulse. A variety of algorithms may be used for this purpose, such as leading edge location algorithms, MUSIC algorithm, minimum mean square estimation algorithms, etc.

A problem that arises, however, is that the energy surrounding the peak typically contains a series of subsidiary peaks, or "side lobes". The specification of the structure of such sidelobes in an ideal situation (i.e., no noise or multipath) is provided by a function called the "autocorrelation function." In multipath environments, these subsidiary peaks may be confused with a weak early signal arrival. For example, in the GPS system, for the C/A civilian codes, certain binary spreading codes, called "Gold Codes", are used, which are of frame length 1023 symbols, or "chips". An ideal matched filter receiving such a Gold code produces a set of sidelobes of amplitude −65/1023 times the peak amplitude, 63/1023 times the peak amplitude and −1/1023 times the peak amplitude. Thus the magnitude of the largest side lobe is approximately 0.06 times the peak amplitude or −24 dB. Typically these large amplitude sidelobes may be adjacent to or close to the peak amplitude of the autocorrelation function. Improved multipath estimation may be achieved by choosing codes that have a large region about the peak of the autocorrelation where (for the length 1023 case) the side lobe value is −1/1023 times the peak. This is referred to as the −1 run length. Specifically, for this case, the −1 run length is defined as the number of consecutive chips on one side of the autocorrelation peak, of amplitude −1/1023 times the peak. An embodiment described herein is the choice of a set of Gold Codes with the largest −1 run length. Other classes of code sets may be used in various alternative embodiments, as described in detail herein.

For the purpose of simplicity of description, the primary focus herein is upon the circular, or "periodic" autocorrelation function, which strictly speaking applies to the case in which transmitted code sequences, such as the above Gold codes, are repeated more than once. Hence the discussion of autocorrelations and cross-correlations is, strictly speaking, synonymous with circular cross correlation and circular autocorrelation. However, the application and benefits of the ideas of this description are also applicable to the situations of noncircular, or "aperiodic" correlations, especially when the concerns are focused upon performance near the peak of the output of the matched filter (or set of correlator). This is the case since near the peak output of the matched filter the aperiodic autocorrelation function is nearly equal to the circular autocorrelation function. Similarly the aperiodic cross-correlation function may be similar to the circular aperiodic cross-correlation function when the two sequences being cross-correlated have their start epochs nearly aligned.

The above discussion of a spread spectrum modulated signal described a signal suitable for use in positioning. However, it is generally the case that signals transmitted from the various transmitters include data necessary for the position location calculation. Such data might include, for example, the geographical location of the transmitters, times of transmission, environmental data, etc. Another set of such lower speed data might include a sequence used for the purpose of overall signal synchronization. In either case this data is generally transmitted at a much lower rate than the bandwidth of the spreading signal. Often this data is further modulated on top of the spread spectrum modulated signal that is used for positioning, and often the data epochs are aligned with epochs of the spread spectrum modulation, for example the beginning of the pseudorandom frames. Although it is often the case that both the spread spectrum modulation and the data modulation are used to phase shift a signal carrier, it is not necessarily the case, and the embodiments herein are not so limited. Furthermore, it may be the case that a portion of a transmitted signal may include only a spread spectrum modulated carrier without any additional data and another portion of a transmitted signal may include a carrier modulated by both a spread spectrum signal and data. It also may be the case that both modulations may be present in different portions of the transmitted signal, but different pseudorandom sequences may be used in the different portions of the transmission. In the following discussion when terms such as data, data rate, data modulation, data bits, and information bits are used, it is generally the case that such terminology refers to the data type as discussed in this paragraph, as contrasted with the spreading modulation.

As described in detail below, an embodiment includes the use of quadraphase or higher order coded modulation for the transmitted modulation. For a system that uses BPSK data modulation and BPSK spreading, it is sufficient to choose good −1 run length sequences for multipath mitigation. When quadrature spreading is used, it is necessary not only to have good −1 run length for the various tributaries used in constructing the quadraphase code, but also to have very good cross-correlation properties between the codes of the tributaries for code offsets consistent with the −1 run length. An alternative embodiment of a method described herein includes the choosing of pairs or larger sets of codes.

Many WAPS use binary coded modulation, as the spreading method. An embodiment produces quaternary coded modulation constructed in a manner to minimize the effects of multipath, as described above. Other higher order coding modulations are also disclosed, with similar advantages with respect to multipath mitigation.

In binary coded modulations the transmitting source produces at any instance one of two waveforms corresponding to one of two symbols, typically represented as −1 and +1, or 0 and 1. The waveforms typically are bi-phase coded, meaning that the signal is either a signal is transmitted or its inverse is transmitted, by phase inverting the carrier. It is possible to use frequency shift keying, amplitude shift keying, etc. to transmit a binary coded signal.

In quaternary coded modulation the transmitter source transmits at any time one of four possible symbols, which may be denoted A, B, C, and D. An embodiment includes a transmitter that maps these four symbols into one of four possible phases, producing a quadraphase modulated signal. One method of producing such a quadraphase modulated spreading signal is to use two Gold Codes that modulate in-phase and quadrature components of the transmitted carrier. The transmitted signal at any instance of time is again one of four symbols, corresponding to four carrier phases. The number of possible symbols transmitted at any one time is sometimes called the alphabet size. Hence, in the quaternary case, the alphabet size is 4. Any alphabet size is possible; however the use of a small alphabet size may result in reduced system complexity. Well known pseudorandom sequences exist, having good autocorrelation and cross correlation properties, in which the element of each sequence is one of M possible values. Again this value M is referred to as the alphabet size of the sequence. In transmitting signals in accordance with such a sequence there is a mapping of each sequence element value to an appropriate waveform. For example, a sequence may have an alphabet size of 16, and one possible mapping would be a mapping of each of the 16 possible values to one of 16 possible phase shifted exponentials. It is not necessary to construct higher order sequences, from lower order ones, such as Gold codes—they may be constructed directly. However, exemplary illustrations now provided illustrate such constructions.

The use of quaternary coding of data, rather than binary coding of data, enables the data rate transmitted by the transmitter to be doubled without affecting the signal structure. For example, if the code length is N symbols, then the entire spreading sequence of N transmitted (quaternary) symbols may be further phase shifted by 0, 90, 180 or 270 degrees in order to transmit 2 bits of data per code period, rather than one bit which is the case for bi-phase coding.

A further advantage of quarternary coding of the spreading signal is that the method provides a means of discriminating a signal from another transmitter having the same code and overlapping in time. The transmitted sequence of symbols from one transmitter can be represented as A+jB where A is a particular Gold Code (for example) and B is another Gold code, and j represents 90° phase shift. The second transmitter can transmit A-jB. Both transmitters are transmitting quaternary symbols in a similar manner but the relationship between the in-phase and quadrature components is altered and is easily determined by a receiver.

Higher order spreading modulation can be constructed in a variety of ways. For example, a code may be constructed that has alphabet size 8. Each symbol of the code may be mapped into a phase shift of the carrier by an amount $k \times \pi/4$, $k=0, 1, \ldots, 7$. Alternatively, each symbol may be mapped to a combination of amplitude and phase shifts. In this example of alphabet size 8, the transmitter may compute the code sequence and the mapping (3 bit word to transmitted symbol) on the fly, or it may store the full sequence or the entire frame of symbols and read such data out from memory as needed.

In all of the scenarios described above the performance of the system is the same from the standpoint of measurement of range, assuming the same transmitted and received energy, the same spreading symbol shape, and the same spreading symbol rate. However, there is less energy per information bit if more than one information bit is transmitter per PN frame length. In many terrestrial wide area positioning systems, there is good received signal energy, and hence this limitation may be minor.

FIG. 15A and FIG. 15B (collectively referred to as FIG. 15) include a table of preferential Gold codes of length 1023 in order of their −1 run length. In more general cases than described herein, the "−1 run length" means the number of consecutive code phases following the correlation peak which have values +/−1 times the peak value divided by the code length. Each of the Gold codes is constructed from the same pair of maximal length codes, with the different Gold codes distinguished by the delay, or code phase, difference between the pair. The table of FIG. 15 also includes the initial fill of the second PN code's shift register as an alternative to the delay, since the initial fill is typically more closely related to how the sequence will be generated. The fill of the first PN code in the table is always equal to all 1's. The fill of the second PN code is as specified in the table. The fill read from left to right represents the first 10 outputs of the second PN generator. The fill is placed in the shift register from the end of the shift register back to the beginning. PN Code 1 has feedback taps [3,10] and code 2 has taps [2,3,6,8,9,10]. The best code displayed in the table of FIG. 15 has a run of 25 (one each side of the autocorrelation peak). In addition to the codes shown in the table of FIG. 15, each of the individual maximal length codes, i.e., code 1 and code 2 by itself, may also be used to augment the codes of the table of FIG. 15, since they may be considered part of the Gold code set (since they share the Gold code set cross-correlation properties with the other members). Furthermore, these maximal length codes have (circular) autocorrelation functions that are −1, except for the correlation peak. If these codes were included in the codes of the table of FIG. 15, their −1 run length would be 1022, and hence they would be placed at the head of the list.

It should be noted that other pairs of maximal length PN codes may be used to construct sets of Gold codes with good −1 run lengths. The code pairs selected herein are for illustrative purposes. Furthermore, tables may be constructed in a similar manner for other code lengths for which Gold codes exist. In addition other sets of codes, rather than Gold code sets may be selected and subsets of such sets may be selected for good −1 run lengths. These variations are described in detail herein.

Figures 16, 17:
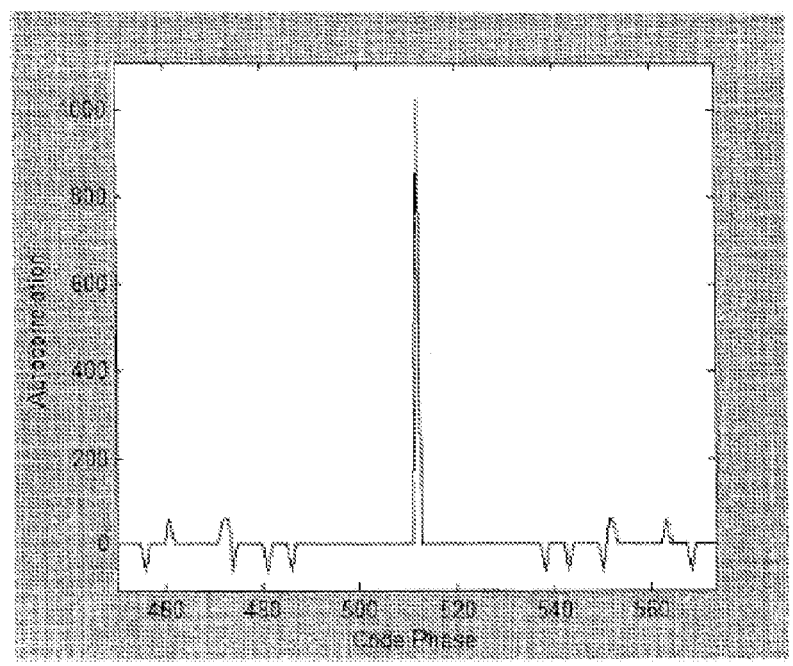
FIG. 16 shows a plot of autocorrelation versus code phase for a preferred Gold code.
FIG. 17 includes a table of sets of Gold code pairs with long autocorrelation runs having amplitude −1.

FIG. 16 shows a plot of autocorrelation versus code phase for a preferred Gold code. More specifically, the plot of FIG. 16 shows the central portion of an autocorrelation of the first entry of the table of FIG. 15 (preferential order is 1, delay between codes is 853, equivalent fill is 1000100001, −1 side lobe run length is 25), which has a −1 run length of 25.

A quaternary coded signal may be constructed by employing two Gold codes in quadrature, as described in detail above. In this case, the autocorrelation function will have four terms corresponding to the individual autocorrelations of the two Gold codes and the cross correlations between the Gold codes. That is, if the constituent gold codes are called g and h, then the overall code may be represented as g+jh. The autocorrelation then becomes $g \otimes g + h \otimes h - jg \otimes h + jh \otimes g$, where $\otimes$ means correlation, and we note that when correlating two complex quantities, the second such quantity is complex conjugated. The last two terms in this overall autocorrelation are the cross correlations. In order to construct a good quaternary code with large −1 run length it is thus necessary not only to utilize Gold codes that have good individual −1 run length, but also to have their cross correlations contribute negligibly in the vicinity of the same code phase interval in which the autocorrelation function of the individual Gold codes have value −1. The interval of low cross correlation values is referred to herein as a cross-correlation run. A choice of pairs of such codes can be done by taking advantage of the fact that one can choose the relative code phase between the Gold codes in order to achieve good cross correlation performance over the code phase interval of interest. An embodiment includes a set of pairs of Gold codes determined in this manner by examining all pairs of Gold codes in the table of FIG. 15 and all relative code phases between such pairs. It should be noted that a correlation operation for quaternary codes (or any codes higher than binary) involves multiplying by the complex conjugate of the idealized received signal.

FIG. 17 includes a table of sets of Gold code pairs that may be used to construct a quadrature code having long −1 run length. The delay in the third column is that applied to Gold code 2 in order to achieve an overall autocorrelation of the quadrature modulated signal with a long −1 run length as shown in the fourth column. Note that in this case if the constituent Gold code sequences have amplitudes +/−1, the overall autocorrelation during the runs has amplitude −2 and the peak of the autocorrelation is 2046. The run length definition is consistent with the prior definition since −1 times the peak value divided by the code length equals −1 times 2046/1023=−2.

Figure 18:
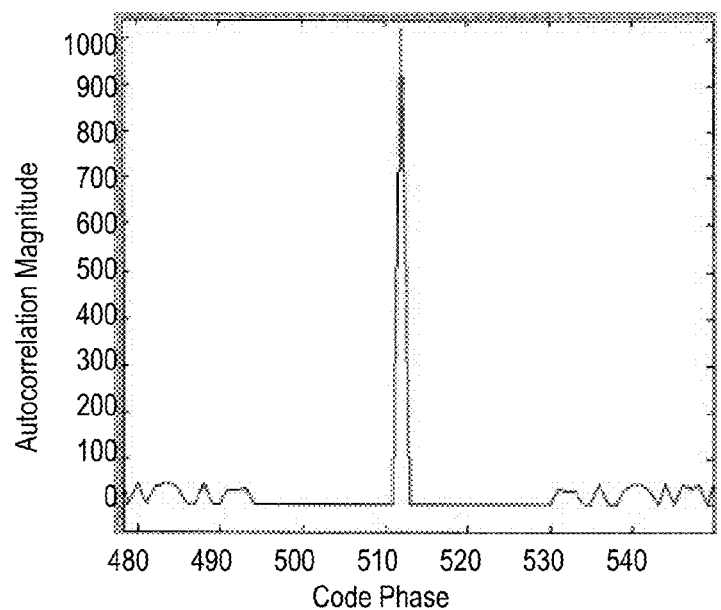
FIG. 18 shows a plot of autocorrelation magnitude versus code phase for a preferred Gold code pair.

FIG. 18 shows a plot of autocorrelation magnitude versus code phase for a preferred Gold code pair. More specifically, the plot of FIG. 18 shows the central portion of the magnitude of the autocorrelation of the second entry of table 500 (Gold code 1 (PN delay) is 714, Gold code 2 (PN2 delay) is 456, inserted delay (to code 2) to center cross correlation run is 343, total cross correlation run is 37), which implies a −1 run length of 18 on either side of the autocorrelation peak. The magnitude has been divided by two in order to compare this with the plot of FIG. 16. The insertion of the proper delay between the constituent Gold codes is critical in constructing a quaternary code with good autocorrelation properties because otherwise the autocorrelation function about the peak may have large close-in sidelobes.

Figure 19:
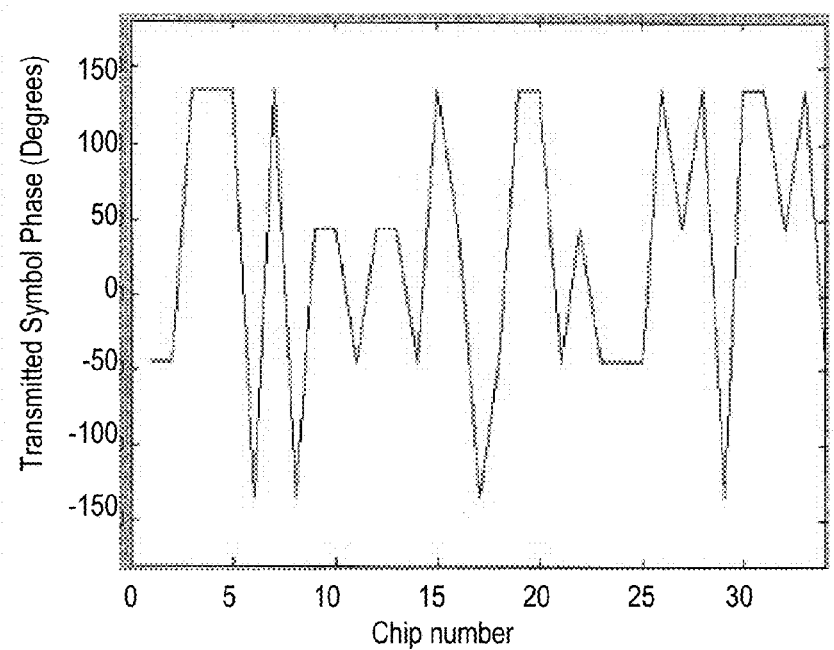
FIG. 19 shows a plot of transmitted symbol phase versus chip number for a preferred Gold code pair.

FIG. 19 shows a plot of transmitted symbol phase versus chip number for a preferred Gold code pair. More specifically, the plot of FIG. 19 shows a sample portion of the transmitted symbol phase angle in degrees versus chip number for the second entry of the table of FIG. 17 (Gold code 1 (PN delay) is 714, Gold code 2 (PN2 delay) is 456, inserted delay to center cross correlation run is 343, total cross correlation run is 37). The plot of FIG. 19 shows a sequence of four phases, +/−45 degrees and +/−180 degrees, representing the quaternary code. It is noted that the transmitter itself need only store the sequence of phase angles, or symbol designations (e.g., A, B, C, and D) rather than implement the code using shift registers, or the like.

Although the description herein focuses upon Gold codes, the ideas extend to other classes of codes. A number of code classes, suitable for use in spread spectrum multiplexing may initially be selected. For example, such sets may include Kasami codes, Bent Codes, and Gold-like codes, but the embodiments are not so limited. These sets generally have good (aperiodic) cross correlation properties between pairs of members. Then, following an embodiment, a subset of such codes may be selected with circular autocorrelations having long −1 run length. Similarly, sets of codes having good cross correlation properties may be selected having alphabet size greater than two, for example quaternary, octonary, etc. Then subsets of these may be selected for good circular autocorrelation properties.

In the description herein a primary measure of performance is the −1 run length of the autocorrelation function. This corresponds to the length of the autocorrelation function on either side of its peak having value −1 times the peak value/code length. However, a further embodiment herein selects a subset of codes with autocorrelation magnitude levels no greater than a threshold value A, within a specified region about the peak autocorrelation value. This is termed the A run length. As before, the set of sequences is chosen such that the maximum magnitude of the cross-correlation function between any pair of codes is below a specified value. Next a subset of such a set of codes is selected such that for each of such subset members the autocorrelation function magnitudes, within a specified location region near the peak, is less than or equal to the value A. For the prior discussion of the binary and quaternary Gold codes A had value 1, assuming that the Gold code sequences have values +1 and −1.

In another embodiment, a set of codes is initially selected with good autocorrelation properties over a range about its peak location. A subset of such codes is then selected in which the pairwise cross-correlation magnitude between members (optionally over a range of code phases) is less than a specified threshold C. This may apply to binary codes or codes with larger alphabets (e.g., quaternary). For example, consider the set of maximal length sequences of a given size, for example 2047. For this case there are 176 such codes. Of course, each has very good autocorrelation properties, with −1 run length 1022. The cross-correlation between members will vary significantly. FIG. 20 shows a table of code subsets selected to have bounded cross correlation magnitudes between members. Better performance is achieved by limiting the size of the subsets. For example, for code length 2047, maximum cross-correlation magnitude of 65 may be achieved if the set size is limited to 3, and maximum cross-correlation magnitude of 129 may be achieved if the set size is limited to 10.

In an embodiment, the codes described herein are used to modulate a carrier and hence create a positioning signal. The code may be repeated one or more times. Such a signal may include other signaling elements in addition to, or instead of, such positioning signals. For example, as described herein, a portion of such a signal may include positioning signals by themselves, another portion may include the positioning signals further modulated by a lower speed data sequence, and other portions of the signal may include other signal elements with no spreading code at all. In yet another embodiment the transmitted signal is not continuous, but is transmitted as a set of bursts, in a time division multiplexed manner. An individual transmitter may use the same code or codes in each burst, or these codes may vary from one burst to the next. The embodiments herein apply to all such situations when at least one portion of such a transmission incorporates a pseudorandom or spreading code selected in the manner prescribed herein.

In an embodiment, selected code sets may have sequence lengths that are truncated to less than a standard sequence length, or extended to a greater length. For example, rather than using a standard Gold code of length 2047, a code length of 2046 may be used instead by deleting one code element. This may allow simpler implementation in situations in which multiple lengths are employed. For example, a system can operate at one rate, a first rate, and in other situations operate at a second rate that is twice the first rate. If a code length of 1023 is used in the first instance, then the system should be operated with a code length of 2046 in the second instance in order to maintain the same frame (that is, sequence) duration. In yet another embodiment, different transmitters using codes selected according to the embodiments described herein transmit signals with slightly different carrier frequencies.

Resolution of multipath is critical in positioning systems. Wireless channel is often characterized by a set of randomly varying multipath components with random phases and amplitudes. For positioning to be accurate, it is imperative that the receiver algorithm resolves the line-of-sight (LOS) path if present (it will be the first arriving path) or the path that arrives first (which may not necessarily be the LOS component).

Traditional methods often work as follows: (1) the received signal is cross-correlated with the transmitted pseudo-random sequence (e.g., Gold code sequence, which is known at the receiver); (2) the receiver locates the first peak of the resulting cross-correlation function and estimates that the timing of the path that arrived first is the same as the timing indicated by the position of this peak. These methods work effectively as long as the lowest multipath separation is much larger than inverse of the bandwidth available which is often not the case. Bandwidth is a precious commodity and a method which can resolve multipath with the minimal amount of bandwidth is highly desired to improve the efficiency of the system.

Depending on the channel environment (including multipath and signal strength), an appropriate method for obtaining an estimate of the earliest arriving path is used. For best resolvability, high-resolution methods are used whereas for reasonable performance at low SNRs more traditional methods that directly use the cross-correlation peak samples and some properties of the correlation function around the peak are applied.

Consider the quantized received signal y[n] sampled at a rate $f_s$ given by:

$$y[n] = h_{\mathit{eff}}[n] \otimes x[n]$$

$$y[n] = \sum_{i=n_0}^{\infty} h_{\mathit{eff}}[i] \cdot x[n-i]$$

where y[n] is the received signal which is the convolution of the transmitted pseudo-random sequence x[n] with the effective channel $h_{eff}[n]=h[n] \otimes h_{tx}[n] \otimes h_{rx}[n]$, where $h_{tx}[n]$ is the transmit filter, hard is the receive filter and h[n] is the multi-path channel.

One method to find the peak position is by peak interpolation using the values surrounding the apparent peak position. The interpolation may be quadratic using one value on either side of the peak or may use a higher order polynomial using two or more samples around the peak or may use a best fit for the actual pulse shape. In the case of quadratic interpolation, a quadratic is fitted to the peak value and the values immediately surrounding the peak. The peak of the quadratic determines the peak position that is used for ranging. This method is quite robust and can work well at low SNR.

An alternative embodiment may use a value other than the peak position as the reference position. Note that the DLL actually uses the peak position as reference position on the correlation function whereas this method uses a point different from the peak as reference. This method is motivated by the fact that the early edge of the correlation peak is less affected by multi-path than the trailing edge. For example, a point 75% of chip $T_c$ from the peak on the undistorted (without channel effects) correlation function may be used as a reference point. In this case, the portion of the interpolated z[n] function that matches this 75% point is selected and the peak is found as 25% of $T_c$ away from this point.

Another alternative peak correlation function based method may use the peak shape (such as a measure of distortion of the peak, for example, peak width). Starting from the peak location and based on the shape of the peak, a correction to the peak location is determined to estimate the earliest arriving path.

High-resolution methods are a class of efficient multipath-resolution methods which use Eigen-space decompositions to locate the multipath components. Methods such as MUSIC, ESPIRIT fall under this class of resolution schemes. They are highly powerful schemes as in they can resolve effectively much more closely spaced multipath components than traditional methods, for the same given bandwidth. The high resolution earliest time of arrival method attempts to estimate directly the time of arrival of earliest path rather than inferring the peak position from the peak values. The below assumes that a coarse-acquisition of the transmitted signal is already available at the receiver and the start of the pseudo-random sequence is known roughly at the receiver.

Figure 21:
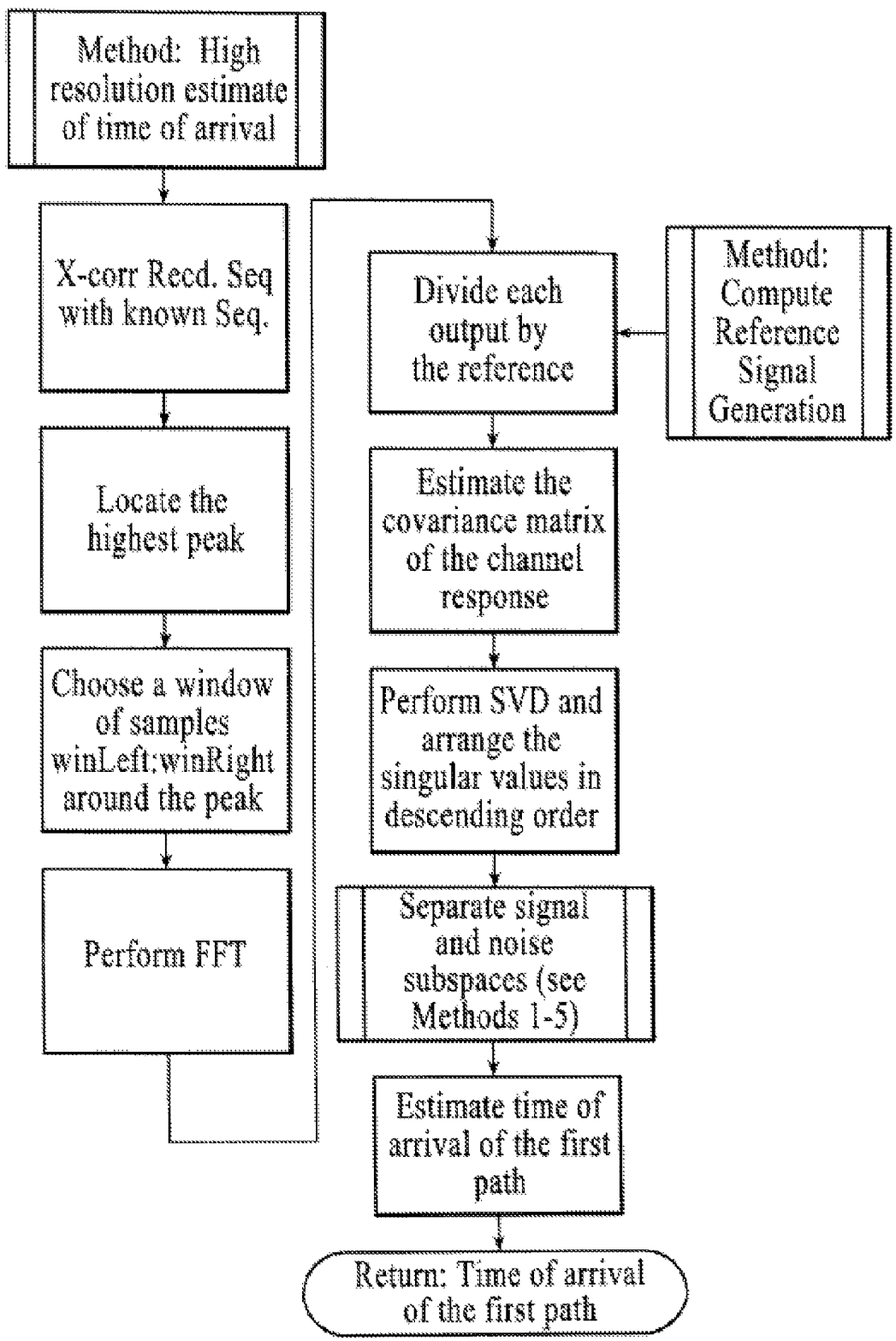
FIG. 21 is a flow diagram for estimating an earliest arriving path in h[n].

FIG. 21 is a flow diagram for estimating an earliest arriving path in h[n]. The method to determine the earliest path comprises the following operations, but is not so limited:
1. Cross-correlate the received samples y[n] with the transmit sequence x[n] to obtain the result z[n]. When the cross-correlation is written in terms of a convolution, $z[n]=y[n] \otimes x^*[-n]$. The equation can be re-written as: $z[n]=h_{eff}[n] \otimes \phi_{xx}[n]$, where $\phi_{xx}[n]$ is the auto-correlation function of the pseudo-random sequence
2. Locate the first peak of z[n] and denote it as $n_{peak}$. Extract wL samples to the left of the peak and wR samples to the right of the peak of z[n] and denote this vector as pV.

$pV=[z[n_{peak}-wL+1] \ldots z[n_{peak}+wR]]$

The vector pV denotes the useful part of the cross-correlation result z[n]. In the ideal case, in the absence of channel distortion and when the channel BW is not limited, the choosing $wL=wR=f_sT_c$ would be sufficient to determine the timing of the received signal. In the presence of limited BW, for the case when the pseudo-random code x[n] is a sequence of +1/−1's, the optimal method to choose wL and wR are to choose them as the non-zero values (or, more generally, values >a certain threshold defined as a fraction of the peak value are selected) present on the left and right side of the peak of $p[n]=h_{tx}[n] \otimes h_{rx}[n]$ respectively. One other consideration in the choice of wL and wR is to select enough uncorrelated noise samples to obtain enough information regarding the noise sub-space. In addition, the integers wL and wR should be chosen to include all possible multipath components especially on the left side (i.e., through choice of wL) to help resolve far-out multipath components. Including too many samples beyond $f_sT_c$ increases the amount of noise introduced in the pV vector and hence has to be curtailed. Through simulation and experiments, a typical set of values for wL and wR are $3f_sT_c$ and $3f_sT_c$, respectively.

Note that z[n] (and in turn pV) contains the effect of the channel h[n], the transmit filter $h_{tx}[n]$, the receive filter $h_{rx}[n]$ and the autocorrelation function of the pseudo-random sequence $\phi_{xx}[n]$. In order to estimate the earliest arriving path in the channel, the other effects need to be eliminated. In many cases the transmit and receive pulse-shapes are matched for best noise performance, but that constraint is not required for this algorithm to work. The reference correlation function is defined as $\phi_{ref}[n]=\phi_{xx}[n] \otimes h_{tx}[n] \otimes h_{rx}[n]$ which needs to be estimated and eliminated before pV can be used for estimation of earliest arriving path.

3. The Reference correlation function $\phi_{ref}[n]$ is estimated next.

Figure 22:
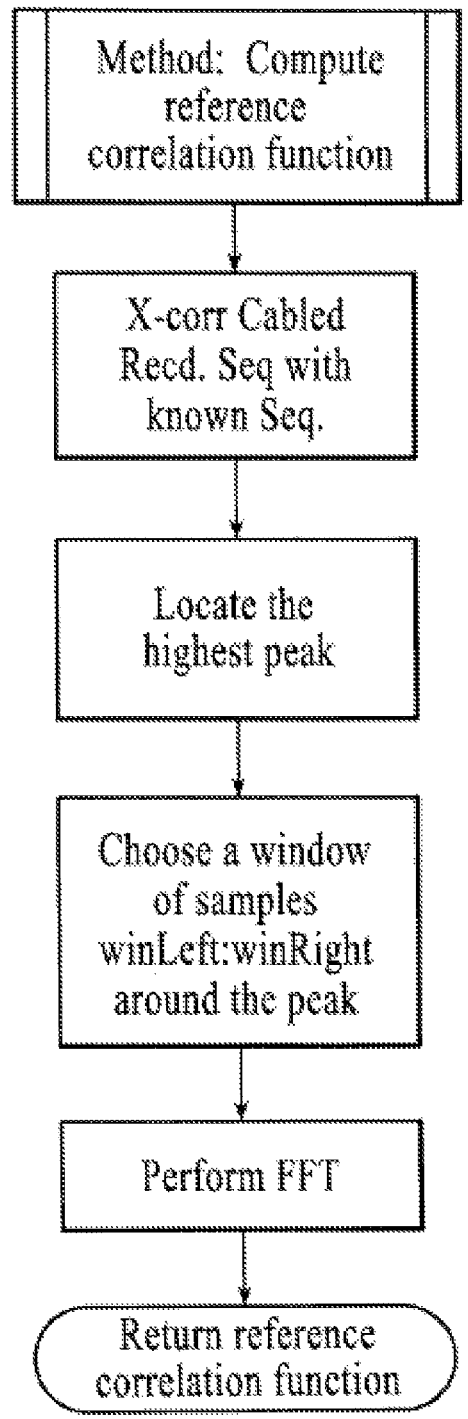
FIG. 22 is a flow diagram for estimating reference correlation function.

One method to obtain the reference cross-correlation is as follows: perform steps 1-2 on an ideal channel (a so called "cabled link") to obtain the corresponding peak vector $pV_{Ref}$. The peak vector $pV_{Ref}$ contains the useful samples of the reference correlation function $\phi_{ref}[n]$. FIG. 22 is a flow diagram for estimating reference correlation function.

The "Cabled link" method involves sending the modulated signal from the transmitter front-end (power-amplifier and transmit antenna is by-passed) through an 'ideal' channel (for example, a cable) to the receiver front-end (bypass the receive antenna). Note that the 'ideal' channel can have some delay and attenuation, but should not add any other distortion and must have high SNR. For the best performance, the 'cabled' reference needs to be generated separately for each pseudo-random sequence as they have different autocorrelation functions and hence different references. It is also then critical to choose PRNs properly for the best autocorrelation functions (specifically, their close in autocorrelation side-lobes should be well suppressed compared to the peak) which will result in the best overall performance of the timing-resolution method, since autocorrelation sidelobes can get mistaken for multipath unless sufficiently attenuated.

Assuming transmit filter responses are controlled, one calibration of the response on cabled link is required per receiver during production. If receiver filter characteristics can be controlled (for example, for a bunch of receivers), then the calibration on cabled link of the response can be further reduced to one calibration measurement for a set of receivers.

An alternative method for determining the reference correlation function $\phi_{ref}[n]$ is to compute the individual components $\phi_{xx}[n]$, $h_{tx}[n]$ and $h_{rx}[n]$ analytically and to convolve them to arrive at the reference correlation function $\phi_{ref}[n]$. Note that this method depends on the extent to which transmit and receive filter impulse responses can be controlled in an actual implementation.

4. Improve the SNR in the estimate of pV by coherently averaging across multiple gold codes and even across multiple bits. Averaging across multiple bits can be done coherently after decisions on the individual bits being transmitted have been made. In other words using decision feedback before integration across bits. Note that improved SNR can be obtained equivalently by performing averaging in the cross-correlation function estimation in Step 1.

5. Calculate the Fast Fourier Transform (FFT) of length $N_{fft}$ of pV and $pV_{Ref}$ with zero padding of $N_{fft}-(wL+wR)$ zeros to obtain the length $N_{fft}$ vectors $pV_{Freq}$ and $pV_{Ref,Freq}$ respectively. An optimal value for $N_{fft}$ is obtained by checking resolvability of multipath through simulations using both synthetic and real measured channels. A typical value of $N_{fft}$ was found to be greater than or equal to 4096. The $$PV_{Freq} = FFT[pV \text{ zeropad}]$$

$$PV_{Ref,Freq} = FFT[pV_{Ref} \text{ zeropad}]$$

6. Calculate $$H_{full}[k] = \frac{pV_{Freq}[k]}{pV_{Ref,Freq}[k]}$$

to obtain the frequency domain estimate (corrupted with noise) of the channel h[n]. If the received sequence y[n] is oversampled by $N_{os}$ (i.e., $$N_{os} = \frac{f_s T_c}{2}$$

for a transmit pulse shape band-limited to +/−1/Tc) and if the transmit and receive pulse-shaping filters are perfectly band-limited with BW=1/Tc, then exactly $$N = \frac{N_{fft}}{2N_{os}}$$

positive and negative samples around DC of $H_{full}[k]$ are non-zero (i.e., usable) for estimation of the real channel, $H_{real}[k]$. From our studies, we have concluded that $$\frac{N_{fft}}{2\alpha N_{os}}$$

samples on either side of DC should be picked for the best performance of the resolution algorithm, where $\alpha>1$ is chosen based on the actual pulse-shaping filters used at the transmitter and receiver and the autocorrelation function $\phi_{xx}[n]$. Note that including the frequency transition band of $\phi_{ref}[n]$ causes noise enhancement and $\alpha$ is chosen large enough to exclude these frequencies in the selected samples. However, choosing $\alpha$ too large will cause loss of signal information. A preferred choice of $\alpha=1.25$ for real band-limited functions based on raised-cosine filter shapes with small excess bandwidth has been used in the implementation.

7. If the DC component of $H_{full}[k]$ is at index 0, the reduced H vector, H[ ] is defined as:

$$H=[H_{full}[N_{fft}-N+1] \ldots H_{full}[N_{fft}]H_{full}[0]H_{full}[1] \ldots H_{full}[N]]$$

8. Construct the matrix P from the reduced channel estimate vector H[k], $$P = \begin{bmatrix} H(M) & \ldots & H(2N-1) & H'(0) & \ldots & H'(2N-M+1) \\ H(M-1) & \ldots & H(2N-2) & H'(1) & \ldots & H'(2N-M+2) \\ \vdots & \ddots & \vdots & \vdots & \ddots & \vdots \\ H(0) & \ldots & H(2N-M+1) & H'(M) & \ldots & H'(2N-1) \end{bmatrix}$$

where 1<M<2N is a parameter and ( )' represents conjugate of the complex number.

Define the estimated covariance matrix R of the reduced channel estimate vector H[k] as $$R=P>P'$$

If M is chosen to be too small (close to 1), then the eigen-values of R are very limited in number and, as a result, the high-resolution algorithm cannot delineate between the signal and noise. If M is chosen too large (close to 2N), then the covariance matrix estimate R is unreliable as the amount of averaging in obtaining the covariance is inadequate and also the covariance matrix R obtained is rank-deficient. Thus, a value of M which is right in the middle of its allowable range i.e., M=N is a good choice. This has also been verified empirically.

9. Perform singular value decomposition (SVD) on R as R=UDV' where U is a matrix of the left singular vectors, V is the matrix of the right singular vectors and D is the diagonal matrix of singular values.

10. Construct the vector of sorted singular values sV as sV=diagonal elements of D sorted in descending order 11. The next key step is to separate the signal and noise subspaces. In other words, to select an index ns in the vector sV such that the singular values sV[ns+1] ... sV[N] correspond to noise. Define a vector of noise singular values as $sV_{noise}$.

Figure 23:
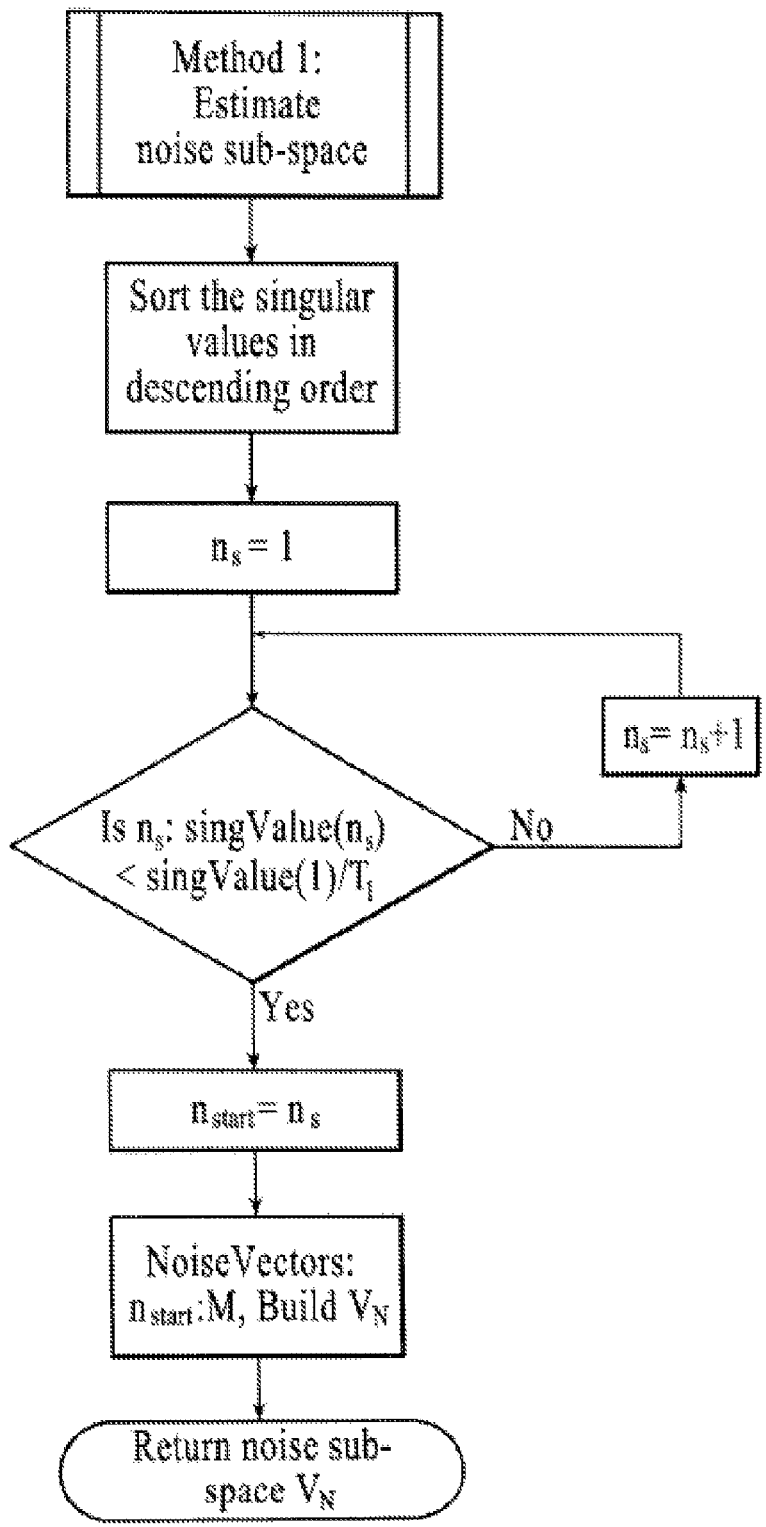
FIG. 23 is a flow diagram for estimating noise sub-space.
Figure 24:
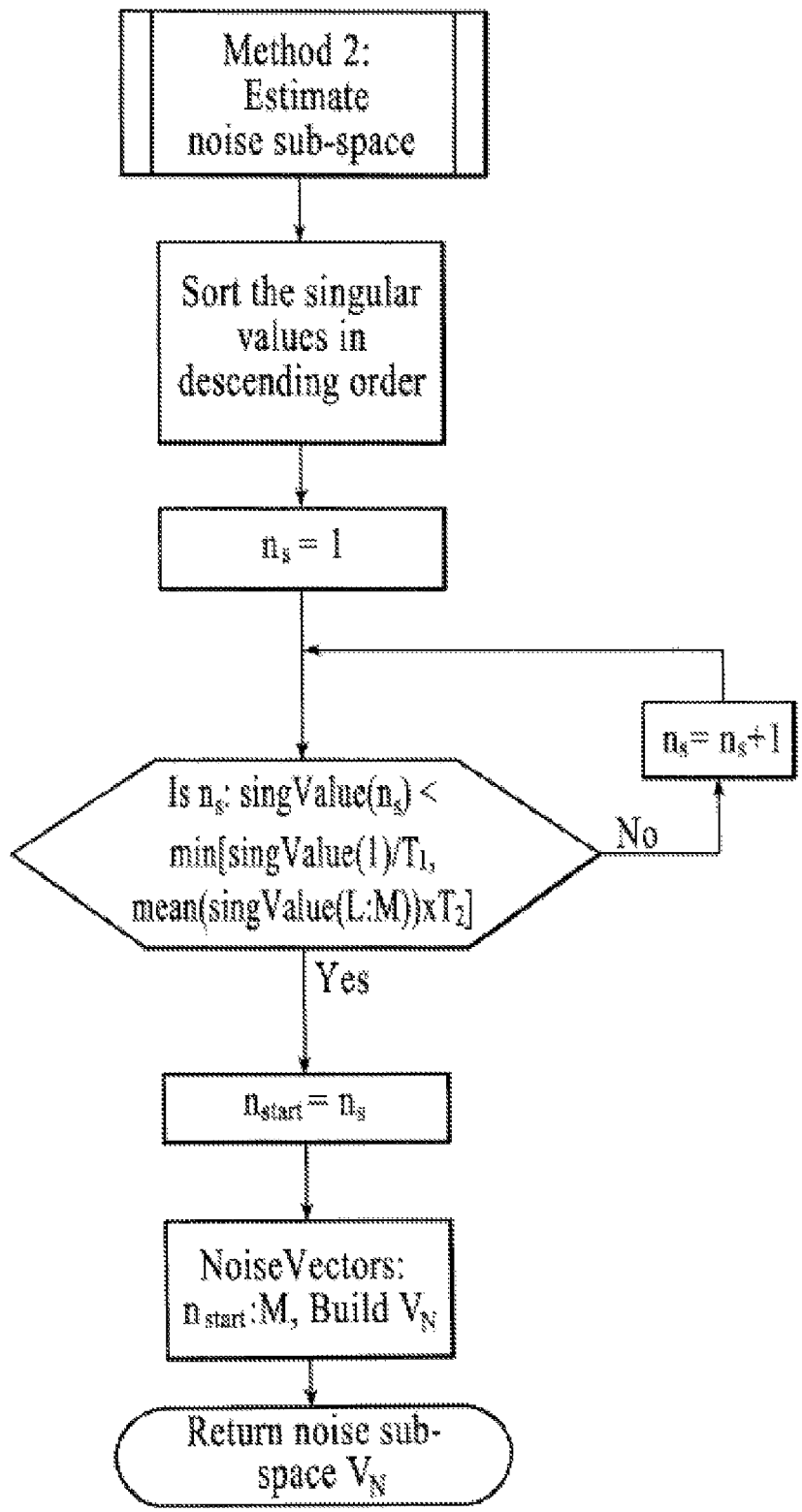
FIG. 24 is a flow diagram for estimating noise sub-space.
Figure 25:
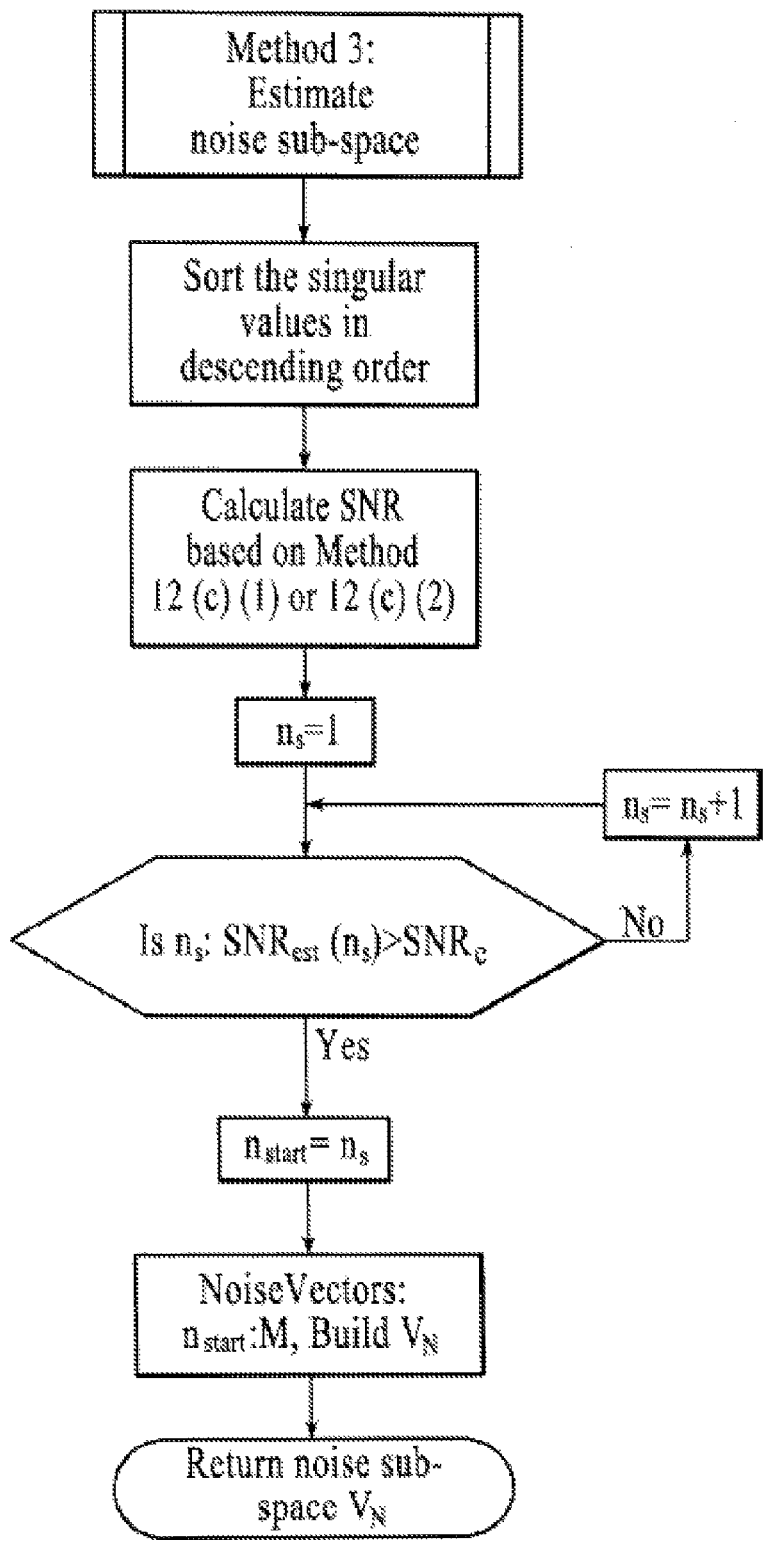
FIG. 25 is a flow diagram for estimating noise sub-space.

There are a number of methods possible to separate the singular values corresponding to the noise subspace and find a representation for the basis vectors of the noise sup-space:

a) All singular values which are smaller than $$\frac{\max(sV)}{T_1}$$

where $T_1$ is a threshold value which is a function of the signal-noise ratio (e.g., SNR on the chip) $T_1$=f (SNR). FIG. 23 is a flow diagram for estimating noise sub-space.

b) All singular values less than min $$\left(\frac{\max(sV)}{T_1}, \text{mean}(sV(L:M)) \times T_2\right),$$

where L is a parameter which can be chosen greater than delay-spread (e.g., N/2) and $T_2$ is another threshold value determined empirically (typical value can be 1000). FIG. 24 is a flow diagram for estimating noise sub-space, under an alternative embodiment.

c) Another method involves determining the noise subspace by repeatedly estimating the SNR for different partitions of noise and signal-plus-noise subspaces and comparing with another estimate of SNR. FIG. 25 is a flow diagram for estimating noise sub-space, under another alternative embodiment.
  1) Calculate estimate of SNR as follows:
      i. Assume that the noise is represented by the sV( )$n_s, n_s+1 \ldots$ M, Calculate noise variance as:

$$\sigma_{est}^2(n_s) = \frac{\sum_{i=n_s}^{M} sV(i)}{M - n_s + 1}$$

ii. Calculate the signal power as $P_{sig}(n_s) = \Sigma_{i=1}^{n_s-1}(sV(i) - \sigma_{est}^2(n_s))$
      iii. Estimate of SNR:

$$SNR_{est}(n_s) = \frac{P_{sig}(n_s)}{\sigma_{est}^2(n_s)}$$

2) An alternative estimate of SNR is obtained through other methods (e.g., SNR on chip). One method of estimating SNR directly is as follows:
      i. If the received data samples (after frequency error removal and re-sampling to Tc-spaced samples and code de-correlation) are given by $X_i$ (where the $X_i$ are chip-spaced starting from the interpolated peak position).

$$X_i = S + N_i$$

ii. The signal is estimated as $$\hat{S} = \frac{1}{N} \sum_{i=0}^{N-1} X_i$$

iii. The noise is estimated as $$\hat{N} = \frac{1}{N-1} \sum_{i=0}^{N-1} (X_i - \hat{S})^2$$

iv. The SNR is estimated as $$\widehat{SNR}_c = \frac{\hat{S}}{\hat{N}}$$

Figure 26:
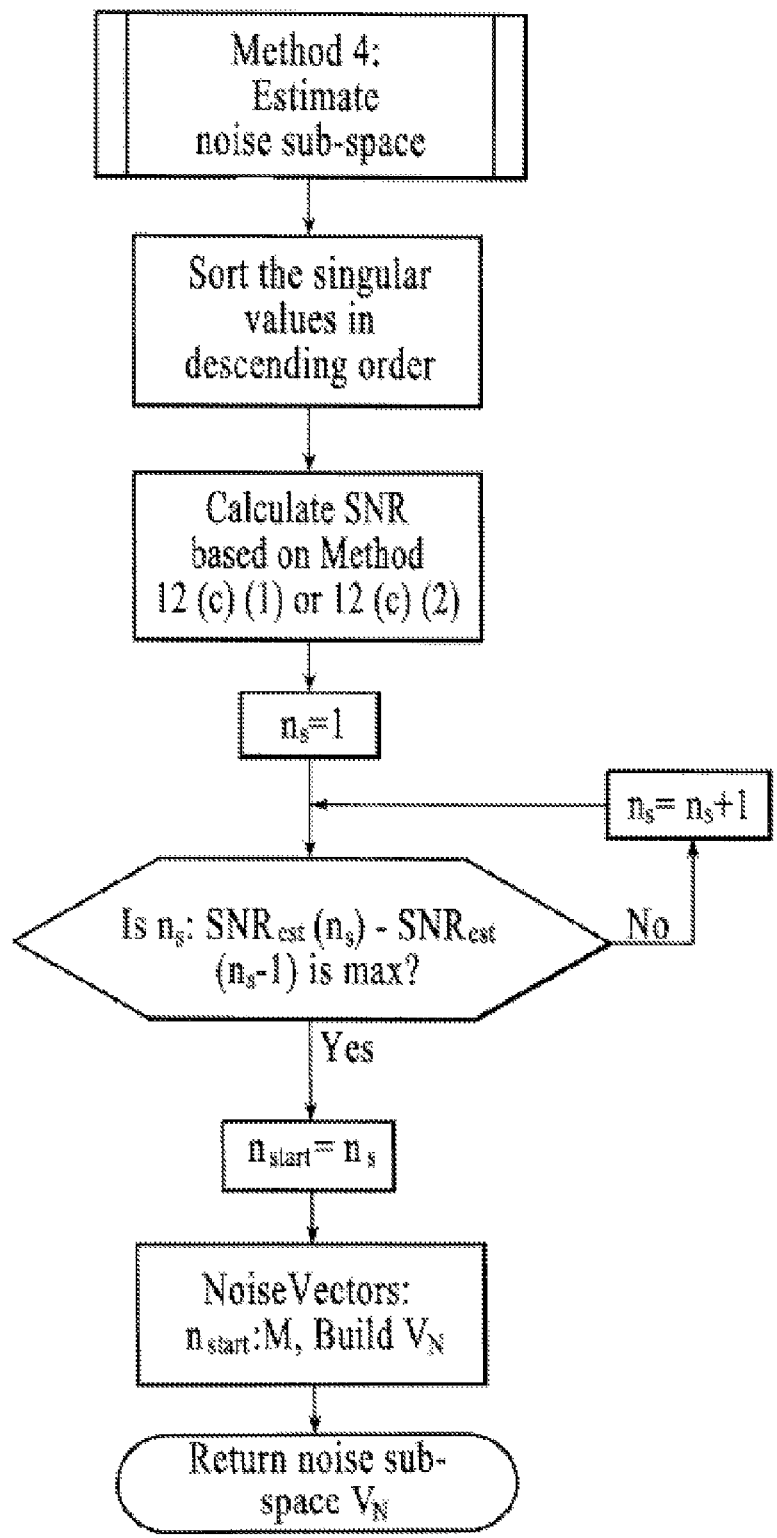
FIG. 26 is a flow diagram for estimating noise sub-space.
Figure 27:
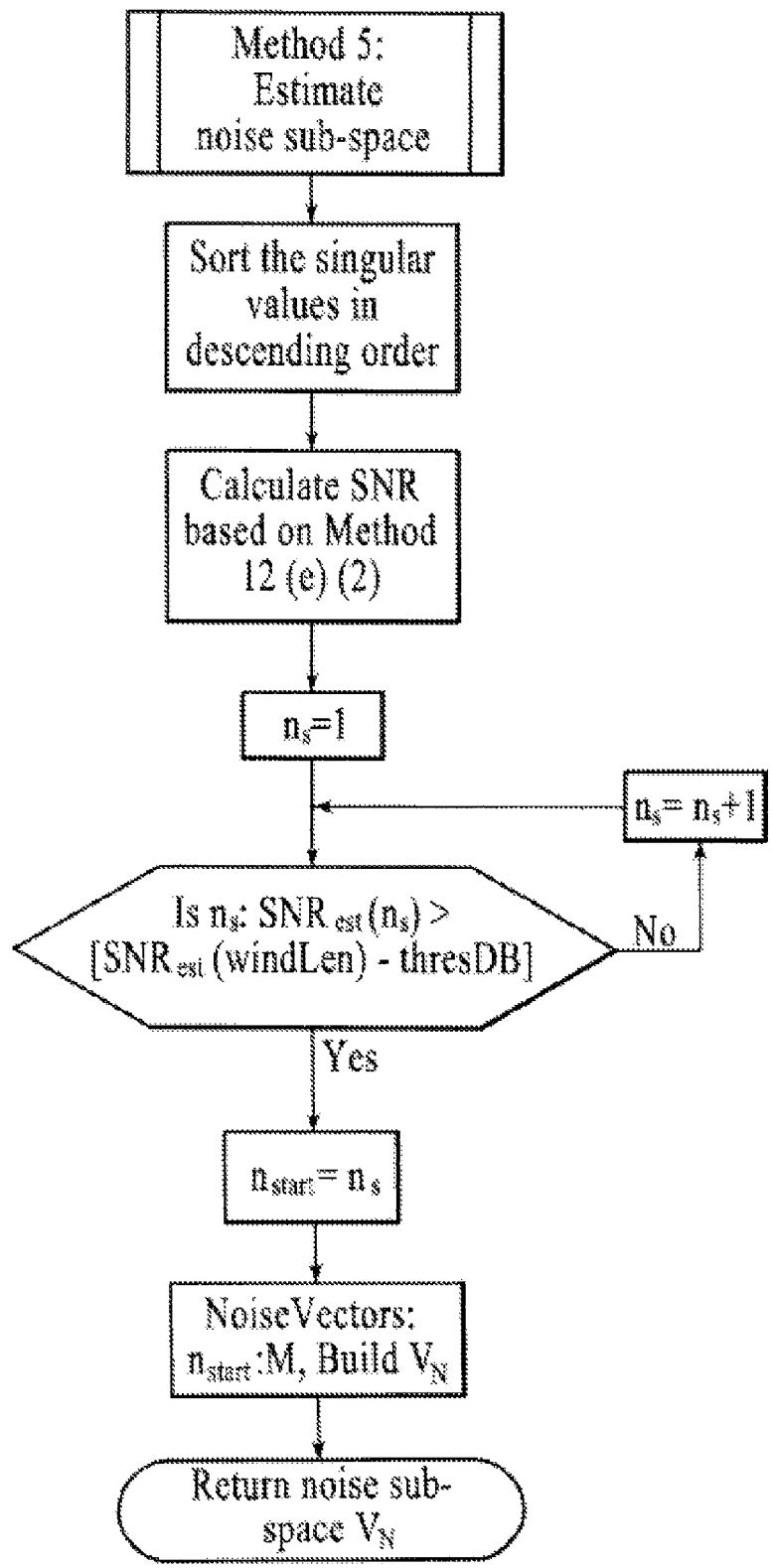
FIG. 27 is a flow diagram for estimating noise sub-space.

3) Choose the noise singular values as sV(ns, ns+1, ..., M) which satisfy the following condition:

$$n_{start} = [\text{smallest } n_s : SNR_{est}(n_s) > \widehat{SNR}_c]$$

d) Another method involves determining the noise subspace by repeatedly estimating the SNR for different partitions of noise and signal subspaces using c)1) and choosing a partition $n_{start}$ such that $n_{start} = \text{argmax}_{n_s}[SNR_{est}(n_s) - SNR_{est}(n_s-1)]_{n_s=2}^K$.
FIG. 26 is a flow diagram for estimating noise sub-space.

e) FIG. 27 is a flow diagram for estimating noise sub-space, under still another alternative embodiment.
  1) Define $$wLen = \frac{wL + wR}{f_s T_c}.$$

Then the first wLen singular values represent the significant signal-plus-noise subspace or noise subspace singular values (the rest of the singular values represent correlated noise and signal and quantization effects).
  2) Calculate estimate of SNR as follows:
      i. Assume that the noise is represented by the sV(i):i=$n_s$, $n_s+1 \ldots$ wLen; $1 < n_s \leq wLen$, calculate noise variance as:

$$\sigma_{est}^2(n_s) = \frac{\sum_{i=n_s}^{wLen} sV(i)}{wLen - n_s + 1}$$

ii. Calculate the signal power as $P_{sig}(n_s) = \Sigma_{i=1}^{n_s-1}[sV(i) - \sigma_{est}^2(n_s)]$
      iii. Estimate of SNR:

$$SNR_{est}(n_s) = \frac{P_{sig}(n_s)}{\sigma_{est}^2(n_s)}$$

3) Define $n_{start} = [\text{smallest } n_s: SNR_{est}(n_s) > (SNR_{est}(wLen) - thresDB)]$. Then $n_{start}$ up to winLen represent the noise singular values. A typical value of thresDB is 10.

12. Choose the corresponding noise right-singular vectors to build $V_N$ i.e., choose all vectors in V which correspond to the noise singular values and build the noise subspace matrix $V_N$.

13. Estimate Time of Arrival of the first path:
  a) Define $$\omega(\tau) = \left[ 1 \quad e^{\frac{j2\pi}{N_{fft}}\tau} \quad e^{\frac{j2\pi}{N_{fft}}2\tau} \quad e^{\frac{j2\pi}{N_{fft}}3\tau} \quad \ldots \quad e^{\frac{j2\pi}{N_{fft}}(M-1)\tau} \right]^H$$

b) Calculate $$\Omega(\tau) = \frac{1}{\omega(\tau)^H V_N V_N^H \omega(\tau)}$$

for a range of values of $\tau(\tau \in [\tau_{max}, -\tau_{max}])$. The resolution of search $\Delta\tau$ can be chosen as small as required. As an example, $\tau_{max}=5$ and $\Delta\tau=0.05$ so that $\tau$ is searched for in the range [−5,5] in steps of 0.05.

14. Peaks of $\Omega(\tau)$ will provide the positions of channel impulses relative to the coarse peak, $n_{peak}$. Theoretically, first peak will correspond to LOS path. Based on information about the propagation environment which could be encoded in the transmission from the basestation, it is possible to control $\tau_{max}$. For example, if the delay-spread is large, then $\tau_{max}$ can be chosen to be larger (e.g., 10) and if it is less than $\tau_{max}$ can be chosen as a smaller value (e.g., 4).

Combination Methods: Apart from the standalone methods discussed above, numerous other combination methods are possible. Combination of schemes based on SNR on chip is an effective method. The following describes a list of combination schemes that can be realized in practice:

1. For chipSNR less than chipSNRRef, pick method 12(*d*) to choose noise singular values. Otherwise choose method 12(*a*).
2. For chipSNR greater than chipSNRRef, pick method 12(*d*) to choose noise singular values and estimate peak position. Otherwise, use direct peak estimation techniques (such as peak interpolation, peak shape) starting from the cross-correlation function z[n].
3. For chipSNR less than chipSNRRef, pick method 12(*e*) to choose noise singular values. Otherwise choose method 12(*a*).

A typical value of chipSNRRef is 10 dB.

Embodiments described herein include a method for transmitting position location signals from a plurality of transmitters. The method comprises selecting a set of digital pseudorandom sequences. Magnitudes of a cross-correlation function between any two sequences of the set of digital pseudorandom sequences are below a specified threshold. The method comprises selecting from the set of digital pseudorandom sequences a subset of digital pseudorandom sequences. The magnitudes of an autocorrelation function of each member of the subset of digital pseudorandom sequences, within a specified region adjacent to a peak of the autocorrelation function, are at least one of equal to and less than a prescribed value. The method comprises transmitting from each transmitter of the plurality of transmitters a positioning signal. At least a first portion of each positioning signal is modulated in accordance with at least one member of the subset of digital pseudorandom sequences. At least two transmitters of the plurality of transmitters modulate the first portion of respective positioning signals in accordance with different members of the subset of digital pseudorandom sequences.

Embodiments described herein include a method for transmitting position location signals from a plurality of transmitters, comprising: selecting a set of digital pseudorandom sequences, wherein magnitudes of a cross-correlation function between any two sequences of the set of digital pseudorandom sequences are below a specified threshold; selecting from the set of digital pseudorandom sequences a subset of digital pseudorandom sequences, wherein the magnitudes of an autocorrelation function of each member of the subset of digital pseudorandom sequences, within a specified region adjacent to a peak of the autocorrelation function, are at least one of equal to and less than a prescribed value; and transmitting from each transmitter of the plurality of transmitters a positioning signal, wherein at least a first portion of each positioning signal is modulated in accordance with at least one member of the subset of digital pseudorandom sequences, wherein at least two transmitters of the plurality of transmitters modulate the first portion of respective positioning signals in accordance with different members of the subset of digital pseudorandom sequences.

The set of digital pseudorandom sequences comprises a set of binary pseudorandom sequences.

The set of binary pseudorandom sequences is selected from a set of Gold codes.

The prescribed value is the peak value of the autocorrelation function divided by a non-repeating length of the digital pseudorandom sequences.

The set of binary pseudorandom sequences is one of Kasami codes, Bent codes, and Gold-like codes.

At least one digital pseudorandom sequence of the set of digital pseudorandom sequences has a truncated sequence length, wherein the truncated sequence length is shorter than a standard sequence length.

At least one digital pseudorandom sequence of the set of digital pseudorandom sequences has an extended sequence length, wherein the extended sequence length is longer than a standard sequence length.

The method comprises transmitting from at least one of the plurality of transmitters a positioning signal during a first period of time for which the first portion of the positioning signal is modulated with a first member of the subset of digital pseudorandom sequences, wherein the first member of the subset of digital pseudorandom sequences has a first length, and transmitting the positioning signal during a second period of time for which a second portion of the positioning signal is modulated with a second member of the subset of digital pseudorandom sequences, wherein the second member of the subset of digital pseudorandom sequences has a second length.

The first length and the second length are different.

The second portion of the positioning signal is further modulated in accordance with a data sequence.

The set of digital pseudorandom sequences have an alphabet size greater than two (2).

The set of digital pseudorandom sequences is a set of quaternary sequences.

The alphabet size is a power of two (2).

The specified region adjacent to the peak of the autocorrelation function comprises at least ten (10) consecutive symbols immediately adjacent to the peak of the autocorrelation function.

Embodiments described herein include a transmitter in a positioning system comprising a plurality of transmitters. The transmitter comprises a processor coupled to a memory. The processor is running at least one application. The at least one application selects a set of digital pseudorandom sequences, and magnitudes of a cross-correlation function between any two sequences of the set of digital pseudorandom sequences are below a specified threshold. The at least one application selects from the set of digital pseudorandom sequences a subset of digital pseudorandom sequences. The magnitudes of an autocorrelation function of each member of the subset of digital pseudorandom sequences, within a specified region adjacent to a peak of the autocorrelation function, are at least one of equal to and less than a prescribed value. The at least one application transmits a positioning signal, wherein at least a first portion of the positioning signal is modulated in accordance with at least one member of the subset of digital pseudorandom sequences. The transmitter modulates positioning signals in accordance with a member of the subset of digital pseudorandom sequences different than that used by at least one other transmitter in the plurality of transmitters.

Embodiments described herein include a transmitter in a positioning system comprising a plurality of transmitters, the transmitter comprising: a processor coupled to a memory, wherein the processor is running at least one application, wherein the at least one application, selects a set of digital pseudorandom sequences, wherein magnitudes of a cross-correlation function between any two sequences of the set of digital pseudorandom sequences are below a specified threshold; selects from the set of digital pseudorandom sequences a subset of digital pseudorandom sequences, wherein the magnitudes of an autocorrelation function of each member of the subset of digital pseudorandom sequences, within a specified region adjacent to a peak of the autocorrelation function, are at least one of equal to and less than a prescribed value; and transmits a positioning signal, wherein at least a first portion of the positioning signal is modulated in accordance with at least one member of the subset of digital pseudorandom sequences, wherein the transmitter modulates positioning signals in accordance with a member of the subset of digital pseudorandom sequences different than that used by at least one other transmitter in the plurality of transmitters.

The set of digital pseudorandom sequences comprises a set of binary pseudorandom sequences.

The set of binary pseudorandom sequences is selected from a set of Gold codes.

The prescribed value is the peak value of the autocorrelation function divided by a non-repeating length of the digital pseudorandom sequences.

The set of binary pseudorandom sequences is one of Kasami codes, Bent codes, and Gold-like codes.

At least one digital pseudorandom sequence of the set of digital pseudorandom sequences has a truncated sequence length, wherein the truncated sequence length is shorter than a standard sequence length.

At least one digital pseudorandom sequence of the set of digital pseudorandom sequences has an extended sequence length, wherein the extended sequence length is longer than a standard sequence length.

The transmitter comprises transmitting the positioning signal during a first period of time for which first portion of the positioning signal is modulated in accordance with a first member of the subset of digital pseudorandom sequences, wherein the first member of the subset of digital pseudorandom sequences has a first length, and transmitting the positioning signal during a second period of time for which a second portion of the positioning signal is modulated with a second member of the subset of digital pseudorandom sequences, wherein the second member of the subset of digital pseudorandom sequences has a second length.

The first length and the second length are different.

The set of digital pseudorandom sequences have an alphabet size greater than two (2).

The set of digital pseudorandom sequences is a set of quaternary sequences.

The alphabet size is a power of two (2).

The specified region adjacent to the peak of the autocorrelation function comprises at least ten (10) consecutive symbols immediately adjacent to the peak of the autocorrelation function.

The first portion of the positioning signal is modulated in accordance with a member of the subset of digital pseudorandom sequences, and a second portion of the positioning signal includes the positioning signal further modulated in accordance with a data sequence.

The plurality of transmitters is synchronized.

The plurality of transmitters transmits assistance data.

The plurality of transmitters forms a CDMA network.

The plurality of transmitters forms a TDMA network.

A carrier signal of at least one transmitter is offset in frequency from the carrier signal of at least one other transmitter of the plurality of transmitters.

The assistance data comprises at least one of system time at a rising edge of a pulse of a waveform, system time at a falling edge of a pulse of a waveform, geocode data of the plurality of transmitters, geocode data of transmitters adjacent to each of the plurality of transmitters, index of a sequence used by at least one transmitter in proximity of the plurality of transmitters, clock timing corrections for at least one transmitter, local atmospheric corrections, and indication of local environment.

Embodiments described herein include a receiver in a positioning system. The receiver comprises a processor coupled to a memory. The processor is running at least one application that acquires positioning signals from a plurality of transmitters and computes position information of the receiver using the positioning signals. At least a first portion of a first positioning signal is modulated in accordance with a member of a subset of digital pseudorandom sequences. At least a first portion of a second positioning signal is modulated in accordance with a different member of the subset of digital pseudorandom sequences. Selection of the subset of digital pseudorandom sequences comprises selecting a set of digital pseudorandom sequences such that magnitudes of a cross-correlation function between any two sequences of the set of digital pseudorandom sequences are below a specified threshold, and selecting the subset of digital pseudorandom sequences from the set of digital pseudorandom sequences. The magnitudes of an autocorrelation function of each member of the subset of digital pseudorandom sequences, within a specified region adjacent to the peak of the autocorrelation function, are at least one of equal to and less than a prescribed value.

Embodiments described herein include a receiver in a positioning system, comprising: a processor coupled to a memory, wherein the processor is running at least one application that acquires positioning signals from a plurality of transmitters and computes position information of the receiver using the positioning signals, wherein at least a first portion of a first positioning signal is modulated in accordance with a member of a subset of digital pseudorandom sequences, wherein at least a first portion of a second positioning signal is modulated in accordance with a different member of the subset of digital pseudorandom sequences; wherein selection of the subset of digital pseudorandom sequences comprises selecting a set of digital pseudorandom sequences such that magnitudes of a cross-correlation function between any two sequences of the set of digital pseudorandom sequences are below a specified threshold, and selecting the subset of digital pseudorandom sequences from the set of digital pseudorandom sequences, wherein the magnitudes of an autocorrelation function of each member of the subset of digital pseudorandom sequences, within a specified region adjacent to the peak of the autocorrelation function, are at least one of equal to and less than a prescribed value.

The set of digital pseudorandom sequences comprises a set of binary pseudorandom sequences.

The set of binary pseudorandom sequences is selected from a set of Gold codes.

The prescribed value is the peak value of the autocorrelation function divided by a non-repeating length of the digital pseudorandom sequences.

The set of binary pseudorandom sequences is one of Kasami codes, Bent codes, and Gold-like codes.

At least one digital pseudorandom sequence of the set of digital pseudorandom sequences has a truncated sequence length, wherein the truncated sequence length is shorter than a standard sequence length.

At least one digital pseudorandom sequence of the set of digital pseudorandom sequences has an extended sequence length, wherein the extended sequence length is longer than a standard sequence length.

A second portion of the first positioning signal is modulated in accordance with a member of the subset of digital pseudorandom sequences.

The member of the subset of digital pseudorandom sequences used to modulate the first portion has a first sequence length, and the member of the subset of digital pseudorandom sequences used to modulate the second portion has a second sequence length, and the first sequence length is different from the second sequence length.

The member of the subset of digital pseudorandom sequences used to modulate the first portion is different from the member of the subset of digital pseudorandom sequences used to modulate the second portion.

The set of digital pseudorandom sequences have an alphabet size greater than two (2).

The set of digital pseudorandom sequences is a set of quaternary sequences.

The alphabet size is a power of two (2).

The specified region adjacent to the peak of the autocorrelation function comprises at least ten (10) consecutive symbols immediately adjacent to the peak of the autocorrelation function.

A first portion of the positioning signal is modulated with a member of the subset of digital pseudorandom sequences, and a second portion of the positioning signal includes the positioning signal further modulated in accordance with a data sequence.

The positioning signal includes data describing timing differences between transmissions from different transmitters of the plurality of transmitters.

Each of the positioning signals is initially synchronized to a time reference, and timing corrections corresponding to the synchronization are provided to the receiver.

The receiver identifies multipath components of the positioning signals using high resolution earliest time of arrival estimates that include an estimated reference correlation function.

The receiver identifies multipath components of the positioning signals using high resolution earliest time of arrival estimates that include a partitioning of signal and noise subspaces.

The receiver identifies multipath components of the positioning signals by generating a cross-correlation function by cross-correlating received samples with a sequence transmitted from a transmitter, and extracting from the cross-correlation function a peak vector that includes a first number of samples left of a peak of the cross-correlation function and a second number of samples right of the peak.

The receiver identifies multipath components of the positioning signals by generating a reference peak vector from a correlation function measured in a channel environment that has low noise and at least one of easily separable multipath and no-multipath components, and improving a signal-to-noise ratio in the peak vector by coherently averaging across at least a plurality of pseudorandom code periods.

The receiver identifies multipath components of the positioning signals by calculating a Fourier Transform of the peak vector, and generating a frequency domain estimate of a channel corresponding to the transmitted sequence using the Fourier Transform of a measured peak vector and the Fourier Transform of the reference peak vector.

The receiver identifies multipath components of the positioning signals by generating a reduced channel estimate vector from the frequency domain estimate of the channel, defining an estimated covariance matrix of the reduced channel estimate vector, and performing singular value decomposition on the estimated covariance matrix.

The receiver identifies multipath components of the positioning signals by generating a vector of sorted singular values, and using the vector of sorted singular values to separate signal and noise subspaces, generating a noise subspace matrix, and estimating time of arrival of a first path using the noise subspace matrix.

The receiver receives assistance data, wherein the assistance data comprises at least one of system time at a rising edge of a pulse of a waveform, system time at a falling edge of a pulse of a waveform, geocode data of the plurality of transmitters, geocode data of adjacent transmitters adjacent to the plurality of transmitters, index of a sequence used by at least one transmitter in proximity of the plurality of transmitters, clock timing corrections for at least one transmitter, local atmospheric corrections, relationship of WAPS timing to GNSS time, indication of local environment to aid the receiver in pseudorange resolution, and at least one of an offset from base index of a set of pseudorandom sequences, a list of pseudorandom number sequences from a set of transmitters, and a list of transmitters that utilize a particular pseudorandom number sequence.

Embodiments described herein include a method for determining position information using positioning signals transmitted from a plurality of transmitters. The method comprises selecting a set of digital pseudorandom sequences. Magnitudes of a cross-correlation function between any two sequences of the set of digital pseudorandom sequences are below a specified threshold. The method comprises selecting from the set of digital pseudorandom sequences a subset of digital pseudorandom sequences. The magnitudes of an autocorrelation function of each member of the subset of digital pseudorandom sequences, within a specified region adjacent to a peak of the autocorrelation function, are at least one of equal to and less than a prescribed value. The method comprises transmitting from each transmitter of the plurality of transmitters a positioning signal. At least a first portion of the positioning signal is modulated in accordance with at least one member of the subset of digital pseudorandom sequences. At least two transmitters of the plurality of transmitters modulate the first portion of respective positioning signals in accordance with different members of the subset of digital pseudorandom sequences. The method comprises receiving at a receiver at least one of the positioning signals and satellite signals. The satellite signals are signals of a satellite-based positioning system. A first operating mode of the receiver comprises terminal-based positioning in which the receiver computes a position of the receiver from at least one of the positioning signals and the satellite signals.

Embodiments described herein include a method for determining position information using positioning signals transmitted from a plurality of transmitters, comprising: selecting a set of digital pseudorandom sequences, wherein magnitudes of a cross-correlation function between any two sequences of the set of digital pseudorandom sequences are below a specified threshold; selecting from the set of digital pseudorandom sequences a subset of digital pseudorandom sequences, wherein the magnitudes of an autocorrelation function of each member of the subset of digital pseudorandom sequences, within a specified region adjacent to a peak of the autocorrelation function, are at least one of equal to and less than a prescribed value; transmitting from each transmitter of the plurality of transmitters a positioning signal, wherein at least a first portion of the positioning signal is modulated in accordance with at least one member of the subset of digital pseudorandom sequences, wherein at least two transmitters of the plurality of transmitters modulate the first portion of respective positioning signals in accordance with different members of the subset of digital pseudorandom sequences; and receiving at a receiver at least one of the positioning signals and satellite signals, wherein the satellite signals are signals of a satellite-based positioning system, wherein a first operating mode of the receiver comprises terminal-based positioning in which the receiver computes a position of the receiver from at least one of the positioning signals and the satellite signals.

The set of digital pseudorandom sequences comprises a set of binary pseudorandom sequences.

The set of binary pseudorandom sequences is selected from a set of Gold codes.

The prescribed value is the peak value of the autocorrelation function divided by a non-repeating length of the digital pseudorandom sequence.

The set of binary pseudorandom sequences is one of Kasami codes, Bent codes, and Gold-like codes.

At least one digital pseudorandom sequence of the set of digital pseudorandom sequences has a truncated sequence length, wherein the truncated sequence length is shorter than a standard sequence length.

At least one digital pseudorandom sequence of the set of digital pseudorandom sequences has an extended sequence length, wherein the extended sequence length is longer than a standard sequence length.

The method comprises transmitting from at least one of the plurality of transmitters a positioning signal during a first period of time for which the first portion of the positioning signal is modulated with a first member of the subset of digital pseudorandom sequences, wherein the first member of the subset of digital pseudorandom sequences has a first length, and transmitting the positioning signal during a second period of time for which a second portion of the positioning signal is modulated with a second member of the subset of digital pseudorandom sequences, wherein the second member of the subset of digital pseudorandom sequences has a second length.

The first length and the second length are different.

The set of digital pseudorandom sequences have an alphabet size greater than two (2).

The set of digital pseudorandom sequences is a set of quaternary sequences.

The alphabet size is a power of two (2).

The specified region adjacent to the peak of the autocorrelation function comprises at least ten (10) consecutive symbols immediately adjacent to the peak of the autocorrelation function.

A second portion of the positioning signal is further modulated according to a data sequence.

A second operating mode of the receiver comprises network-based positioning in which a server computes a position of the receiver from information derived from at least one of the positioning signals and the satellite signals, wherein the receiver receives and transfers to the server information derived from at least one of the positioning signals and the satellite signals.

Embodiments described herein include a positioning system. The system comprises a terrestrial transmitter network comprising a plurality of transmitters that broadcast positioning signals and positioning data. The positioning data comprises data bits used to compute a distance to a transmitter broadcasting the positioning signals and the positioning data. The plurality of transmitters selects a set of digital pseudorandom sequences. Magnitudes of a cross-correlation function between any two sequences of the set of digital pseudorandom sequences are below a specified threshold. The plurality of transmitters selects from the set of digital pseudorandom sequences a subset of digital pseudorandom sequences. The magnitudes of an autocorrelation function of each member of the subset of digital pseudorandom sequences, within a specified region adjacent to a peak of the autocorrelation function, are at least one of equal to and less than a prescribed value. For each transmitter at least a first portion of the positioning signal is modulated with at least one member of the subset of digital pseudorandom sequences. At least two transmitters of the plurality of transmitters modulate positioning signals with different members of the subset of digital pseudorandom sequences.

Embodiments described herein include a positioning system comprising: a terrestrial transmitter network comprising a plurality of transmitters that broadcast positioning signals and positioning data, wherein the positioning data comprises data bits used to compute a distance to a transmitter broadcasting the positioning signals and the positioning data; wherein the plurality of transmitters select a set of digital pseudorandom sequences, wherein magnitudes of a cross-correlation function between any two sequences of the set of digital pseudorandom sequences are below a specified threshold; wherein the plurality of transmitters select from the set of digital pseudorandom sequences a subset of digital pseudorandom sequences, wherein the magnitudes of an autocorrelation function of each member of the subset of digital pseudorandom sequences, within a specified region adjacent to a peak of the autocorrelation function, are at least one of equal to and less than a prescribed value; wherein for each transmitter at least a first portion of the positioning signal is modulated with at least one member of the subset of digital pseudorandom sequences, wherein at least two transmitters of the plurality of transmitters modulate positioning signals with different members of the subset of digital pseudorandom sequences.

The system comprises a receiver that acquires at least one of the positioning signals and satellite signals, wherein the satellite signals are signals of a satellite-based positioning system, wherein a first operating mode of the receiver comprises terminal-based positioning in which the receiver computes a position of the receiver from at least one of the positioning signals and the satellite signals.

The system comprises a server coupled to the receiver, wherein a second operating mode of the receiver comprises network-based positioning in which the server computes a position of the receiver from information derived from at least one of the positioning signals and the satellite signals, wherein the receiver receives and transfers to the server information derived from at least one of the positioning signals and the satellite signals.

The set of digital pseudorandom sequences comprises a set of binary pseudorandom sequences.

The set of binary pseudorandom sequences is selected from a set of Gold codes.

The prescribed value is the peak value of the autocorrelation function divided by a non-repeating length of the digital pseudorandom sequence.

The set of binary pseudorandom sequences is one of Kasami codes, Bent codes, and Gold-like codes.

At least one digital pseudorandom sequence of the set of digital pseudorandom sequences has a truncated sequence length, wherein the truncated sequence length is shorter than a standard sequence length.

At least one digital pseudorandom sequence of the set of digital pseudorandom sequences has an extended sequence length, wherein the extended sequence length is longer than a standard sequence length.

The system comprises transmitting from at least one of the plurality of transmitters a positioning signal during a first period of time for which the first portion of the positioning signal is modulated with a first member of the subset of digital pseudorandom sequences, wherein the first member of the subset of digital pseudorandom sequences has a first length, and transmitting the positioning signal during a second period of time for which a second portion of the positioning signal is modulated with a second member of the subset of digital pseudorandom sequences, wherein the second member of the subset of digital pseudorandom sequences has a second length.

The first length and the second length are different.

The set of digital pseudorandom sequences have an alphabet size greater than two (2).

The set of digital pseudorandom sequences is a set of quaternary sequences.

The alphabet size is a power of two (2).

The specified region adjacent to the peak of the autocorrelation function comprises at least ten (10) consecutive symbols immediately adjacent to the peak of the autocorrelation function.

A first portion of the positioning signal is modulated with a member of the subset of digital pseudorandom sequences, and a second portion of the positioning signal is further modulated according to a data sequence comprising the positioning data.

The system comprises a communication system coupled to at least one of the receivers and the plurality of transmitters, wherein the communication system is a cellular communication system.

The plurality of transmitters are synchronized.

Each transmitter of the plurality of transmitters transmits the positioning data including assistance data, wherein the assistance data comprises at least one of system time at an epoch of a waveform, geocode data of the plurality of transmitters, geocode data of adjacent transmitters adjacent to the plurality of transmitters, index of a sequence used by at least one transmitter in proximity of the plurality of transmitters, clock timing corrections for at least one transmitter, local atmospheric corrections, indication of local environment to aid the receiver in pseudorange resolution, and at least one of an offset from base index of the set of digital pseudorandom sequences, a list of digital pseudorandom sequences from a set of transmitters, and a list of transmitters that utilize a particular digital pseudorandom number sequence.

The signals transmitted by the plurality of transmitters comprise a preamble for at least one of frequency acquisition and timing alignment.

The plurality of transmitters forms a CDMA network.

The plurality of transmitters forms a TDMA network.

A carrier signal of each transmitter is offset from at least one other carrier signal of other transmitters of the plurality of transmitters.

The plurality of transmitters are positioned so that the receiver receives signals from at least three transmitters and a geometric dilution of precision in each position is less than a threshold value, wherein the position of each of the plurality of transmitters is determined by minimizing a function that is a volume integration of a square of the geometric dilution of precision over a coverage volume, wherein the volume integration is with respect to coordinates of a position of the receiver, wherein the minimizing of the function is with respect to transmitter position coordinates of transmitters of the plurality of transmitters in a specified coverage area in the coverage volume, wherein the function is weighted according to performance quality of a coverage region.

Each transmitter of the plurality of transmitters is synchronized to a time reference, and a timing correction of each transmitter is provided to the receiver.

The receiver receives assistance data that comprises at least one of system time at an epoch of a waveform, system time at a falling edge of a pulse of a waveform, geocode data of the plurality of transmitters, geocode data of transmitters adjacent to the plurality of transmitters, index of a sequence used by at least one transmitter in proximity of the plurality of transmitters, clock timing corrections for at least one transmitter, local atmospheric corrections, indication of local environment to aid the receiver in pseudorange resolution, and at least one of an offset from base index of the set of digital pseudorandom sequences, a list of digital pseudorandom sequences from a set of transmitters, and a list of transmitters that utilize a particular digital pseudorandom number sequence.

ADDITIONAL ASPECTS

Functionality and operation disclosed herein may be embodied as one or more methods implemented, in whole or in part, by machine(s)—e.g., processor(s), computers, or other suitable means known in the art—at one or more locations, which enhances the functionality of those machines, as well as computing devices that incorporate those machines. Non-transitory machine-readable media embodying program instructions adapted to be executed to implement the method(s) are also contemplated. Execution of the program instructions by one or more processors cause the processors to carry out the method(s).

It is noted that method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency.

By way of example, not by way of limitation, method(s) and processor(s) or other means may: identify a set of codes, wherein a magnitude of an autocorrelation function of each member of the set of codes, within a specified zonal region adjacent to a peak of the autocorrelation function, is equal to or less than a first prescribed value; identify a subset of codes, from among two or more subsets of codes in the set of codes, that optimizes a performance criterion, wherein the performance criterion is associated with a relationship between members within any subset of the two or more subsets.

In accordance with some aspects, the subset is identified from the set such that magnitudes of a cross-correlation function of any pair of sequences within the subset are equal to or less than a second prescribed value.

In accordance with some aspects, the subset that optimizes the performance criterion minimizes a maximum magnitude of a cross-correlation between each pair of non-identical codes of that subset (e.g., as compared to the other subsets of the two or more subsets).

In accordance with some aspects, the first prescribed value is equal to or less than one-half of the maximum magnitude of the cross-correlation.

In accordance with some aspects, the first prescribed value is equal to or less than one-tenth of the maximum magnitude of the cross-correlation.

In accordance with some aspects, a set of frequency offset modulated (FOM) signals is generated, wherein each of the members of the set of FOM signals are generated by modulating each signal with a member of the set of codes, and further modulating each signal with a carrier whose frequency is chosen among a set of offsets relative to a base offset frequency.

In accordance with some aspects, the performance criterion includes the maximum magnitude of the cross-correlation between all pairs of FOM signals, where each pair has different codes and where frequency offsets associated with each pair are within a range.

In accordance with some aspects, the first prescribed value is equal to or less than one-half of the maximum magnitude of the cross-correlation between the FOM signals.

In accordance with some aspects, the first prescribed value is equal to or less than one-tenth of the maximum magnitude of the cross-correlation between said FOM signals.

Method(s) and processor(s) or other means may further or alternatively: identify a first code from the subset; encode at least a portion of a first positioning signal using the identified first code; and cause the first positioning signal to be sent from a first transmitter.

Method(s) and processor(s) or other means may further or alternatively: identify a second code from the subset; encode at least a portion of a second positioning signal using the identified second code; and cause the second positioning signal to be sent from a second transmitter.

In accordance with some aspects, the second positioning signal is transmitted at an offset frequency relative to the first positioning signal.

In accordance with some aspects, the first code is selected at the first transmitter, and where the second code is selected at the second transmitter. In accordance with some aspects, the first code and the second code are selected at a remote server system.

Method(s) and processor(s) or other means may further or alternatively: determine positioning information using the first positioning signal and the second positioning signal.

Method(s) and processor(s) or other means may further or alternatively: receive, at the receiver, the first and second positioning signals; and determine, based at least in part on the first and second positioning signals, information associated with a location of the receiver.

In accordance with some aspects, the information associated with the location of the receiver is further determined in part based on one or more received global navigation satellite system (GNSS) signals.

In accordance with some aspects, each subset of the plurality of subsets contains an equal number of codes. In accordance with some aspects, each subset of the plurality of subsets includes respective numbers of codes that are within a range of sizes.

Method(s) and processor(s) or other means may further or alternatively: receive, at a first processor, data associated with the first and second positioning signals; and determine, based at least in part on the data associated with the first and second positioning signals, an estimated location of the receiver.

In accordance with some aspects, the performance criterion is optimized when the maximum magnitude of the cross-correlation function between members of the subset, when modulated at each of one or more offset frequencies, is less than the maximum cross-correlation magnitude of other subsets in the set.

In accordance with some aspects, the subset optimizes the performance criterion when a cross-correlation condition associated with the subset codes is preferred over the cross-correlation condition associated with another subset of codes.

In accordance with some aspects, the subset optimizes the performance criterion when a cross-correlation magnitude associated with the subset of codes is less than a cross-correlation magnitude associated with the other subset of codes.

In accordance with some aspects, the subset optimizes the performance criterion when a result achieved by codes within the subset in relation to the performance criterion is preferred over another result achieved by codes within another subset in relation to the performance criterion.

In accordance with some aspects, the performance criterion is associated with a relationship between all pairs of signals that are modulated with different members within the subset and further modulated with carrier frequencies that are chosen among a set of offsets relative to a base frequency. In accordance with some aspects, the relationship is the maximum cross-correlation magnitude over all the pairs of signals.

Method(s) and processor(s) or other means may further or alternatively: identify a first code from a subset of codes within a set of codes, wherein a magnitude of an autocorrelation function of each member of the set of codes, within a zonal region adjacent to a peak of the autocorrelation function, meets a threshold condition, and wherein the subset optimizes a performance criterion between its members compared to other subsets of the set.

In accordance with some aspects, the subset that optimizes the performance criterion minimizes a maximum magnitude of a cross-correlation between pairs of members of that subset.

In accordance with some aspects, the subset that optimizes the performance criterion minimizes a maximum magnitude of a cross-correlation between each pair of non-identical codes of that subset, a set of frequency offset modulated (FOM) signals is generated, the members of the set of FOM signals are generated by modulating a carrier frequency signal with a member of the set of codes, an offset frequency for the FOM signals is chosen among a predefined set of offset frequencies, and the performance criterion includes a minimization of the maximum magnitude of the cross-correlation between all pairs of FOM signals, where each pair has different codes and wherein frequency offsets associated with each pair are within a specified range.

Method(s) and processor(s) or other means may further or alternatively: identify (e.g., select) a first code from the subset; cause at least a portion of a first positioning signal to be encoded using the identified first code (e.g., applies the code to the signal); cause the first positioning signal to be sent from a first transmitter; identify (e.g., select) a second code from the subset; cause at least a portion of a second positioning signal to be encoded using the identified second code (e.g., applies the code to the signal); and cause the second positioning signal to be sent from a second transmitter, where the second positioning signal is transmitted at an offset frequency relative to the first positioning signal, and where the subset optimizes the performance criterion when a cross-correlation condition associated with the subset codes is preferred over the cross-correlation condition associated with another subset of codes.

Method(s) and processor(s) or other means may further or alternatively: receive a first positioning signal that is encoded at least in part with a first code selected from a subset of a set of codes, wherein the set of codes are characterized by having a magnitude of an autocorrelation function of each member of the set, within a specified zonal region adjacent to a peak of the autocorrelation function, equal to or less than a first prescribed value, and wherein the subset is selected from among a group of subsets to optimize a performance criterion in comparison to the other subsets of the group, wherein the performance criterion is associated with a relationship between members of any subset; receive a second positioning signal that is encoded at least in part with a second code from the subset of codes; and determine, based at least in part on the first and second positioning signals, positioning information associated with a receiver.

In accordance with some aspects, the second positioning signal is sent at an offset frequency relative to the first positioning signal, wherein the offset frequency is selected from a set of one or more predefined offset frequencies.

In accordance with some aspects, each subset of the group of subsets has a number of codes that falls within a specified range of numbers. In accordance with some aspects, the positioning information is determined further based at least in part on a received GNSS signal. In accordance with some aspects, the subset that optimizes the performance criterion minimizes a magnitude of a cross-correlation between pairs of members of that subset.

In accordance with some aspects, a set of frequency offset modulated (FOM) signals is generated, where the members of the set of FOM signals are generated by modulating a carrier frequency signal with a member of the set of codes, where an offset frequency for the FOM signals is chosen among a predefined set of offset frequencies, where the performance criterion includes a minimization of the maximum magnitude of the cross-correlation between all pairs of FOM signals, where each pair has different codes and wherein frequency offsets associated with each pair are within a specified range, and where the subset optimizes the performance criterion when a cross-correlation condition associated with the subset codes is preferred over the cross-correlation condition associated with another subset of codes.

Method(s) and processor(s) or other means may further or alternatively: identify a first code from the subset; encode at least a portion of a first positioning signal using the identified first code; cause the first positioning signal to be sent from a first transmitter; identify a second code from the subset; encode at least a portion of a second positioning signal using the identified second code; and cause the second positioning signal to be sent from a second transmitter, where the subset that optimizes the performance criterion minimizes a maximum magnitude of cross-correlations over all pairs of non-identical codes of that subset.

The requirements discussed above in this Section (Additional Aspects) to optimize a criterion may be replaced by merely meeting a criterion. Again, this may be done, for example, when the optimization is too laborious to compute or where some additional constraints may be placed upon the subset of codes.

Method(s) and processor(s) or other means may further or alternatively: encode at least a portion of a first positioning signal using a first code; encode at least a portion of a second positioning signal using a second code; cause the encoded first positioning signal to be sent from a first transmitter; and cause the encoded second positioning signal to be sent from the second transmitter, where the first and second codes are included among members of a first set of codes that optimize a performance criterion associated with a relationship between the members of the first set of codes, and where the first and second codes are included among members of a second set of codes characterized by having a magnitude of an autocorrelation function within a zonal region adjacent to a peak of the autocorrelation function that is equal to or less than a first prescribed value. In accordance with some aspects, the second positioning signal is sent from the second transmitter at an offset frequency relative to the first positioning signal. In accordance with other aspects, the offset frequency is selected from a predefined set of offset frequencies.

Although certain embodiments describe subsets of codes from a set of codes, it is contemplated that codes may belong to two sets that are not necessarily related to each other beyond including one or more shared codes. Additionally, it is contemplated that the auto and cross correlation analyses may occur in a different order (e.g., choosing a set of codes with good cross-correlation properties and then optimizing to get a subset of those codes with good autocorrelation properties). Also, it is contemplated that the auto and cross correlation analyses may occur independent of one another, and codes are selected from an intersection of codes that are determined from each analysis.

Systems may include any or all of: transmitters from which positioning signals are transmitted using identified codes; one or more receivers at which positioning information is received and used to compute a position of the respective receiver; one or more servers at which positioning information is received and used to compute a position of a receiver; both receivers and servers; or other components.

An output from one system may cause another system to perform a method even if intervening steps occur between the output and performance of the method.

The illustrative methods described herein may be implemented, performed, or otherwise controlled by suitable hardware known or later-developed by one of skill in the art, or by firmware or software executed by processor(s), or any combination of hardware, software and firmware. Software may be downloadable and non-downloadable at a particular system. Such software, once loaded on a machine, changes the operation of that machine.

Systems on which methods described herein are performed may include one or more means that implement those methods. For example, such means may include processor(s) or other hardware that, when executing instructions (e.g., embodied in software or firmware), perform any method step disclosed herein. A processor may include, or be included within, a computer or computing device, a controller, an integrated circuit, a "chip", a system on a chip, a server, other programmable logic devices, other circuitry, or any combination thereof.

"Memory" may be accessible by a machine (e.g., a processor), such that the machine can read/write information from/to the memory. Memory may be integral with or separate from the machine. Memory may include a non-transitory machine-readable medium having machine-readable program code (e.g., instructions) embodied therein that is adapted to be executed to implement any or all of the methods and method steps disclosed herein. Memory may include any available storage media, including removable, non-removable, volatile, and non-volatile media—e.g., integrated circuit media, magnetic storage media, optical storage media, or any other computer data storage media. As used herein, machine-readable media includes all forms of machine-readable media except to the extent that such media is deemed to be non-statutory (e.g., transitory propagating signals).

Application programs may carry out aspects by receiving, converting, processing, storing, retrieving, transferring and/or exporting data, which may be stored in a hierarchical, network, relational, non-relational, object-oriented, or other data source. A data source may be a single storage device or realized by multiple (e.g., distributed) storage devices.

All of the information disclosed herein may be represented by data, and that data may be transmitted over any communication pathway using any protocol, stored on a data source, and processed by a processor. For example, transmission of data may be carried out using a variety of wires, cables, radio signals and infrared light beams, and an even greater variety of connectors, plugs and protocols even if not shown or explicitly described. Systems described herein may exchange information with each other (and with other systems that are not described) using any known or later-developed communication technology, including WiFi, Bluetooth, NFC and other communication network technologies. Carrier waves may be used to transfer data and instructions through electronic, optical, air, electromagnetic, RF, or other signaling media over a network using network transfer protocols. Data, instructions, commands, information, signals, bits, symbols, and chips disclosed herein may be represented by voltages, currents, electromagnetic waves, magnetic fields or particles, optical fields or particles, or any combination thereof.

Different systems disclosed herein may be geographically dispersed from one another in different regions (e.g., cities, countries), such that different method steps are performed in different regions and by different systems.

Features in system figures that are illustrated as rectangles may refer to hardware, firmware or software, each of which may comprise a component of a device. It is noted that lines linking two such features may be illustrative of data transfer between those features. Such transfer may occur directly between those features or through intermediate features even if not illustrated. Where no line connects two features, transfer of data between those features is contemplated unless otherwise stated. Thus, such lines are provided to illustrate certain aspects, but should not be interpreted as limiting. The words comprise, comprising, include, including and the like are to be construed in an inclusive sense (i.e., not limited to) as opposed to an exclusive sense (i.e., consisting only of). Words using the singular or plural number also include the plural or singular number, respectively. The words or or and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment. This disclosure is not intended to be limited to the aspects shown herein but is to be accorded the widest scope understood by a skilled artisan, including equivalents.

It is noted that the term "GPS" may refer to any Global Navigation Satellite Systems (GNSS), such as GLONASS, Galileo, and Compass/Beidou, and vice versa.

A "receiver" may be in the form of a computing device (e.g., a mobile phone, a tablet, a PDA, a laptop, a digital camera, a tracking tag). A receiver may also take the form of any component of the computer, including a processor.

Performing the operations disclosed herein on a multiplicity of signals from a multiplicity of beacons, whose locations are accurately known, allows determination of the receiver's location via trilateration algorithms. For example, in the system 100 of FIG. 1, three or more transmitters 110 may send uniquely encoded signals to the receiver 120, which may then estimate the distance to each of the transmitters 110, and triangulate a position from the estimated distances.

Certain aspects disclosed herein relate to a positioning system that estimates the positions of things—e.g., where the position is represented in terms of: latitude, longitude, and/or altitude coordinates; x, y, and/or z coordinates; angular coordinates; or other representations. Positioning systems use various techniques to estimate the position of an thing (e.g., a mobile device), including trilateration, which is the process of using geometry to estimate the position using distances traveled by different "ranging" signals that are received by the mobile device from different beacons (e.g., transmitters, satellites, antennas). If the transmission time and reception time of a ranging signal are known, then the difference between those times multiplied by speed of light would provide an estimate of the distance traveled by that ranging signal. These estimates of distance are often referred to as "range" measurements. When errors in the measured time(s) are present, a "range" measurement is typically referred to as a "pseudorange" measurement. Thus, a "pseudorange" measurement is a type of "range" measurement. Positioning systems and methods that estimate a position of a mobile device based on signaling from beacons (e.g., transmitters, and/or satellites) are described in co-assigned U.S. Pat. No. 8,130,141, issued Mar. 6, 2012, and U.S. patent application Ser. No. 13/296,067, filed Nov. 14, 2011.

The disclosure is not intended to be limited to the aspects shown herein but is to be accorded the widest scope understood by a skilled artisan, including equivalent systems and methods. The protection afforded the present invention should only be limited in accordance with the following claims.

RELATED APPLICATION(S)

This application relates to the following United States patent applications, the contents of which are hereby incorporated by reference herein in their entirety: Ser. No. 14/011, 277, filed Aug. 27, 2013, entitled METHODS AND APPARATUS FOR PSEUDO-RANDOM CODING IN A WIDE AREA POSITIONING SYSTEM (WAPS); Ser. No. 14/466, 826, filed Aug. 22, 2014, entitled SYSTEMS AND METHODS FOR PSEUDO-RANDOM CODING; Ser. No. 14/556, 136, filed November 11, 29, entitled CODING IN A POSITIONING SYSTEM; and Ser. No. 13/535,626, filed Jun. 28, 2012, entitled CODING IN A WIDE AREA POSITIONING SYSTEM (WAPS).

The invention claimed is:

1. A method for selecting codes to be used within positioning signals sent from one or more transmitters, the method comprising:
identifying a set of codes, wherein a magnitude of an autocorrelation function of each member of the set of codes, within a specified zonal region adjacent to a peak of the autocorrelation function, is below a first prescribed value;
identifying a subset of codes, from among two or more subsets of codes in the identified set of codes, that optimizes a performance criterion, wherein the performance criterion is associated with a relationship between members within the subset of codes;
transmitting, from a first transmitter, a first positioning signal that is modulated with a first code of the identified subset of codes; and
transmitting, from a second transmitter, a second positioning signal that is modulated with a second code of the identified subset of codes.

2. The method of claim 1, wherein the subset of codes is identified from the set such that magnitudes of a cross-correlation function of any pair of codes within the subset of codes are equal to or less than a second prescribed value.

3. The method of claim 1, wherein the subset of codes that optimizes the performance criterion minimizes a maximum magnitude of a cross-correlation between all pairs of non-identical codes of that subset of codes as compared to the other subsets of codes of the two or more subsets of codes.

4. The method of claim 3, wherein the first prescribed value is equal to or less than one-half of the maximum magnitude of the cross-correlation.

5. The method of claim 3, wherein said first prescribed value is equal to or less than one-tenth of the maximum magnitude of the cross-correlation.

6. The method of claim 1, wherein a set of frequency offset modulated (FOM) signals is generated, wherein each signal of the set of FOM signals is generated by modulating a respective signal of the FOM signals with a code of the identified set of codes, and further modulating the respective signal of the FOM signals with a carrier whose frequency is chosen from among a set of offsets relative to a base offset frequency.

7. The method of claim 6, wherein the performance criterion includes a minimization of the maximum magnitude of the cross-correlation between all pairs of FOM signals, wherein each pair has different codes and wherein frequency offsets associated with each pair are within a specified range.

8. The method of claim 7, wherein the first prescribed value is equal to or less than one-half of the maximum magnitude of the cross-correlation between the FOM signals.

9. The method of claim 7, wherein the first prescribed value is equal to or less than one-tenth of the maximum magnitude of the cross-correlation between said FOM signals.

10. The method of claim 1, wherein the method further comprises:
selecting the first code from the subset of codes prior to transmitting the first positioning signal; and
selecting the second code from the subset of codes prior to transmitting the second positioning signal.

11. The method of claim 10, wherein the second positioning signal is transmitted at an offset frequency relative to the first positioning signal.

12. The method of claim 1, wherein each subset of codes of the two or more subsets of codes contain an equal number of codes.

13. The method of claim 1, wherein each subset of codes of the two or more subsets of codes include respective numbers of codes that are within a range of sizes.

14. The method of claim 1, wherein the performance criterion is associated with a relationship between all pairs of signals that are modulated with different members within the subset of codes and further modulated with carrier frequencies that are chosen from among a set of offsets relative to a base frequency.

15. The method of claim 1, wherein a cross-correlation condition associated with the codes within the identified subset of codes is preferred over the cross-correlation condition associated with the other subsets of codes of the two or more subsets of codes.

16. The method of claim 1, wherein the subset of codes optimizes the performance criterion when a cross-correlation magnitude associated with the subset of codes is less than a cross-correlation magnitude associated with the other subsets of codes.

17. The method of claim 1, wherein the subset of codes optimizes the performance criterion when a result achieved by codes within the subset of codes in relation to the performance criterion is preferred over other results achieved by codes within the other subsets of codes in relation to the performance criterion.

18. One or more non-transitory processor-readable media embodying program instructions that, when executed by one or more processors, cause the one or more processors to implement a method for selecting codes to be used within positioning signals sent from one or more transmitters, the method comprising:
identifying a set of codes, wherein a magnitude of an autocorrelation function of each member of the set of codes, within a specified zonal region adjacent to a peak of the autocorrelation function, is below a first prescribed value;
identifying a subset of codes, from among two or more subsets of codes in the identified set of codes, that optimizes a performance criterion, wherein the performance criterion is associated with a relationship between members within the subset of codes;
transmitting, from a first transmitter, a first positioning signal that is modulated with a first code of the identified subset of codes; and
transmitting, from a second transmitter, a second positioning signal that is modulated with a second code of the identified subset of codes.

19. The one or more non-transitory processor-readable media of claim 18, wherein the subset of codes is identified from the set such that magnitudes of a cross-correlation function of any pair of codes within the subset of codes are equal to or less than a second prescribed value.

20. The one or more non-transitory processor-readable media of claim 18, wherein the subset of codes that optimizes the performance criterion minimizes a maximum magnitude of a cross-correlation between all pairs of non-identical codes of that subset of codes as compared to the other subsets of codes of the two or more subsets of codes.

21. The one or more non-transitory processor-readable media of claim 20, wherein the first prescribed value is equal to or less than one-half of the maximum magnitude of the cross-correlation.

22. The one or more non-transitory processor-readable media of claim 20, wherein said first prescribed value is equal to or less than one-tenth of the maximum magnitude of the cross-correlation.

23. The one or more non-transitory processor-readable media of claim 18, wherein a set of frequency offset modulated (FOM) signals is generated, wherein each signal of the set of FOM signals is generated by modulating a respective signal of the FOM signals with a code of the identified set of codes, and further modulating the respective signal of the FOM signals with a carrier whose frequency is chosen from among a set of offsets relative to a base offset frequency.

24. The one or more non-transitory processor-readable media of claim 23, wherein the performance criterion includes a minimization of the maximum magnitude of the cross-correlation between all pairs of FOM signals, wherein each pair has different codes and wherein frequency offsets associated with each pair are within a specified range.

25. The one or more non-transitory processor-readable media of claim 24, wherein the first prescribed value is equal to or less than one-half of the maximum magnitude of the cross-correlation between the FOM signals.

26. The one or more non-transitory processor-readable media of claim 24, wherein the first prescribed value is equal to or less than one-tenth of the maximum magnitude of the cross-correlation between said FOM signals.

27. The one or more non-transitory processor-readable media of claim 18, wherein the method further comprises:
selecting the first code from the subset of codes prior to transmitting the first positioning signal; and
selecting the second code from the subset of codes prior to transmitting the second positioning signal.

28. The one or more non-transitory processor-readable media of claim 27, wherein the second positioning signal is transmitted at an offset frequency relative to the first positioning signal.

29. The one or more non-transitory processor-readable media of claim 18, wherein each subset of codes of the two or more subsets of codes contain an equal number of codes.

30. The one or more non-transitory processor-readable media of claim 18, wherein each subset of codes of the two or more subsets of codes include respective numbers of codes that are within a range of sizes.

31. The one or more non-transitory processor-readable media of claim 18, wherein the performance criterion is associated with a relationship between all pairs of signals that are modulated with different members within the subset of codes and further modulated with carrier frequencies that are chosen from among a set of offsets relative to a base frequency.

32. The one or more non-transitory processor-readable media of claim 18, wherein a cross-correlation condition associated with the codes within the identified subset of codes is preferred over the cross-correlation condition associated with the other subsets of codes of the two or more subsets of codes.

33. The one or more non-transitory processor-readable media of claim 18, wherein the subset of codes optimizes the performance criterion when a cross-correlation magnitude associated with the subset of codes is less than a cross-correlation magnitude associated with the other subsets of codes.

34. The one or more non-transitory processor-readable media of claim 18, wherein the subset of codes optimizes the performance criterion when a result achieved by codes within the subset of codes in relation to the performance criterion is preferred over other results achieved by codes within the other subsets of codes in relation to the performance criterion.

35. A system for selecting codes to be used within positioning signals sent from one or more transmitters, wherein the system comprises a network of transmitters that includes:
a first transmitter configured to transmit a first positioning signal that is modulated with a first code of a subset of codes identified from among two or more subsets of codes in an identified set of codes; and
a second transmitter configured to transmit a second positioning signal that is modulated with a second code of the identified subset of codes,
wherein a magnitude of an autocorrelation function of each member of the identified set of codes, within a specified zonal region adjacent to a peak of the autocorrelation function, is below a first prescribed value, and
wherein the identified subset of codes optimizes a performance criterion associated with a relationship between members within the subset of codes.

* * * * *